US012614125B2

(12) United States Patent (10) Patent No.: US 12,614,125 B2

Yellin et al. (45) Date of Patent: *Apr. 28, 2026

(54) CONSTRUCTION MANAGEMENT METHOD, SYSTEM, COMPUTER READABLE MEDIUM, COMPUTER ARCHITECTURE, COMPUTER-IMPLEMENTED INSTRUCTIONS, INPUT-PROCESSING-OUTPUT, GRAPHICAL USER INTERFACES, DATABASES AND FILE MANAGEMENT

(71) Applicant: REQpay Inc., New York, NY (US)

(72) Inventors: Adam S. Yellin, New York, NY (US); Nicholas J. Pasquenza, Ridgewood, NJ (US); Rabi Bader, Berlin (DE); Robert A. Zeko, New York, NY (US)

(73) Assignee: REQPAY INC., New York, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/682,485

(22) Filed: Feb. 28, 2022

(65) Prior Publication Data

US 2023/0009537 A1    Jan. 12, 2023

Related U.S. Application Data

(63) Continuation of application No. 17/019,186, filed on Sep. 11, 2020, now Pat. No. 11,263,557.

(Continued)

(51) Int. Cl.
*G06Q 10/00* (2023.01)
*G06Q 10/0631* (2023.01)
(Continued)

(52) U.S. Cl.
CPC ....... *G06Q 10/00* (2013.01); *G06Q 10/06313* (2013.01); *G06Q 10/0639* (2013.01);
(Continued)

(58) Field of Classification Search
CPC .... G06Q 50/08; G06Q 10/0639; G06Q 30/04; G06Q 10/063114; G06Q 30/0635; G06Q 10/0633; G06Q 20/102; G06Q 20/14
(Continued)

(56) References Cited

U.S. PATENT DOCUMENTS 5,615,109 A    3/1997  Eder
7,113,915 B1   9/2006  Montemayor et al.
(Continued)

FOREIGN PATENT DOCUMENTS

CN      109716381 A    5/2019
JP      2010092387 A   4/2010
(Continued)

OTHER PUBLICATIONS

International Search Report and Written Opinion issued in International Application No. PCT/US2020/050588, mailed on Nov. 18, 2020, 10 pages.
(Continued)

*Primary Examiner* — Rutao Wu
*Assistant Examiner* — Letoria G Knight
(74) *Attorney, Agent, or Firm* — Mintz, Levin, Cohn, Ferris, Glovsky and Popeo, P.C.

(57)    ABSTRACT

A system for construction management including a device having at least one processor and a memory storing at least one program for execution by the at least one processor, the at least one program including instructions, when, executed by the at least one processor cause the at least one processor to perform operations. The operations include receiving as input an electronic version of a document; identifying at least one string of data from the electronic version of the document; mapping the identified at least one string of data to a predetermined unitary database including at least one key string of data associated with at least one key event;

(Continued)

tagging the mapped and identified at least one string of data with a tag associated with the at least one key string of data associated with the at least one key event; and transmitting a signal based on the tagged, mapped, and identified at least one string of data. Related methods, devices, apparatuses, systems, techniques and articles are also described.

33 Claims, 43 Drawing Sheets

Related U.S. Application Data

(60) Provisional application No. 62/898,766, filed on Sep. 11, 2019.

(51) Int. Cl.
| | |
|---|---|
| *G06Q 10/0639* | (2023.01) |
| *G06Q 10/087* | (2023.01) |
| *G06Q 30/0601* | (2023.01) |
| *G06N 20/00* | (2019.01) |

(52) U.S. Cl.
CPC ....... *G06Q 10/087* (2013.01); *G06Q 30/0635* (2013.01); *G06N 20/00* (2019.01); *G06Q 10/06311* (2013.01)

(58) Field of Classification Search
USPC ... 705/13, 7.42, 7.41, 7.36, 7.27, 7.15, 7.13, 705/40
See application file for complete search history.

(56) References Cited

U.S. PATENT DOCUMENTS

| | | | |
|---|---|---|---|
| 7,984,014 B2 | 7/2011 | Song et al. | |
| 8,179,563 B2 | 5/2012 | King et al. | |
| 8,650,210 B1 | 2/2014 | Cheng et al. | |
| 8,706,476 B2 | 4/2014 | Daraselia | |
| 9,870,546 B1 | 1/2018 | Reynolds | |
| 10,402,641 B1 | 9/2019 | Dang et al. | |
| 10,540,976 B2 | 1/2020 | Van Os et al. | |
| 10,614,125 B1 * | 4/2020 | Becker | G06F 40/137 |
| 10,650,379 B2 | 5/2020 | Agrawal et al. | |
| 10,691,885 B2 | 6/2020 | O'Neill et al. | |
| 10,977,395 B1 * | 4/2021 | Bagate | G06Q 10/0637 |
| 11,263,557 B2 | 3/2022 | Yellin et al. | |
| 11,288,613 B2 * | 3/2022 | Barnes | G06Q 50/08 |
| 12,033,098 B1 * | 7/2024 | Drucker | G06Q 40/12 |
| 2002/0143699 A1 | 10/2002 | Baumann et al. | |
| 2005/0209876 A1 * | 9/2005 | Kennis | G06Q 10/06393 726/1 |
| 2006/0190391 A1 | 8/2006 | Cullen et al. | |
| 2006/0282442 A1 * | 12/2006 | Lennon | G06F 16/93 |
| 2009/0018889 A1 * | 1/2009 | Petersen | G06Q 10/10 705/26.1 |
| 2009/0076796 A1 | 3/2009 | Daraselia | |
| 2010/0217745 A1 | 8/2010 | Song et al. | |
| 2010/0312547 A1 | 12/2010 | Van et al. | |
| 2011/0242617 A1 | 10/2011 | King et al. | |
| 2012/0047420 A1 | 2/2012 | Gaffey et al. | |
| 2013/0179955 A1 | 7/2013 | Bekker et al. | |
| 2014/0214758 A1 | 7/2014 | Tripathi et al. | |
| 2014/0278705 A1 | 9/2014 | Tuggle | |
| 2014/0297528 A1 | 10/2014 | Agrawal et al. | |
| 2014/0344181 A1 | 11/2014 | Brown | |
| 2014/0350985 A1 | 11/2014 | Pink | |
| 2015/0006393 A1 * | 1/2015 | Allin | G06Q 30/04 705/44 |
| 2015/0186988 A1 * | 7/2015 | Skinner | G06Q 30/0645 705/314 |
| 2016/0224908 A1 | 8/2016 | Jagannathan et al. | |
| 2017/0076151 A1 | 3/2017 | Roy et al. | |
| 2017/0083714 A1 | 3/2017 | Keiser et al. | |
| 2017/0090693 A1 | 3/2017 | Ku et al. | |
| 2017/0091879 A1 | 3/2017 | Kanner et al. | |
| 2017/0116669 A1 * | 4/2017 | Wickstrom | G06Q 40/03 |
| 2017/0180372 A1 | 6/2017 | Bezold et al. | |
| 2017/0206648 A1 | 7/2017 | Marra et al. | |
| 2017/0286529 A1 | 10/2017 | O'Neill et al. | |
| 2018/0018322 A1 | 1/2018 | Mukherjee et al. | |
| 2018/0075138 A1 | 3/2018 | Perram et al. | |
| 2018/0239959 A1 * | 8/2018 | Bui | G06F 16/93 |
| 2018/0247137 A1 | 8/2018 | Boyle | |
| 2018/0268506 A1 * | 9/2018 | Wodetzki | G06N 5/046 |
| 2019/0138667 A1 | 5/2019 | Benesh et al. | |
| 2019/0220936 A1 | 7/2019 | Khalil | |
| 2020/0034766 A1 | 1/2020 | Borges | |
| 2020/0042915 A1 * | 2/2020 | Samson | G06Q 50/08 |
| 2020/0293500 A1 | 9/2020 | Patil et al. | |
| 2021/0073694 A1 | 3/2021 | Yellin et al. | |
| 2021/0326814 A1 * | 10/2021 | Schulman | G06Q 40/02 |

FOREIGN PATENT DOCUMENTS

| | | |
|---|---|---|
| WO | 2019213457 A1 | 11/2019 |
| WO | 2021051023 A1 | 3/2021 |

OTHER PUBLICATIONS

Cajzek et al. (2016) "An Unmanned Aerial Vehicle for Multipurpose Tasks in Construction Industry", Journal of Applied Engineering Science, 14(2):314-327.

Siebert et al. (2014) "Mobile 3D Mapping for Surveying Earthwork Projects Using an Unmanned Aerial Vehicle 1 (UAV) System", Automation in Construction, 41:1-14.

* cited by examiner

From FIG. 3A

| CONTRACT | CHANGE ORDERS | REVISED CONTRACT | PREVIOUSLY BILLED | THIS PERIOD | | | TOTAL BILLING TO DATE | % COMPLETE |
|---|---|---|---|---|---|---|---|---|
| | | | | WORK IN PLACE | STORED MATERIALS | CHANGE ORDERS | | |
| | 50,000.00 | 50,000.00 | 25,000.00 | 25,000.00 | | | 50,000.00 | 100% |
| | 25,000.00 | 25,000.00 | 12,500.00 | 12,500.00 | | | 25,000.00 | 100% |
| | 25,000.00 | 25,000.00 | 12,500.00 | 12,500.00 | | | 25,000.00 | 100% |
| | 75,000.00 | 75,000.00 | 25,000.00 | 5,000.00 | | | 30,000.00 | 40% |
| | 250.00 | 250.00 | 125.00 | 125.00 | | | 250.00 | 100% |
| | 200.00 | 200.00 | 100.00 | 100.00 | | | 200.00 | 100% |
| | 150.00 | 150.00 | 75.00 | 75.00 | | | 150.00 | 100% |
| | 30,000.00 | 30,000.00 | | 30,000.00 | | | 30,000.00 | 100% |
| | | - | | | | | - | |
| | 50,000.00 | 50,000.00 | | | | | - | |
| | 1,200.00 | 1,200.00 | | | | | - | 0% |
| | 1,500.00 | 1,500.00 | | | | | - | 0% |
| | | - | | | | | | |

84

From FIG. 3B

| PREVIOUS RETAINAGE | CURRENT RETAINAGE | TOTAL RETAINAGE | DUE THIS PERIOD | EXPOSURE UNAPPROVED WORK IN PLACE | EXPOSURE PERCENT COMPLETE |
|---|---|---|---|---|---|
| | 5,000.00 | 5,000.00 | 20,000.00 | | |
| | 2,500.00 | 2,500.00 | 10,000.00 | | |
| | 2,500.00 | 2,500.00 | 10,000.00 | | |
| | 3,000.00 | 3,000.00 | 2,000.00 | | |
| | 25.00 | 25.00 | 100.00 | | |
| | 20.00 | 20.00 | 80.00 | | |
| | 15.00 | 15.00 | 60.00 | | |
| | 3,000.00 | 3,000.00 | 27,000.00 | | |
| | | | | 500.00 | 100% |

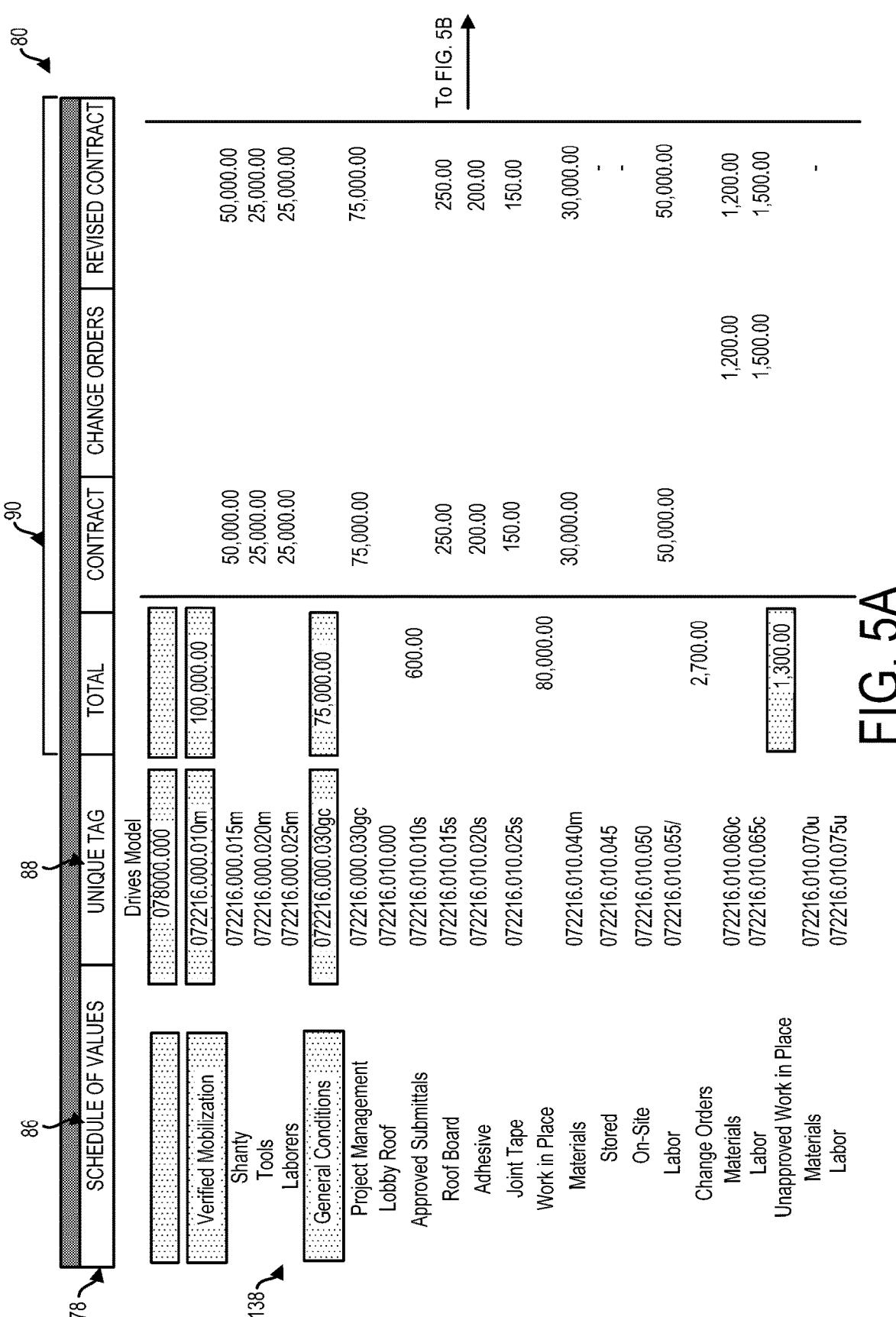

| SCHEDULE OF VALUES | UNIQUE TAG | TOTAL | CONTRACT | CHANGE ORDERS | REVISED CONTRACT |
|---|---|---|---|---|---|
| Verified Mobilization | Drives Model | | | | |
| | 078000.000 | | | | |
| | 072216.000.010m | 100,000.00 | | | |
| Shanty | 072216.000.015m | | 50,000.00 | | 50,000.00 |
| Tools | 072216.000.020m | | 25,000.00 | | 25,000.00 |
| Laborers | 072216.000.025m | | 25,000.00 | | 25,000.00 |
| General Conditions | 072216.000.030gc | 75,000.00 | | | |
| Project Management | 072216.000.030gc | | 75,000.00 | | 75,000.00 |
| Lobby Roof | 072216.010.000 | | | | |
| Approved Submittals | 072216.010.010s | 600.00 | | | |
| Roof Board | 072216.010.015s | | 250.00 | | 250.00 |
| Adhesive | 072216.010.020s | | 200.00 | | 200.00 |
| Joint Tape | 072216.010.025s | | 150.00 | | 150.00 |
| Work in Place | 072216.010.040m | 80,000.00 | | | |
| Materials | 072216.010.045 | | 30,000.00 | | 30,000.00 |
| Stored | 072216.010.050 | | | | - |
| On-Site | 072216.010.055/ | | | | - |
| Labor | | | 50,000.00 | | 50,000.00 |
| Change Orders | 072216.010.060c | 2,700.00 | | | |
| Materials | 072216.010.065c | | | 1,200.00 | 1,200.00 |
| Labor | | | | 1,500.00 | 1,500.00 |
| Unapproved Work in Place | 072216.010.070u | 1,300.00 | | | |
| Materials | 072216.010.075u | | | | - |
| Labor | | | | | |

TAKE PHOTO

74L

70

136

ABC Roofing

| | | | |
|---|---|---|---|
| Shanty | 25,0000 | 100% | VERIFIED |
| Tools | 12,500 | 100% | Click to Verify |
| Laborers | 20,000 | 40% | Click to Verify |

74, 74C

74

74, 74K

74L

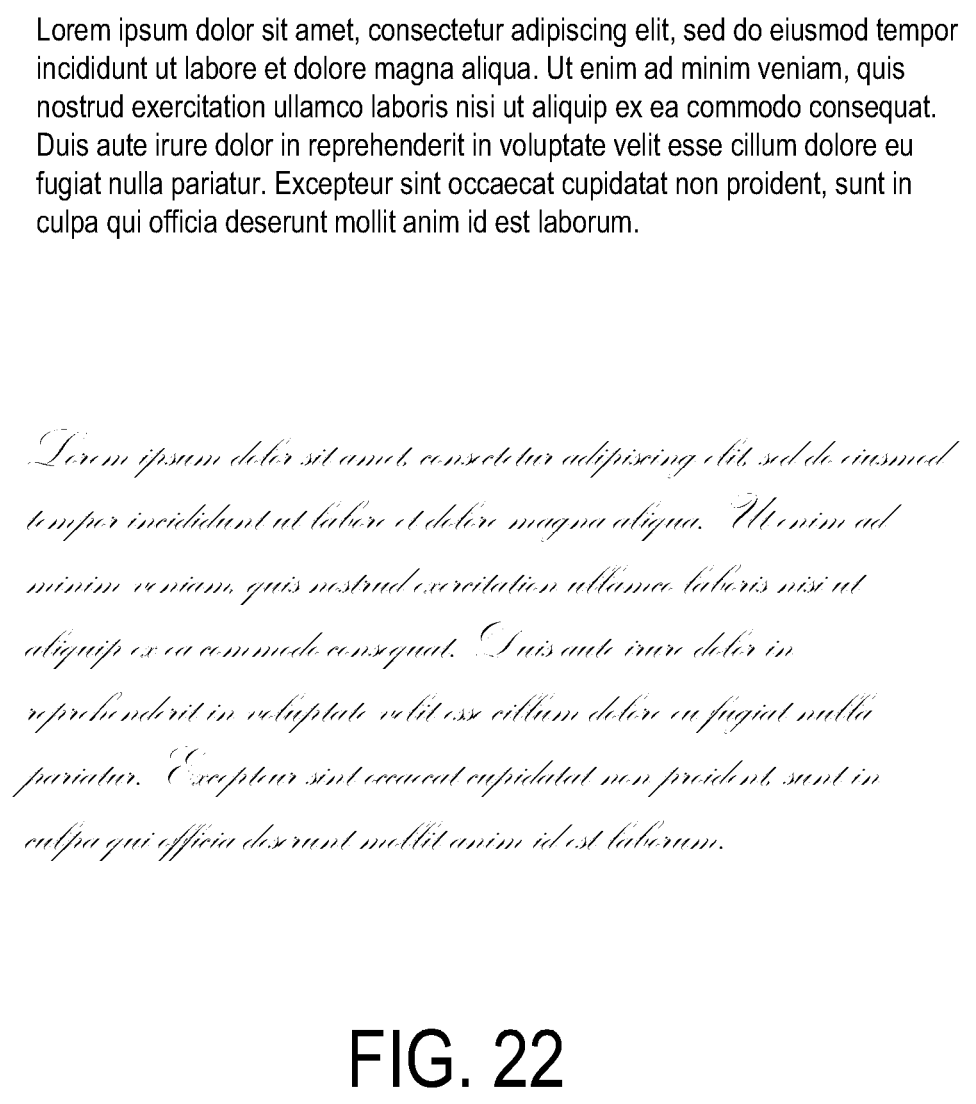

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

*Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.*

FIG. 22

Figure 23:
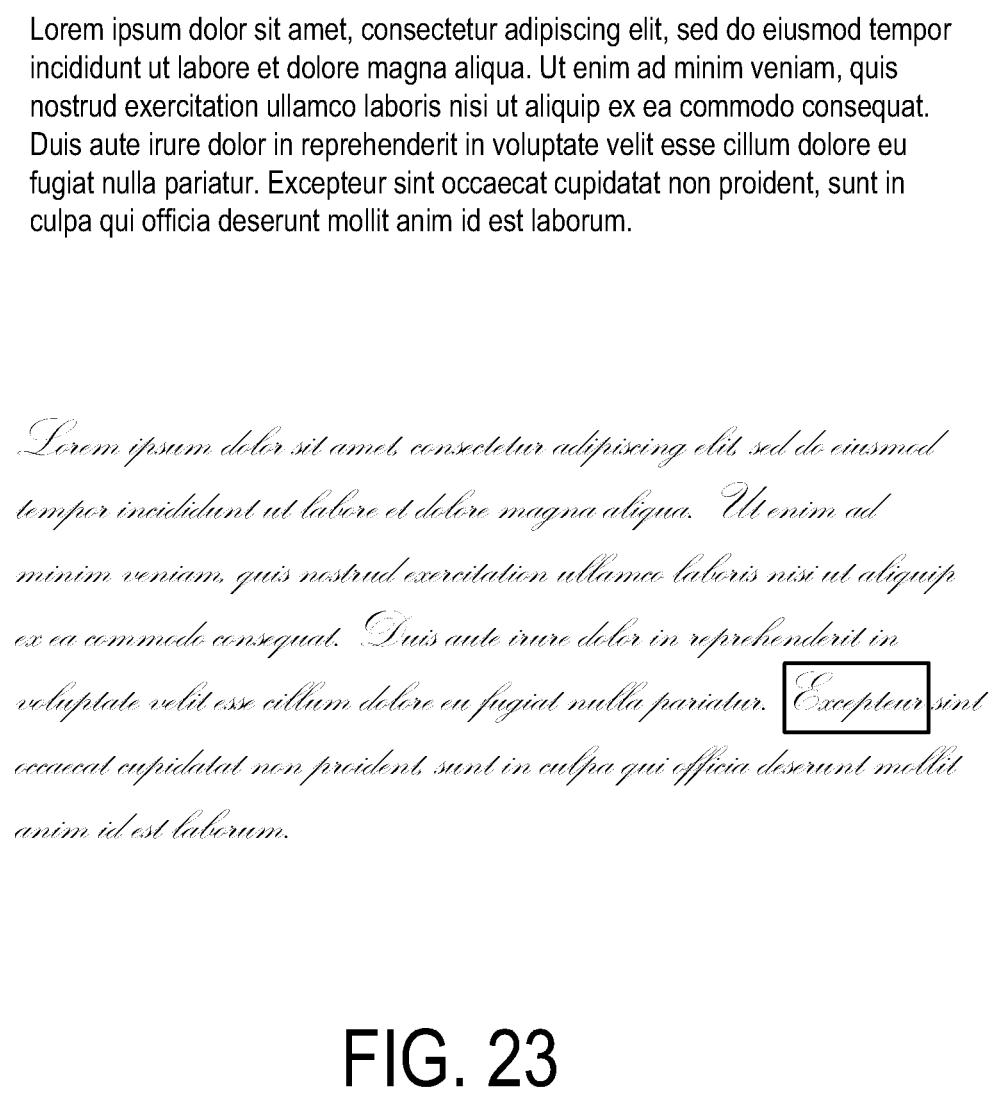

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

X

*Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.*

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

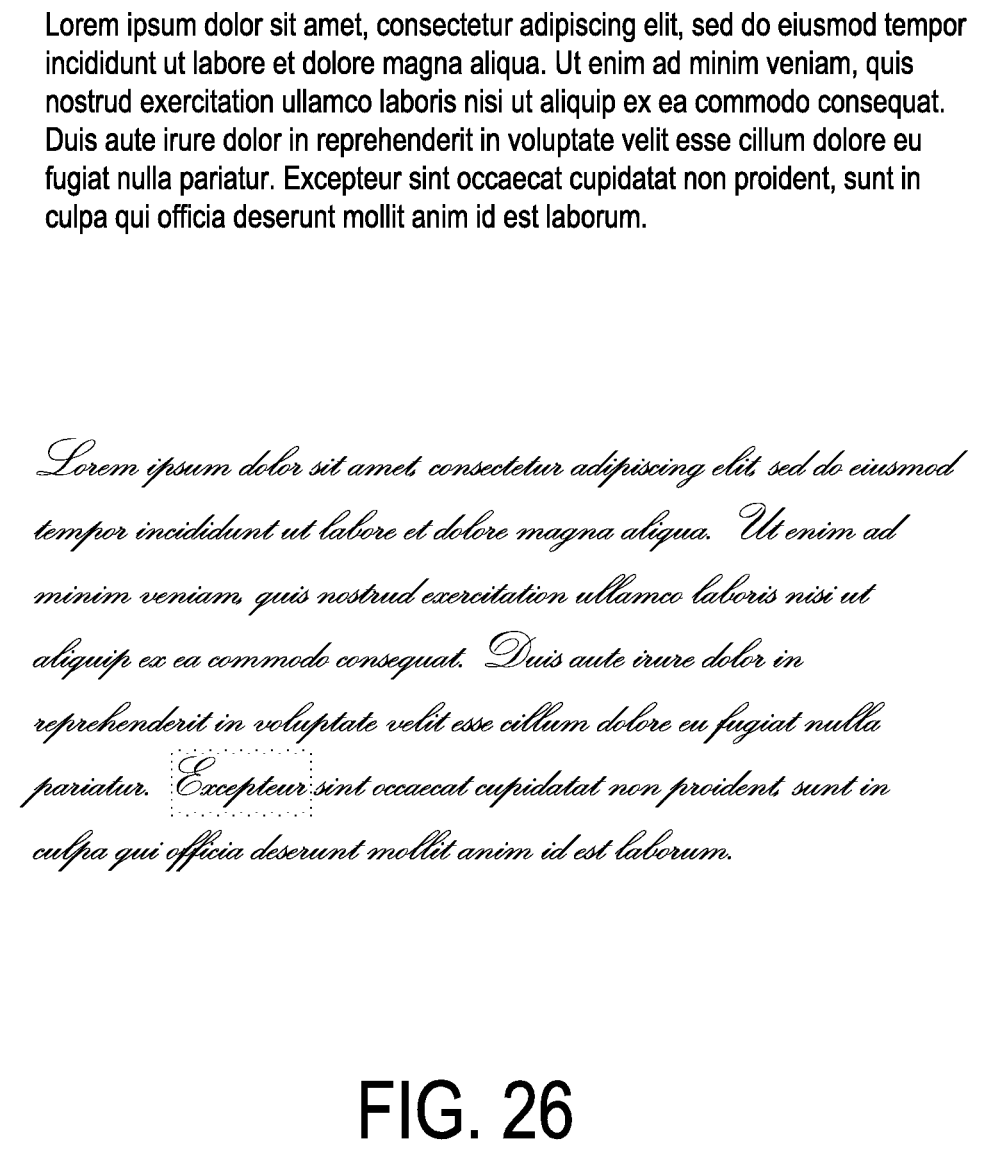

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

*Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.*

FIG. 26

Figure 27:
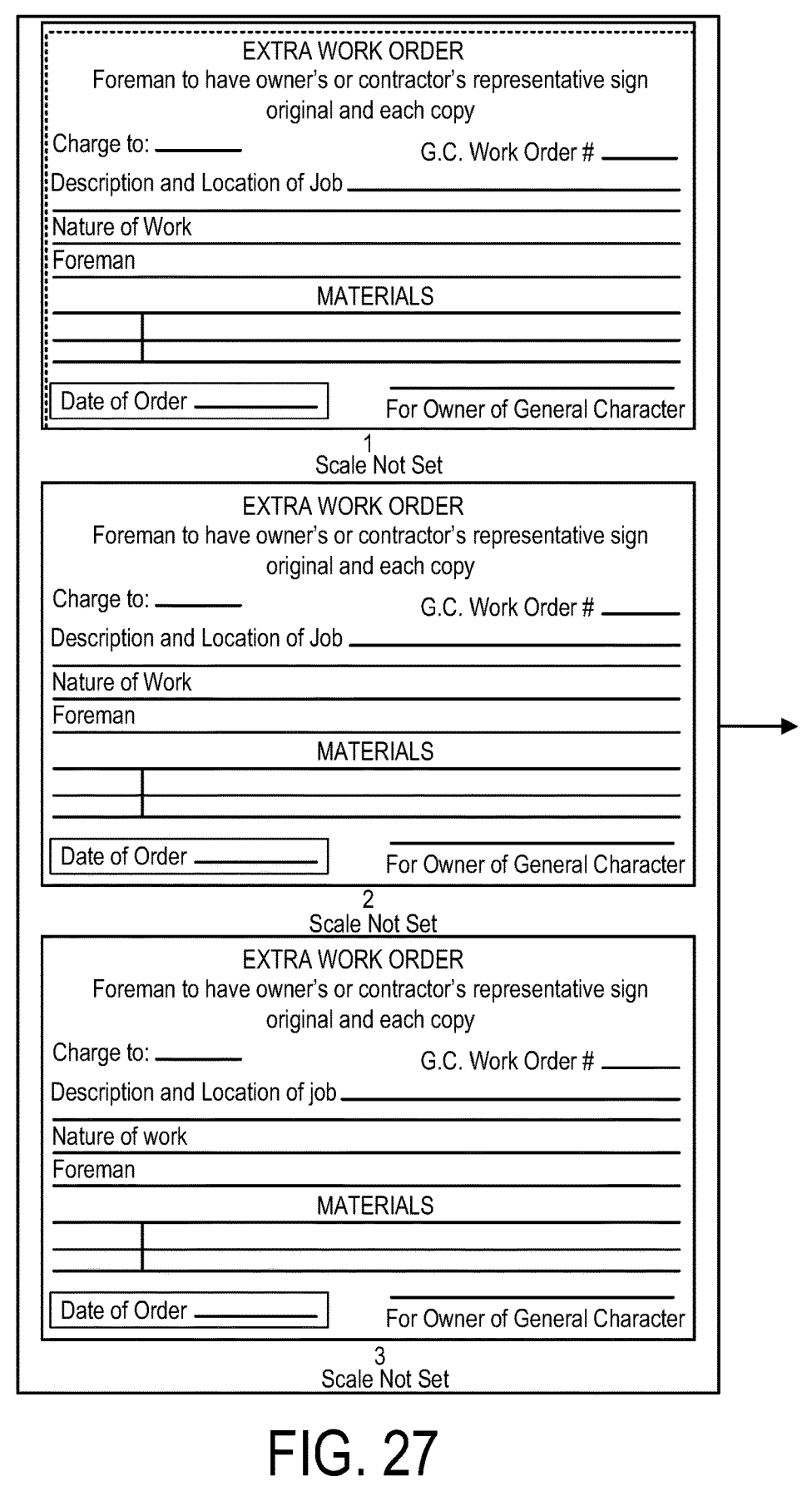

EXTRA WORK ORDER
Foreman to have owner's or contractor's representative sign
original and each copy Charge to: _____          G.C. Work Order # _____

Description and Location of Job _____

Nature of Work

Foreman

MATERIALS

Date of Order _____          For Owner of General Character

1
Scale Not Set

EXTRA WORK ORDER
Foreman to have owner's or contractor's representative sign
original and each copy Charge to: _____          G.C. Work Order # _____

Description and Location of Job _____

Nature of Work

Foreman

MATERIALS

Date of Order _____          For Owner of General Character

2
Scale Not Set

EXTRA WORK ORDER
Foreman to have owner's or contractor's representative sign
original and each copy Charge to: _____          G.C. Work Order # _____

Description and Location of job _____

Nature of work

Foreman

MATERIALS

Date of Order _____          For Owner of General Character

3
Scale Not Set

EXTRA WORK ORDER

26424

Our Job No. _____    Date _____

Foreman to have owner's or contractor's representative sign original and each copy a.c. Job # _____

Change to: _____    a.c. Work Order # _____

Description and Location of Job _____

Nature of Work

*Patch and rip up other half of 3/4 ply wood and install carpet tile*

*Elevator Cabs*

LABOR

| CLASSIFICATION OF WORK | NO OF LIEN | HOURS EACH | TOTAL HOURS | RATE | TOTAL | |
|---|---|---|---|---|---|---|
| Foreman | 1 | 4hrs | | 160 | 7hrs | 1120 |
| Floor Layers | | | | | | |
| | | | | | | |
| | | | | | | |
| | | | | | | |
| | | | | | | |
| | | | | | | |

*7hrs Time of Material*

MATERIALS

| | | |
|---|---|---|
| 1 (1gal carpet tile adhesive) | 50 | |
| 1 4 pack of feather finish sp | 100 | |
| 2 boxes of carpet tiles @20 | 320 | |
| | 1590 | |

This Order ☐ IS ☐ IS NOT    Complete

Extra Order NO. _____
Date of Order _____

Approved as to authority for
Material & Labor Expended by:

_____

For Owner of General Contractor

FIG. 29

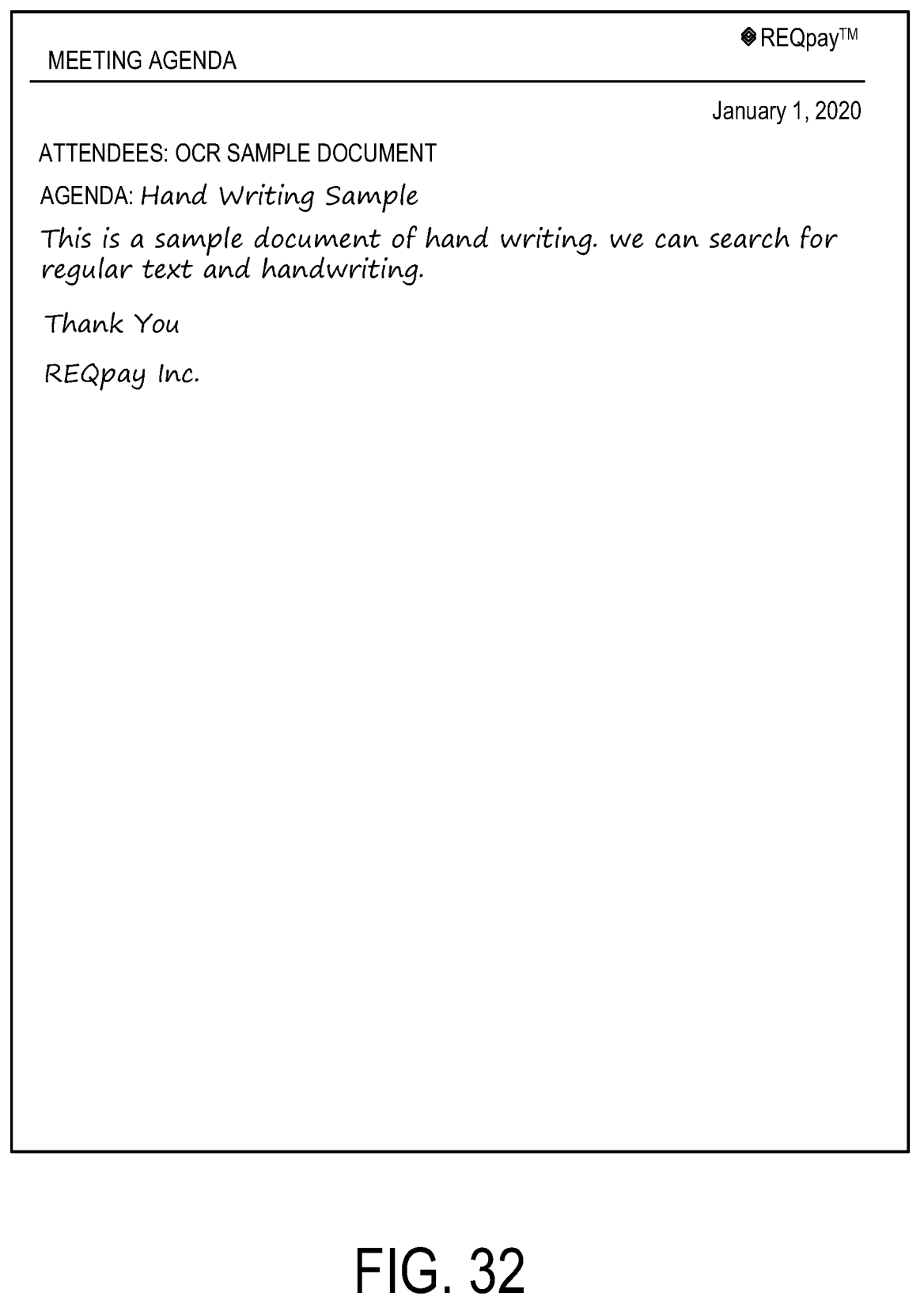

◆REQpay™

MEETING AGENDA

January 1, 2020

ATTENDEES: OCR SAMPLE DOCUMENT

AGENDA: *Hand Writing Sample*

*This is a sample document of hand writing. we can search for regular text and handwriting.*

*Thank You*

*REQpay Inc.*

FIG. 32

◆ REQpay™

MEETING AGENDA

January 1, 2020

ATTENDEES: OCR SAMPLE DOCUMENT

AGENDA: *Hand Writing Sample*

*This is a sample document of hand writing. we can search for regular text and handwriting.*

*Thank You*

*REQpay Inc.*

| Sample 🔍 |
|---|
| ☐ ▾ Page ◀ 22 ▶ of 36   ✋ ۹ ۹ ☐ |
| 2 Annotations |
| Page 4 |
| ☐ Sample |
| Page 22 |
| ☐ regular text |

FIG. 33

Subcontractor's Trades - Schedules of Values

| DESCRIPTION | SCHEDULE OF VALUES | THIS PERIOD | PERCENT COMPLETE | DESCRIPTION | SCHEDULE OF VALUES | THIS PERIOD | PERCENT COMPLETE | DESCRIPTION | SCHEDULE OF VALUES | THIS PERIOD | PERCENT COMPLETE |
|---|---|---|---|---|---|---|---|---|---|---|---|
| Layout | 5,000.00 | | 100% | Layout | 5,000.00 | | 100% | Layout | 5,000.00 | | 100% |
| Loading | | Trade #1 | 100% | Loading | | Trade #2 | 100% | Loading | | Trade #3 | 100% |
| Framing | | | 40% | Framing | | | 40% | Framing | | | 40% |
| Sheetrock | | | 40% | Sheetrock | | | 40% | Sheetrock | | | 40% |
| Taping | 24,000.00 | | 23% | Taping | 24,000.00 | | 23% | Taping | 24,000.00 | | 23% |
| Load/Install HMI Frames, Doors, and Hardware | 14,000.00 | | 85% | Load/Install HMI Frames, Doors, and Hardware | 14,000.00 | | 85% | Load/Install HMI Frames, Doors, and Hardware | 14,000.00 | | 85% |
| Ceilings | | | | Ceilings | | | | Ceilings | | | |
| Blackiron | 2,500.00 | | 95% | Blackiron | 2,500.00 | | 95% | Blackiron | 2,500.00 | | 95% |
| Framing | 5,000.00 | | 70% | Framing | 5,000.00 | | 70% | Framing | 5,000.00 | | 70% |
| Sheetrock | 27,000.00 | | 21% | Sheetrock | 27,000.00 | | 21% | Sheetrock | 27,000.00 | | 21% |
| Taping | 16,000.00 | | 15% | Taping | 16,000.00 | | 15% | Taping | 16,000.00 | | 15% |

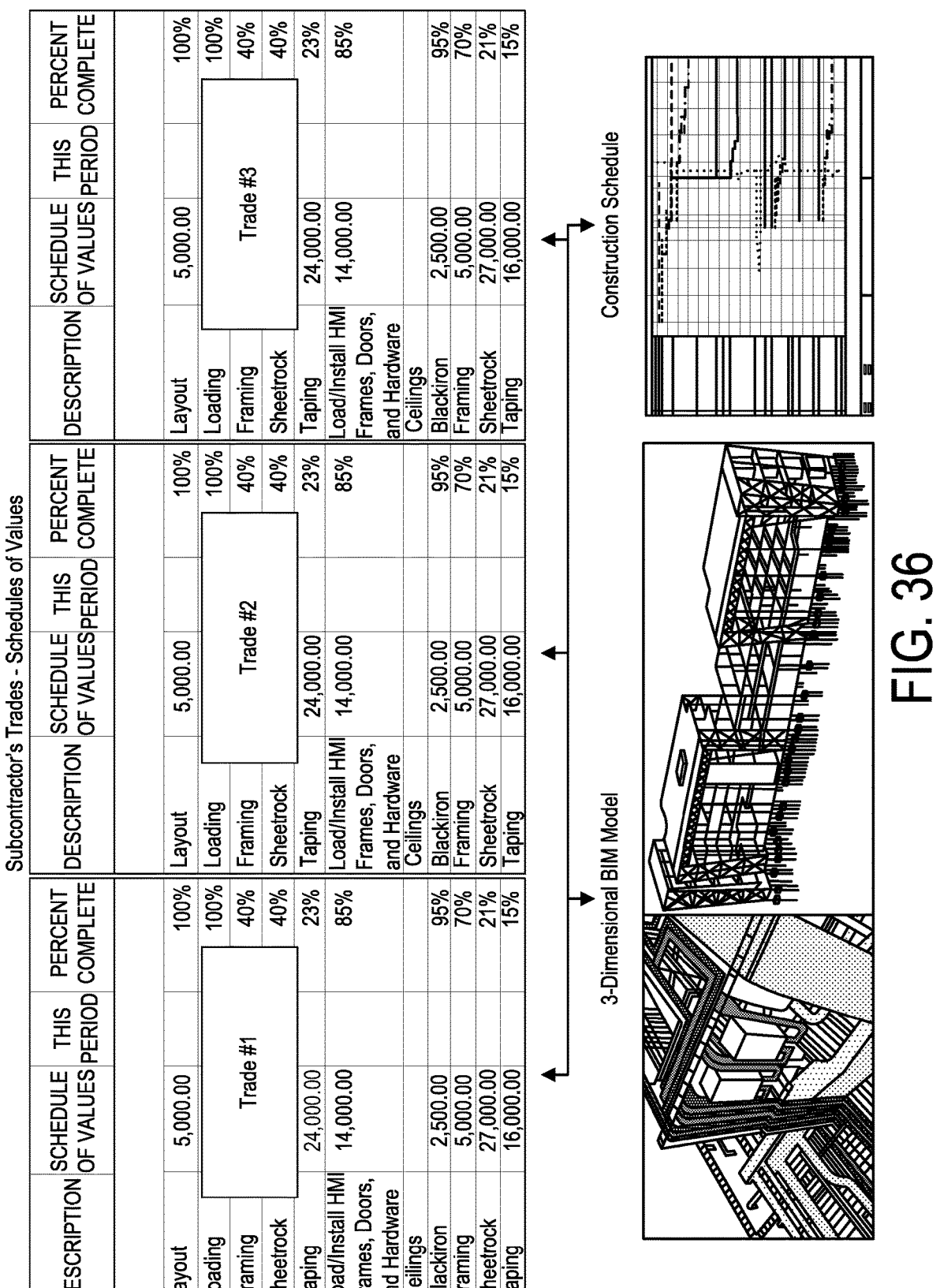

3-Dimensional BIM Model

Construction Schedule

FIG. 36

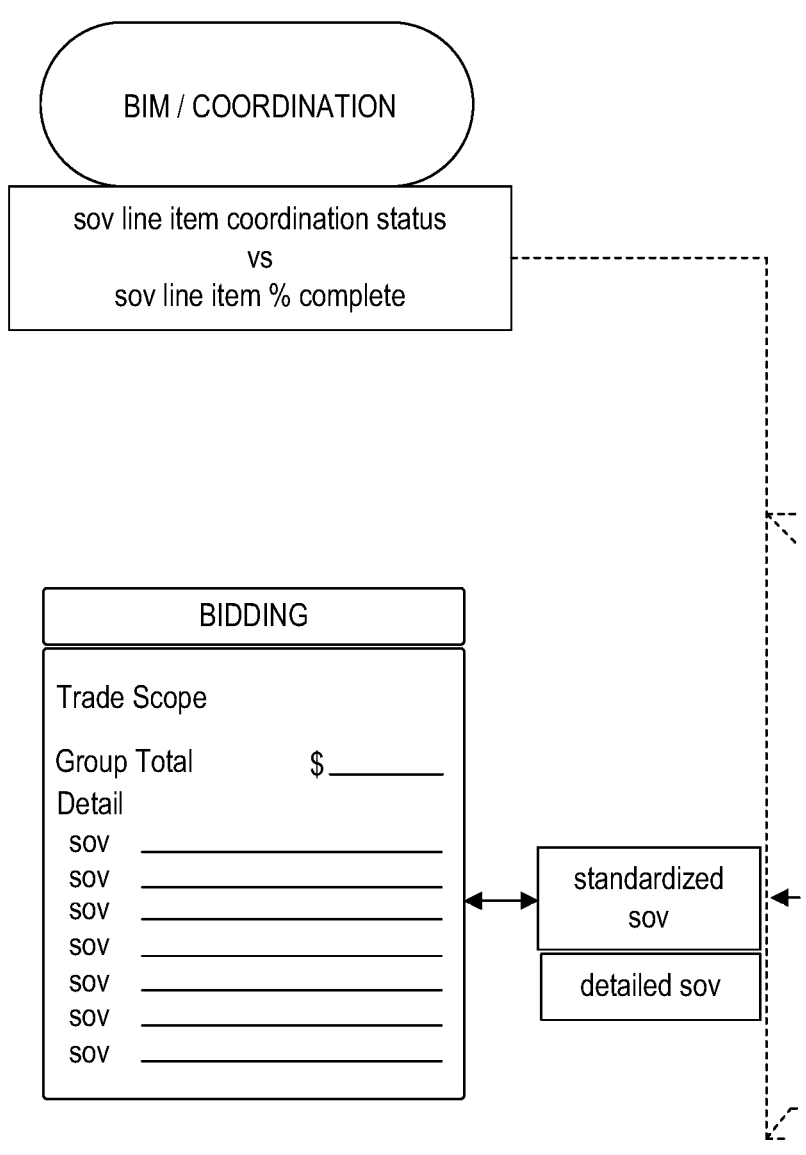
FIG. 40A

SCHEDULE OF VALUES

| DESCRIPTION OF WORK | BASE SOV | APPROVED CHANGE ORDERS | REVISED CONTRACT | WORK IN PLACE | STORED MATERIALS | % COMPLETE |
|---|---|---|---|---|---|---|
| Scope #1 - Materials | 10,000.00 | -- | -- | | | 48% |
| Scope #1 - Labor / Installation | 20,000.00 | -- | -- | | | 73% |
| Scope #2 - Materials | 30,000.00 | -- | -- | | | 93% |
| Scope #2 - Labor / Installation | 40,000.00 | -- | -- | | | 100% |
| Scope #3 - Materials | 50,000.00 | -- | -- | | | 15% |
| Scope #3 - Labor / Installation | 30,000.00 | -- | -- | | | 25% |
| Base Contract Total | 290,000.00 | | | - | - | 59% |

SCHEDULE OF VALUES

| DESCRIPTION OF WORK | BASE SOV | APPROVED CHANGE ORDERS | REVISED CONTRACT | WORK IN PLACE | STORED MATERIALS | % COMPLETE |
|---|---|---|---|---|---|---|
| Scope #1 - Materials | 10,000.00 | -- | -- | | | 48% |
| Scope #1 - Labor / Installation | 20,000.00 | -- | -- | | | 73% |
| Scope #2 - Materials | 30,000.00 | -- | -- | | | 93% |
| Scope #2 - Labor / Installation | 40,000.00 | -- | -- | | | 100% |
| Scope #3 - Materials | 50,000.00 | -- | -- | | | 15% |
| Scope #3 - Labor / Installation | 30,000.00 | -- | -- | | | 25% |
| Base Contract Total | 290,000.00 | | | - | - | 59% |

SCHEDULE OF VALUES

| DESCRIPTION OF WORK | BASE SOV | APPROVED CHANGE ORDERS | REVISED CONTRACT | WORK IN PLACE | STORED MATERIALS | % COMPLETE |
|---|---|---|---|---|---|---|
| Scope #1 - Materials | 10,000.00 | -- | -- | | | 48% |
| Scope #1 - Labor / Installation | 20,000.00 | -- | -- | | | 73% |
| Scope #2 - Materials | 30,000.00 | -- | -- | | | 93% |
| Scope #2 - Labor / Installation | 40,000.00 | -- | -- | | | 100% |
| Scope #3 - Materials | 50,000.00 | -- | -- | | | 15% |
| Scope #3 - Labor / Installation | 30,000.00 | -- | -- | | | 25% |
| Base Contract Total | 290,000.00 | | | - | - | 59% |

FIG. 40D

CONSTRUCTION MANAGEMENT METHOD, SYSTEM, COMPUTER READABLE MEDIUM, COMPUTER ARCHITECTURE, COMPUTER-IMPLEMENTED INSTRUCTIONS, INPUT-PROCESSING-OUTPUT, GRAPHICAL USER INTERFACES, DATABASES AND FILE MANAGEMENT

PRIORITY

This application claims the benefit of priority to and is a continuation of U.S. patent application Ser. No. 17/019,186 to Adam S. Yellin, et al., filed on Sep. 11, 2020, now U.S. Pat. No. 11,263,557, issued on Mar. 1, 2022, entitled "Construction Management Method, System, Computer Readable Medium, Computer Architecture, Computer-Implemented Instructions, Input-Processing-Output, Graphical User Interfaces, Databases and File Management," which claims priority to U.S. Provisional Patent Application No. 62/898,766, entitled "CONSTRUCTION MANAGEMENT SYSTEM AND PROCESS", filed on Sep. 11, 2019, which are incorporated by reference herein in their entireties.

TECHNICAL FIELD

The present disclosure relates to a method, system and computer readable medium for construction management. Specifically, the present disclosure relates to a method, system and computer readable medium for construction management (CM) of a construction project, and more specifically, to CM of a construction project including a process for validating requisition information using validation inputs obtained from the construction project.

BACKGROUND

Developed construction industry platforms process human data entry (e.g., submittals, change orders, requests for information (RFIs), etc.). Typically, the platforms are configured to allow an owner to set permissions and tend to limit transparency among various participants on any particular project. Developed systems required long tedious hours spent manually collating requisitions and associated inaccuracy and inefficiency.

A construction management (CM) system for managing a construction project may include various sub-systems, such as a schedule of values (SOV), a project schedule, a contract cost system, and a building information model (BIM). The data in each of these sub-systems may be coordinated to some extent during project planning and pre-construction with data in each other of these sub-systems. However, as the construction project progresses, when the sub-systems are not integrated with each other, delay in data collection, data verification, and data inputting into each of the sub-systems results in project status and key project indicators outputted from each sub-system which are uncoordinated with and/or unreconciled to the project status and key project indicators outputted from the other sub-systems, and as such fail to provide a comprehensive, coordinated indication of the project status. Further, due to delays in data collection, verification, inputting and reporting, the project status and key project indicators are not reported in real time, e.g., are also delayed, such that any recovery planning and/or modeling based on the delayed project status and indicators may not be timely, may not address issues identified in the time gap between data collection and reporting, and/or may understate current contract costs and/or fail to identify project schedule conflicts at the earliest possible time in which recovery planning and/or contingency actions may occur.

One example of delay which may occur is in the requisition process, where a contractor submits a requisition, e.g., an application for payment of current work which has been performed by the contractor. The requisition includes a schedule of values (SOV) showing a listing of the work elements required to be completed by that contractor for the construction project, and the amount of work claimed to have been completed in the current period. Prior to approving the requisition for payment to the contractor, each work element of the SOV having current work for which payment is claimed under the requisition must be reviewed to verify that the amount of work claimed has been completed. Verifying the current work claimed in the SOV may require, for example, that a project supervisor, project manager, program manager, or other person conduct a site visit to the project site to physically view and verify completion of the claimed work prior to authorizing payment of the requisition. As such, payment to the contractor is delayed until the site visit may be conducted and the verification information inputted to the CM system. Further, updates to other sub-systems, such as the project schedule, contract cost tracking system, or other systems, may be delayed pending the physical verification of the current work claimed in the SOV, and/or by additional time and processing steps which may be required to input the current work information from the SOV into the other sub-systems.

The present inventors developed improvements in devices and methods for CM that overcome at least the above-referenced problems with the devices and methods of the related art.

SUMMARY

A system for construction management is provided. The system may include a device having at least one processor and a memory storing at least one program for execution by the at least one processor. The at least one program may include instructions. The instructions, when executed by the at least one processor, may cause the at least one processor to perform operations.

The operations may include receiving as input an electronic version of a document. The operations may include identifying at least one string of data from the electronic version of the document. The operations may include mapping the identified at least one string of data to a predetermined unitary database including at least one key string of data associated with at least one key event. The operations may include tagging the mapped and identified at least one string of data with a tag associated with the at least one key string of data associated with the at least one key event. The operations may include transmitting a signal based on the tagged, mapped, and identified at least one string of data.

The signal may be a verification. The verification may include at least one from the group consisting of: transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event; performing a statistical method of comparison of the identified at least one string of data with the at least one key string of data associated with the at least one key event; performing a machine learning method of comparison of the identified at least one string of data with the at least one key string of data associated with the at least one key event; and a combination of any of the group.

The document may be at least one from the group consisting of: a bid document, a contract, a schedule of values tag, a project schedule, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The electronic version of the document may include at least one from the group consisting of: a code, a letter, a number, a symbol, a word, a phrase, a sentence, an image of any of the group, an update associated with any of the group, a combination of any of the group, and a physical, scanned or digital version of any of the group.

The identified at least one string of data may include at least one from the group consisting of: a name of an entity, a name of a category, a code, a description, a location, a name of the location, a past date, a past time, a present date, a present time, a future date, a future time, a financial amount, an image of any of the group, an update associated with any of the group, a combination of any of the group, and a physical, scanned or digital version of any of the group.

The predetermined unitary database may include a historic collection. The historic collection may include at least one from the group consisting of: a bid document, a contract, a schedule of values tag, a project schedule, a schedule of values, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The predetermined unitary database may include an analysis of the historic collection. The predetermined unitary database may include an association of the analysis of the historic collection with the at least one key event.

The key event may be at least one from the group consisting of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

The operations may include comparing the identified at least one string of data with a predetermined unitary database including the at least one key string of data associated with the at least one key event. The comparing the identified at least one string of data with a predetermined unitary database including the at least one key string of data associated with the at least one key event may include transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event. The comparing the identified at least one string of data with a predetermined unitary database including the at least one key string of data associated with the at least one key event may include performing a statistical method of comparison of the identified at least one string of data with the at least one key string of data associated with the at least one key event. The comparing the identified at least one string of data with a predetermined unitary database including the at least one key string of data associated with the at least one key event may include performing a machine learning method of comparison of the identified at least one string of data with the at least one key string of data associated with the at least one key event. The comparing the identified at least one string of data with a predetermined unitary database including the at least one key string of data associated with the at least one key event may include a combination of any of the above.

The electronic version of the document may include at least one of the group consisting of a bid document, a change order, an unapproved work in place, and a verification input. The predetermined unitary database may be a schedule of values. The mapping may include mapping the at least one of the group consisting of the bid document, the change order, the unapproved work, and the verification input in place to the schedule of values.

In response to a verification process, a requisition process, and a schedule of values process, an output may be generated. The output may be at least one from the group consisting of a contract, a schedule of values tag, a project schedule, a requisition, a verification, a report, a heat map, a model, a building information model, and a payment.

The mapping the identified at least one string of data to the predetermined unitary database including at least one key string of data associated with at least one key event may include associating a selected portion of an image on a display with the identified at least one string of data or the at least one key string of data associated with the at least one key event. The identifying at least one string of data from the electronic version of the document may include detecting and reading printed text and/or handwritten text from the electronic version of the document. The identifying at least one string of data from the electronic version of the document may include determining, receiving and saving coordinates of the detected text. The identifying at least one string of data from the electronic version of the document may include normalizing the determined, received and saved coordinates. The identifying at least one string of data from the electronic version of the document may include saving the original and normalized coordinates in a search index.

A computer-implemented method of construction management is provided. A device may be provided. The device may have at least one processor and a memory storing at least one program for execution by the at least one processor. The at least one program may include instructions, which, when executed by the at least one processor cause the at least one processor to perform operations. The operations may include receiving as input an electronic version of a document. The operations may include identifying at least one string of data from the electronic version of the document. The operations may include mapping the identified at least one string of data to a predetermined unitary database including at least one key string of data associated with at least one key event. The operations may include tagging the mapped and identified at least one string of data with a tag associated with the at least one key string of data associated with the at least one key event. The operations may include transmitting a signal based on the tagged, mapped, and identified at least one string of data.

The signal may be a verification. The verification may include at least one from the group consisting of: transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event; performing a statistical method of comparison of the identified at least one string of data with the at least one key string of data associated with the at least one key event; performing a machine learning method of comparison of the identified at least one string of data with the at least one key string of data associated with the at least one key event; and a combination of any of the group.

The document may be at least one from the group consisting of: a bid document, a contract, a schedule of values tag, a project schedule, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The electronic version of the document may include at least one from the group consisting of: a code, a letter, a number, a symbol, a word, a phrase, a sentence, an image of any of the group, an update associated with any of the group, a combination of any of the group, and a physical, scanned or digital version of any of the group.

The identified at least one string of data may include at least one from the group consisting of: a name of an entity, a name of a category, a code, a description, a location, a name of the location, a past date, a past time, a present date, a present time, a future date, a future time, a financial amount, an image of any of the group, an update associated with any of the group, a combination of any of the group, and a physical, scanned or digital version of any of the group.

The predetermined unitary database may include a historic collection. The historic collection may include at least one from the group consisting of: a bid document, a contract, a schedule of values tag, a project schedule, a schedule of values, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The predetermined unitary database may include an analysis of the historic collection. The predetermined unitary database may include an association of the analysis of the historic collection with the at least one key event.

The key event may be at least one from the group consisting of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

The operations may include comparing the identified at least one string of data with a predetermined unitary database including the at least one key string of data associated with the at least one key event. The comparing the identified at least one string of data with a predetermined unitary database including the at least one key string of data associated with the at least one key event may include transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event. The comparing the identified at least one string of data with a predetermined unitary database including the at least one key string of data associated with the at least one key event may include performing a statistical method of comparison of the identified at least one string of data with the at least one key string of data associated with the at least one key event. The comparing the identified at least one string of data with a predetermined unitary database including the at least one key string of data associated with the at least one key event may include performing a machine learning method of comparison of the identified at least one string of data with the at least one key string of data associated with the at least one key event. The comparing the identified at least one string of data with a predetermined unitary database including the at least one key string of data associated with the at least one key event may include a combination of any of the above.

The electronic version of the document may include at least one of the group consisting of a bid document, a change order, an unapproved work in place, and a verification input. The predetermined unitary database may be a schedule of values. The mapping may include mapping the at least one of the group consisting of the bid document, the change order, the unapproved work, and the verification input in place to the schedule of values.

In response to a verification process, a requisition process, and a schedule of values process, an output may be generated. The output may be at least one from the group consisting of a contract, a schedule of values tag, a project schedule, a requisition, a verification, a report, a heat map, a model, a building information model, and a payment.

The mapping the identified at least one string of data to the predetermined unitary database including at least one key string of data associated with at least one key event may include associating a selected portion of an image on a display with the identified at least one string of data or the at least one key string of data associated with the at least one key event. The identifying at least one string of data from the electronic version of the document may include detecting and reading printed text and/or handwritten text from the electronic version of the document. The identifying at least one string of data from the electronic version of the document may include determining, receiving and saving coordinates of the detected text. The identifying at least one string of data from the electronic version of the document may include normalizing the determined, received and saved coordinates. The identifying at least one string of data from the electronic version of the document may include saving the original and normalized coordinates in a search index.

A non-transitory computer-readable storage medium may be provided. non-transitory computer-readable storage medium may store at least one program for construction management. The at least one program may be for execution by at least one processor and a memory storing the at least one program. The at least one program may include instructions, when, executed by the at least one processor cause the at least one processor to perform operations.

The operations may include receiving as input an electronic version of a document, wherein the document is at least one from the group consisting of: a bid document, a contract, a schedule of values tag, a project schedule, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The operations may include identifying at least one string of data from the electronic version of the document.

The operations may include mapping the identified at least one string of data to a predetermined unitary database including at least one key string of data associated with at least one key event.

The predetermined unitary database may include a historic collection of at least one from the group consisting of: a bid document, a contract, a schedule of values tag, a project schedule, a schedule of values, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The predetermined unitary database may include an analysis of the historic collection.

The predetermined unitary database may include an association of the analysis of the historic collection with the at least one key event, wherein the key event is at least one from the group consisting of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

The operations may include tagging the mapped and identified at least one string of data with a tag associated with the at least one key string of data associated with the at least one key event.

The operations may include transmitting a signal based on the tagged, mapped, and identified at least one string of data.

The signal may be a verification. The verification may include at least one from the group consisting of: transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event; performing a statistical method of comparison of the identified at least one string of data with the at least one key string of data associated with the at least one key event; performing a machine learning method of comparison of the identified at least one string of data with the at least one key string of data associated with the at least one key event; and a combination of any of the group.

The document may be at least one from the group consisting of: a bid document, a contract, a schedule of values tag, a project schedule, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The electronic version of the document may include at least one from the group consisting of: a code, a letter, a number, a symbol, a word, a phrase, a sentence, an image of any of the group, an update associated with any of the group, a combination of any of the group, and a physical, scanned or digital version of any of the group.

The identified at least one string of data may include at least one from the group consisting of: a name of an entity, a name of a category, a code, a description, a location, a name of the location, a past date, a past time, a present date, a present time, a future date, a future time, a financial amount, an image of any of the group, an update associated with any of the group, a combination of any of the group, and a physical, scanned or digital version of any of the group.

The predetermined unitary database may include a historic collection. The historic collection may include at least one from the group consisting of: a bid document, a contract, a schedule of values tag, a project schedule, a schedule of values, a requisition, a verification, a change order, an unapproved work in place, a work authorization, a report, an email, a file, a text message, an electronic notebook, a database, a model, a payment, an invoice, a receipt, an image of any of the group, an update associated with any of the group, a combination of any of the group, and a physical, scanned or digital version of any of the group.

The predetermined unitary database may include an analysis of the historic collection. The predetermined unitary database may include an association of the analysis of the historic collection with the at least one key event.

The key event may be at least one from the group consisting of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

The instructions may include comparing the identified at least one string of data with a predetermined unitary database including the at least one key string of data associated with the at least one key event. The comparing the identified at least one string of data with a predetermined unitary database including the at least one key string of data associated with the at least one key event may include transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event. The comparing the identified at least one string of data with a predetermined unitary database including the at least one key string of data associated with the at least one key event may include performing a statistical method of comparison of the identified at least one string of data with the at least one key string of data associated with the at least one key event. The comparing the identified at least one string of data with a predetermined unitary database including the at least one key string of data associated with the at least one key event may include performing a machine learning method of comparison of the identified at least one string of data with the at least one key string of data associated with the at least one key event. The comparing the identified at least one string of data with a predetermined unitary database including the at least one key string of data associated with the at least one key event may include a combination of any of the above.

The electronic version of the document may include at least one of the group consisting of a bid document, a change order, an unapproved work in place, and a verification input. The predetermined unitary database may be a schedule of values. The mapping may include mapping the at least one of the group consisting of the bid document, the change order, the unapproved work, and the verification input in place to the schedule of values.

In response to a verification process, a requisition process, and a schedule of values process, an output may be generated. The output may be at least one from the group consisting of a contract, a schedule of values tag, a project schedule, a requisition, a verification, a report, a heat map, a model, a building information model, and a payment.

The mapping the identified at least one string of data to the predetermined unitary database including at least one key string of data associated with at least one key event may include associating a selected portion of an image on a display with the identified at least one string of data or the at least one key string of data associated with the at least one key event. The identifying at least one string of data from the electronic version of the document may include detecting and reading printed text and/or handwritten text from the electronic version of the document. The identifying at least one string of data from the electronic version of the document may include determining, receiving and saving coordinates of the detected text. The identifying at least one string of data from the electronic version of the document may include normalizing the determined, received and saved coordinates. The identifying at least one string of data from the electronic version of the document may include saving the original and normalized coordinates in a search index.

A CM process may include generating, via a server, a schedule of values (SOV). The SOV may include a plurality of SOV descriptions. The CM process may include generating, via the server and using a tagging instruction, a plurality of SOV tags. Each one of the SOV tags may be unique from each other one of the SOV tags. The server may include a data store. The CM process may include associating in the data store, a respective SOV tag of the plurality of SOV tags with a respective SOV description of the plurality of SOV descriptions such that each respective SOV tag is associated with only one respective SOV description.

The CM process may include receiving, via the server, at least one bid document. The CM process may include generating, using the server and the at least one bid document, a respective contract cost for each respective SOV description of the plurality of SOV descriptions. The CM process may include associating in the data store, using the server, the respective contract cost with at least one of the respective SOV description and the respective SOV tag associated with the respective SOV description.

The CM process may include generating a project schedule, using the server. The project schedule may include a plurality of schedule elements arranged in a project sequence. Each of the schedule elements is one of a task and an activity. The CM process may include associating in the data store, using the server, each respective schedule element of the plurality of schedule elements with a respective schedule time. The CM process may include generating a contract time, using the server and the respective schedule time associated with each schedule element of at least one of the plurality of schedule elements. The CM process may include associating in the data store, using the server, each respective SOV tag with at least one schedule element of the plurality of schedule elements.

The CM process may include generating, using the server, a contract. The contract includes the plurality of SOV descriptions, the respective contract cost associated with each of the plurality of SOV descriptions, and the contract time.

The CM process may include collecting, using a verification mechanism, at least one verification component at a current verification time. The at least one verification component at least partially defines a current completion status of a respective SOV description at the current verification time. The CM process may include receiving, via the server, the at least one verification component. The CM process may include associating in the data store, using the server, the at least one verification component with at least one of the respective SOV description and with the respective SOV tag. The CM process may include receiving, via the server, a requisition requesting verification of the current completion status of the respective SOV description.

The CM process may include determining, using the server, whether the at least one verification component is acceptable to verify the current completion status of the respective SOV description. The CM process may include verifying, using the server, the current completion status of the respective SOV description when the at least one verification component is determined to be acceptable. The CM process may include associating in the data store, using the server, the current completion status with at least one of the respective SOV description and with the respective SOV tag. The CM process may include rejecting, using the server, the current completion status of the respective SOV description when the at least one verification component is determined to be unacceptable.

The determining whether the at least one verification component is acceptable to verify the current completion status of the respective SOV description may include at least one of: reviewing the verification component; comparing the verification component to a verification standard; and applying a verification instruction to the verification component.

The collecting the at least one verification component and receiving the at least one verification component via the server may occur contemporaneously.

The CM process may include associating in the data store, the verification component with a time stamp. The time stamp may be generated by one of the server and the verification mechanism. The time stamp may be generated contemporaneously with receiving the verification component via the server.

The receiving the at least one verification component via the server, and determining whether the at least one verification component is acceptable to verify the current completion status of the respective SOV description may occur contemporaneously.

The CM process may include generating a current contract cost of the respective SOV description when the at least one verification component is determined to be acceptable, via the server and using the current completion status of the respective SOV description. The CM process may include associating in the data store, the current contract cost with the respective SOV tag associated with the respective SOV description. The CM process may include determining a current payment for the requisition, via the server and using the current contract cost of the respective SOV description when the at least one verification component is determined to be acceptable.

The CM process may include generating a payment authorization. The payment authorization authorizes payment of the requisition in the amount of the current payment.

The CM process may include generating a current cost heat map using the server, a reporting instruction, and the current contract cost. The current cost heat map may compare the current contract cost to the contract cost. The CM process may include outputting the current cost heat map to a user device.

The CM process may include generating, using a modeling instruction and a plurality of BIM elements, a building information model (BIM) of the project. The BIM may include the plurality of BIM elements. The CM process may include associating in the data store, using the server, each respective SOV tag with at least one BIM element of the plurality of BIM elements. The CM process may include generating a BIM cost heat map using the respective current contract cost associated with the respective SOV value. The CM process may include outputting the BIM cost heat map to a user device.

The CM process may include associating in the data store, using the server, the current completion status and the current time with the at least one respective schedule element associated with the at least one of the respective SOV description and with the respective SOV tag. The CM process may include generating a current project schedule using server, the current completion status and the current time. The CM process may include generating a current contract time using the current project schedule.

The CM process may include modeling a recovery plan, using the server and a modeling instruction, the project schedule and the current project schedule.

The CM process may include generating, using a modeling instruction and a plurality of BIM elements, a building information model (BIM) of the project; wherein the BIM includes the plurality of BIM elements. The CM process may include associating in the data store, using the server, each respective SOV tag with at least one BIM element of the plurality of BIM elements. The CM process may include generating a BIM schedule heat map using the respective current schedule time associated with the respective SOV value. The CM process may include outputting the BIM schedule heat map to a user device.

A CM system may include a verification mechanism. The CM system may include a user device. The CM system may include a server in communication with each of the verification mechanism and the user device. The server may include a data store. The server may have a processor and a memory. The memory may store instructions executable by the processor such that the server, the verification mechanism and the user device are operable to execute the CM process.

Described herein is a CM process and system which substantially reduces and/or eliminates input and verification delays and lack of reconciliation between the status information inputted into the various CM sub-systems, such that project status reporting for a construction project may occur in real time or near real time during the duration of the project. The terminology CM sub-systems, as used herein, refers to sub-systems such as the schedule of values (SOV), the project schedule, the contract, the cost accounting and payment system, reporting system(s), and modeling system(s) including BIM, heat mapping, and schedule modeling. The CM process and system described herein integrates schedule of values (SOV) data, project schedule data, contract cost data, and building information modeling (BIM) data using an SOV tagging method, such that each of the SOV, project schedule, contract cost, and BIM may be updated in real time with submission and/or verification of a verification input to the CM system, where the verification input is configured to verify a current completion status of a work element listed in the SOV and associated with an SOV tag generated by the SOV tagging method described herein. Each SOV tag is unique and associated with only a single SOV description of the SOV. In a non-limiting example, each work element listed on the SOV may be referred to herein as a SOV description. Each unique SOV tag and the SOV description to which the SOV tag is assigned in a data store of the CM system are associated with at least one project schedule element, a SOV cost, and at least one BIM element, so as to integrate the SOV, project schedule, contract and BIM through a shared data structure using the unique SOV tagging system and process. As such, when a verification input indicating a current completion status of a SOV description is received to the CM system and verified as an acceptable verification input, the project schedule element(s), SOV cost, and BIM element(s) linked to the SOV description by the SOV tag are updated using the current completion status of the linked SOV description, such that the CM project status related to any of the project schedule, contract cost, and BIM are updated contemporaneously with updating of the SOV. In one example, the SOV, project schedule, contract cost, and BIM are updated in real time and/or in near real time, e.g., at the current time at which the verification input verifying the current completion status of the SOV description is received to a CM server. In one example, the verification input is collected and received to the CM server contemporaneously, such that the SOV, project schedule, contract cost, and BIM are updated in real time with the collection of the verification input. In one example, the verification input may be collected using one or more verification mechanisms, at least some of which may be automated such that collection does not require the presence and/or manual input of a project manager or contractor at the project worksite. In this example, delay between verification input and project status updating is minimized and/or substantially eliminated such that project status may be reported and/or monitored in real time. In one example, project status is reported using one or more heat maps to visually represent the status of various project parameters such as cost and schedule parameters. In one example, the heat map is configured as a BIM model such that the project parameter data is graphically represented by color-coding of the BIM model. The CM process and system described herein is advantaged by providing project status reporting in real time, such that recovery planning, cost containment actions, contractor payment, and/or change management may be completed in a substantially timelier manner and risks related to reporting delays may be minimized.

These and other capabilities of the disclosed subject matter will be more fully understood after a review of the following figures, detailed description, and claims.

DESCRIPTION OF DRAWINGS

These and other features will be more readily understood from the following detailed description taken in conjunction with the accompanying drawings, in which:

FIG. 5A provides a detailed view of a second portion of the exemplary data table of FIG. 3;

FIG. 22 depicts an upload step of a method for CM according an exemplary embodiment;

FIG. 23 depicts a recognize and bounding step of the method for CM according an exemplary embodiment;

FIG. 24 depicts a coordinate step of the method for CM according an exemplary embodiment;

FIG. 25 depicts a resize/reformat step of the method for CM according an exemplary embodiment;

FIG. 26 depicts a highlight step of the method for CM according an exemplary embodiment;

FIG. 27 depicts an upload step of a handwriting search function for the method for CM according an exemplary embodiment;

FIG. 29 depicts a highlighting step of the handwriting search function for the method for CM according an exemplary embodiment;

FIG. 32 depicts an original document to be scanned using the handwriting search function for the method for CM according an exemplary embodiment;

FIG. 33 depicts a GUI associated with a highlighting step of the handwriting search function for the method for CM according an exemplary embodiment;

FIG. 36 depicts partial GUIs associated with the schedule of values, 3-D modeling and scheduling for the method for CM according an exemplary embodiment;

FIG. 40A, which depicts a BIM/coordination module and a bidding module for the method for CM according an exemplary embodiment;

FIG. 40D depicts schedules of values for the schedule of values module for the method for CM according an exemplary embodiment.

Figure 1:
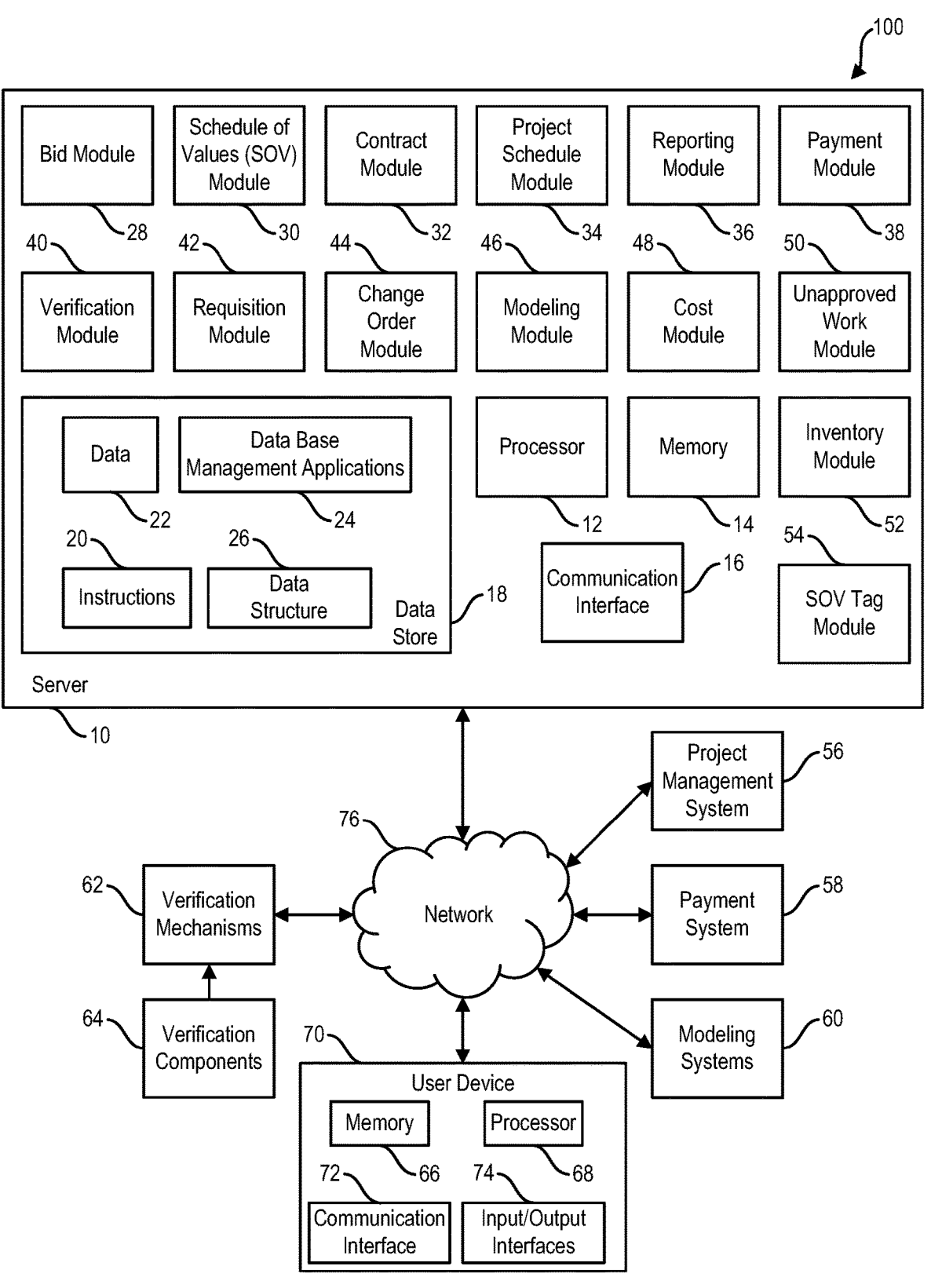
FIG. 1 provides an illustration of an architecture of an exemplary system for construction management (CM)

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

With the continued development of technology and emphasis on remote/cloud based software as a result of, for example, a disruptive event (e.g., COVID-19), an improved method, system and computer readable medium for construction management (CM) of a construction project support long-term growth trajectory of all asset classes at scale (e.g., residential, commercial, industrial, and infrastructure). The CM system is configured to be deployed across projects regardless of budget size and geographic region.

A method, system and computer readable medium for CM of a construction project is provided, which harmonizes and integrates complicated financial information and complex data using machine learning and human analysis to provide users with useful feedback for mitigating risk during the construction project. Whereas developed CM devices and methods overlook the requisition process, the present method, system and computer readable medium leverage the requisition process to promote efficiencies. Specifically, for example, users are provided with information regarding the status of the construction projects through the lens of the requisition.

In some exemplary embodiments, one or more elements of photographs of construction sites are identified and associated with a schedule of values (SOV). The associations promote transparency and efficiency of project meetings and site walk-throughs. Financial discrepancies between planning stages and actual performance are minimized. The associated elements of the photographs with the SOVs are further associated with the billing process. For instance, instead of a single SOV worth hundreds of thousands of dollars represented by a single percentage of completion, the line item is divided into detailed line items. The detail facilitates verification and validation.

In particular, the method, system and computer readable medium provides early indicators of risk factors having the potential to add delay and/or cost to the project. Analysis of details of the requisition permits provision of such early indicators.

The method, system and computer readable medium may provide software as a service (Saas). The method, system and computer readable medium may include a stakeholder tool that allows multiple parties to input information. Data science engines may be used to minimize human data entry. The data science engines may read data being entered and may compare and calculate "micro points" based on factors such as rules, permissions, and changing project conditions during the project lifecycle.

The method, system and computer readable medium may be configured to analyze conditions of a project to highlight the progress of the project, and minimize cost overruns and schedule delays as a result of disruptions to workflow.

Generally speaking, primary activities of contractors and subcontractors working on a project are completed in the field at a construction site. Individuals responsible for completing paperwork related to the work completed are often on-the-go and are not office-based. Materials used on the project are often manufactured abroad and transported internationally. Documents and photographs that log the transfer of the materials are completed on-location. Thus, much of the documentation that supports billing for materials, labor, and other construction activities are done, at least in-part, by hand. These documents are later scanned and attached to other miscellaneous documentation that are then submitted to the construction manager for review. Construction/project managers, stakeholders, and bank representatives require certain documentation to verify accuracy of the work completed before payments can be approved. For large-scale construction projects, searching through pages of handwritten documentation to verify that information is correct may be extremely time consuming and costly. In addition, the manual review process results in a larger margin of error.

Capabilities of an improved construction management (CM) system allow construction/project managers, stakeholders, and/or bank representatives to easily search for keywords and find handwritten support. The process of reviewing monthly documentation is made more efficient using the search functions of the CM system. Also, optical character reading (OCR) capabilities allow these parties to quickly answer ad-hoc questions during monthly budget meetings, questions that may have been unanswerable on-the-spot prior to the use of the CM system. Efficient review leads to a cleaner and more accurate requisition, resulting in fewer retroactive corrections. Overall, the capabilities of the CM system significantly improve workflow of at least one requisition process of at least one construction project.

INTRODUCTION

First Architecture

Disclosed herein are certain systems, apparatuses, and processes for the management of a construction project, including methods and/or processes which may be embodied as instructions 20 stored on a computer-readable medium and executable by a processor. Referring to the drawings, wherein like reference numbers correspond to like or similar components throughout the several figures, there is shown in FIG. 1 a schematic illustration of an architecture of a construction management (CM) system 100 for executing a CM process 200 illustrated by the exemplary block diagram shown in FIG. 2. The CM system 100 may be referred to herein as a CM system. The process 200 may be referred to herein as a construction management (CM) process, and/or as a CM process. With regard to the system 100, the process 200, and the components and elements of the system 100 and the process 200 illustrated described herein and illustrated by the accompanying figures, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed teachings. As used herein, the terms "a", "an," "the," "at least one," and "one or more" are interchangeable and indicate that at least one of an item is present. A plurality of such items may be present unless the context clearly indicates otherwise. The terminology "substantially" as used herein also refers to a slight imprecision of a condition (e.g., with some approach to exactness of the condition; approximately or reasonably close to the condition; nearly' essentially). As used herein, the terminology "in real time," "in near real time," and "contemporaneously" also refers to a slight imprecision of a real time condition, such that events described herein as occurring "in real time," "in near real time," and "contemporaneously" are described as occurring as substantially the same time, within the limitations of the technology used, including for example, within the limitations of the time required to transmit, receive, and process data and/or signals associated with the described events. As used herein, the term "document" is not intended to be limited to paper documents and also refers to documents which may be generated digitally, electronic documents, scanned images of paper documents, e-mails, facsimiles, on-line fillable forms, etc. The terms "comprising," "includes," "including," "has," and "having" are inclusive and therefore specify the presence of stated items, buy do not preclude the presence of other items. As used in this disclosure, the term "or" includes any and all combinations of one or more of the listed items. Accordingly, it is to be understood that the above description is intended to be illustrative and not restrictive. Many embodiments and applications other than the examples provided would be apparent to those of skill in the art upon reading the above description.

Figure 2:
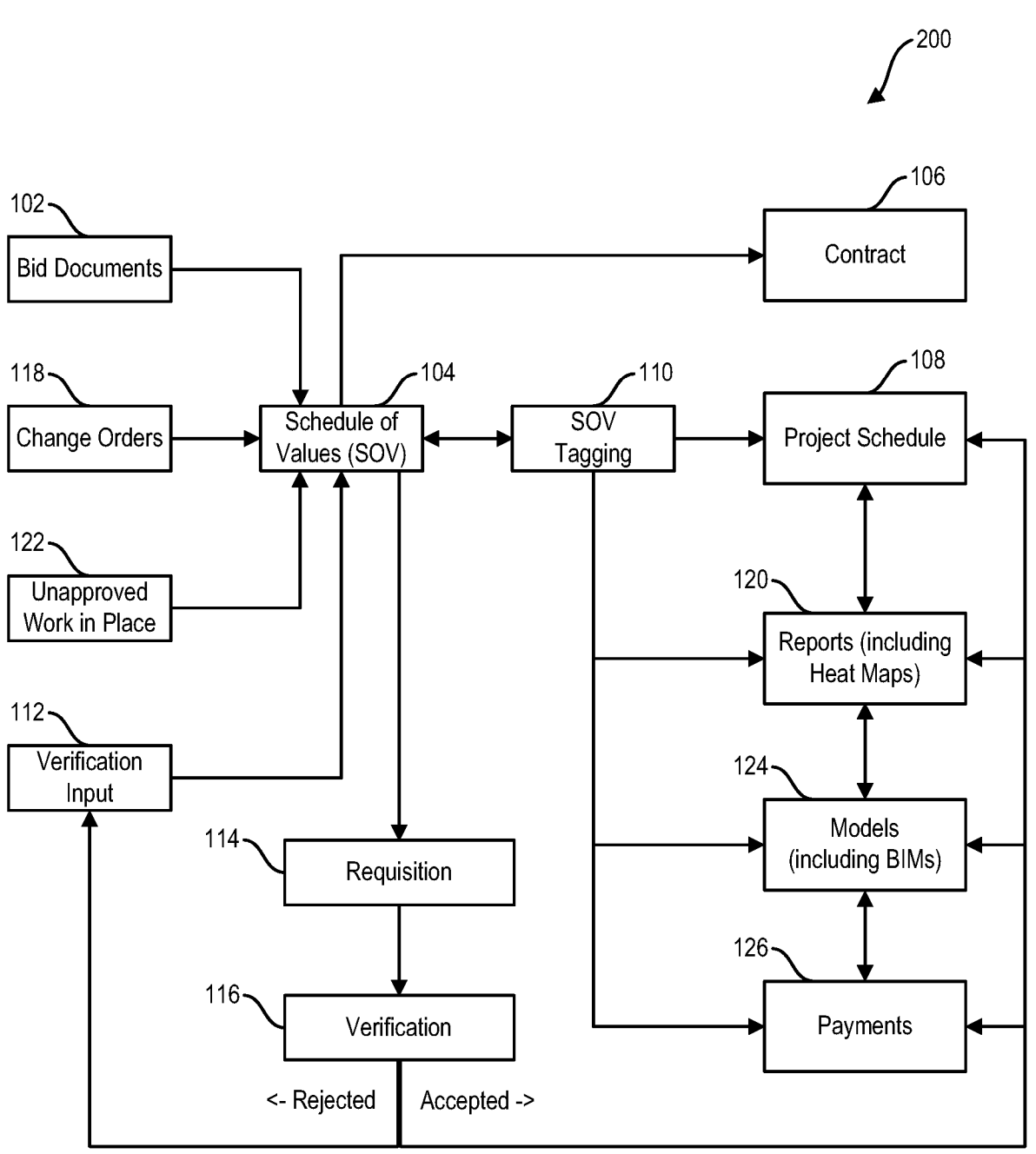
FIG. 2 provides a schematic illustration of the CM process using the CM system of FIG. 1.

In FIGS. 1 and 2, where direct connections are illustrated between adjacent components, the system CM 100 and/or the process 200 may include additional components therebetween. Where indirect connections are illustrated between two components with at least a third component therebetween, the CM system 100 and/or the process 200 may omit the third component therebetween and thus the two components may be directly connected components, where otherwise functional.

System Overview and Exemplary Data Elements

Figure 38:
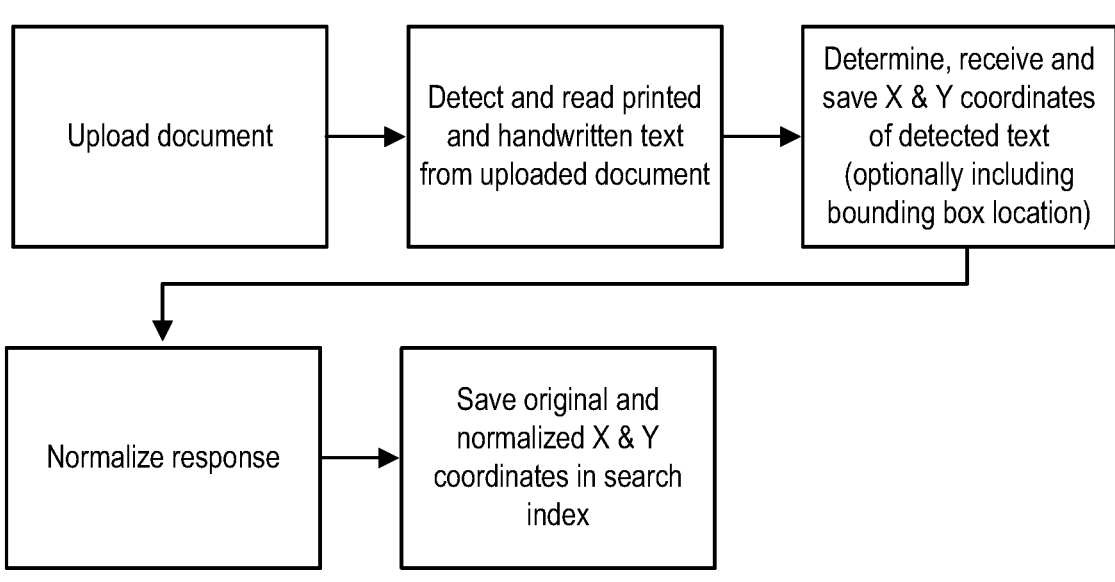
FIG. 38 depicts an optical character reading (OCR) process for the method for CM according an exemplary embodiment.
Figure 39:
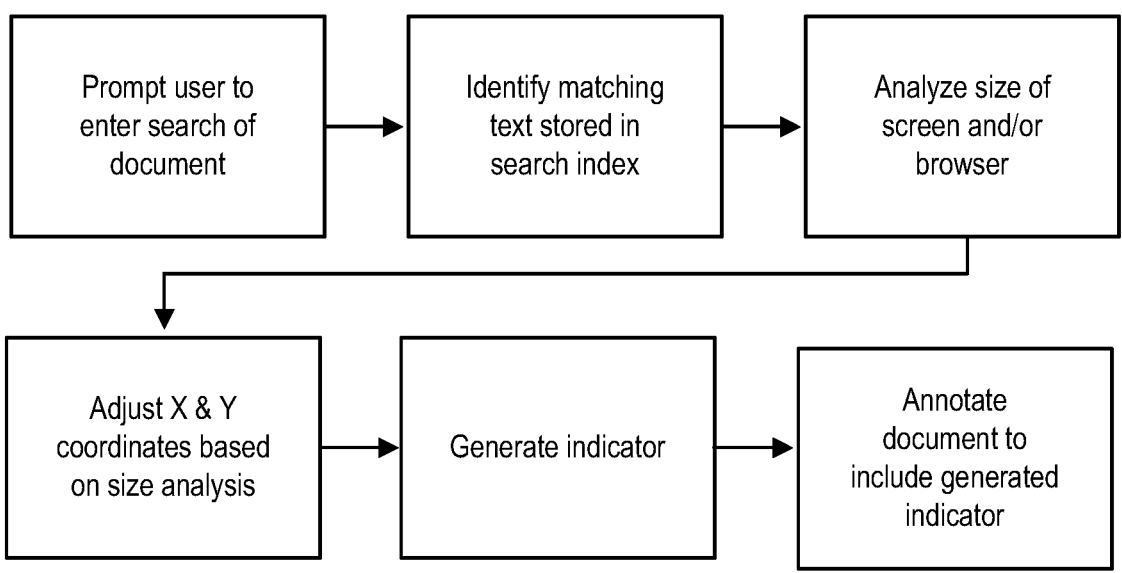
FIG. 39 depicts a searching and highlighting process for the method for CM according an exemplary embodiment.
Figure 40:
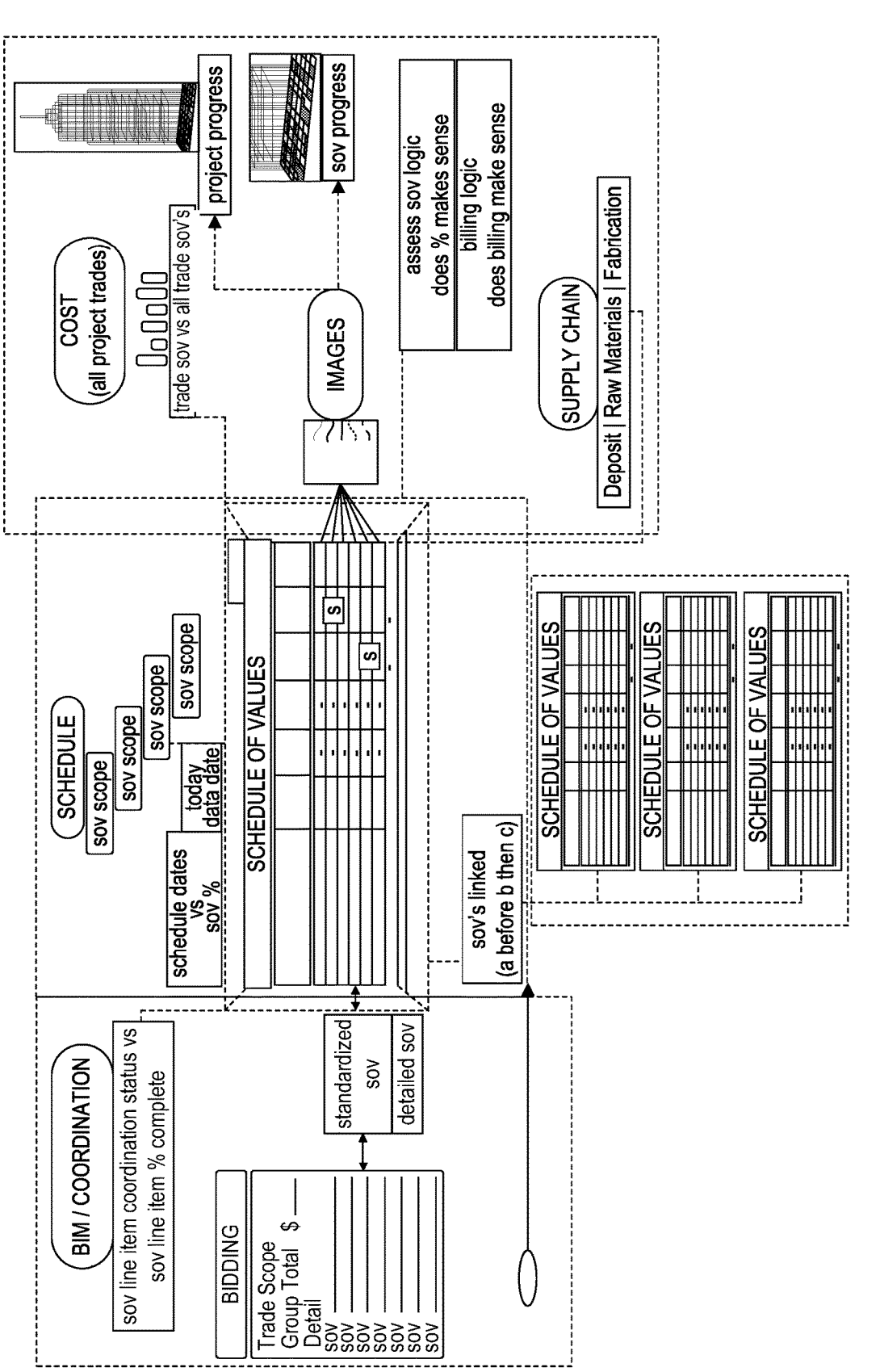
FIG. 40 depicts an architecture for the method for CM according an exemplary embodiment, including.

Referring to FIG. 1, shown is an exemplary schematic illustration of a CM system 100 for executing an exemplary CM process 200 illustrated by the block diagram shown in FIG. 2, the processes illustrated in one or more of FIGS. 38-40. The CM system 100 includes a CM server 10 in communication via a network 76 with a user device 70. In the example shown, the CM system 100 may include a project management system 56, a payment system 58, and one or more modeling systems 60 in communication with the CM server 10. The example shown in FIG. 1 is non-limiting, such that CM system 100 may be configured such that the server 10 may include the project management system 56, the payment system 58, and one or more modeling systems 60 and/or be configured to execute the functions provided by those systems. The CM system 100 may include one or more verification mechanisms 62 in communication with the CM server 10 via the network 76, for collecting and communicating one or more verification components 64 to the CM server 10 during requisitioning and verification processes as described in further detail herein.

As shown in FIG. 1, the CM server 10 includes a central processing unit (CPU) 12, which may also be referred to herein as a processor. The server 10 may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. The processor 12 receives instructions from a memory such as memory 14, a computer-readable medium, etc., and executes these instructions, thereby performing one or more processes, including one or more of the processes described herein. The computer-executable instructions may be compiled or interpreted from computer programs created using a variety of programming languages and/or technologies, including, without limitation, and either alone or in combination, Java™, C, C-HF, Visual Basic, Java Script, Perl, html, etc. Such instructions and other data may be stored and transmitted using a variety of computer-readable media. By way of non-limiting example, the memory 14 of the CM server 10 may include Read Only Memory (ROM), Random Access Memory (RAM), electrically-erasable programmable read only memory (EEPROM), etc., i.e., non-transient/tangible machine memory of a size and speed sufficient for storing a data store 18 including a data structure 26, instructions 20, data 22, and one or more data base management applications 24, which may include, for example, a relational database management system (RDBMS), a non-relational database management system, etc. The data structure 26 may include one or more data bases, data tables, arrays, links, pointers, etc. for storing and manipulating the data 22. Data 22 may include, by way of example, schedule of values data, project schedule data, bid data, cost data, modeling data including building information modeling data, verification data, change order data, etc., as required to perform the CM processes described herein.

Figures 3A, 4, 5, 6:
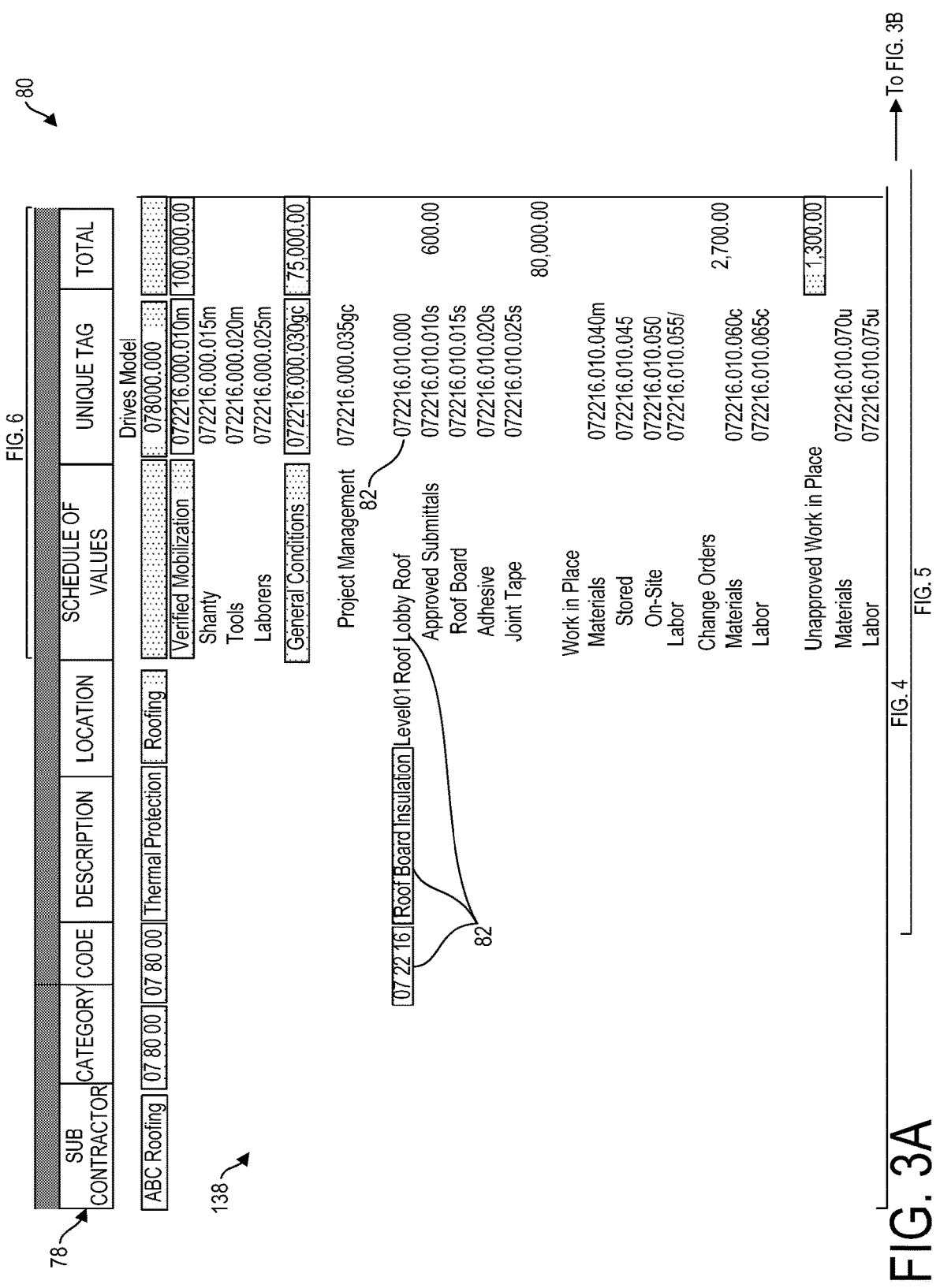
FIG. 3A provides an illustration of a first portion of an exemplary data table included in the CM system of FIG. 1.
FIG. 4 provides a detailed view of a first portion of the exemplary data table of FIG. 3.
FIG. 6 provides a detailed view of a fourth portion of the exemplary data table of FIG. 3.
Figures 3B, 4, 5, 6:
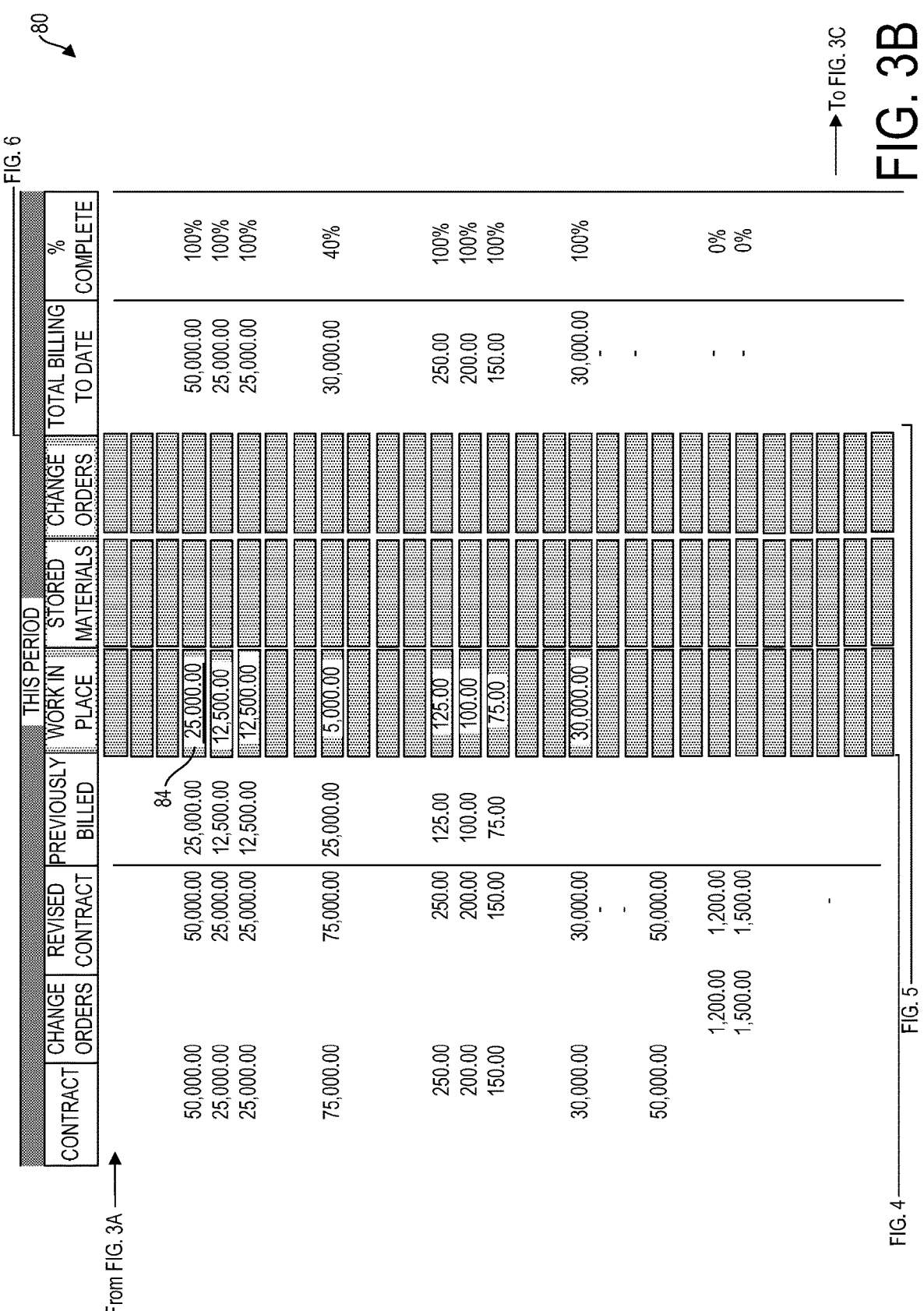
FIG. 3B provides an illustration of a second portion of the exemplary data table included in the CM system of FIG. 1.
Figures 3C, 6:
FIG. 3C provides an illustration of a third portion of the exemplary data table included in the CM system of FIG. 1.
Figure 4:
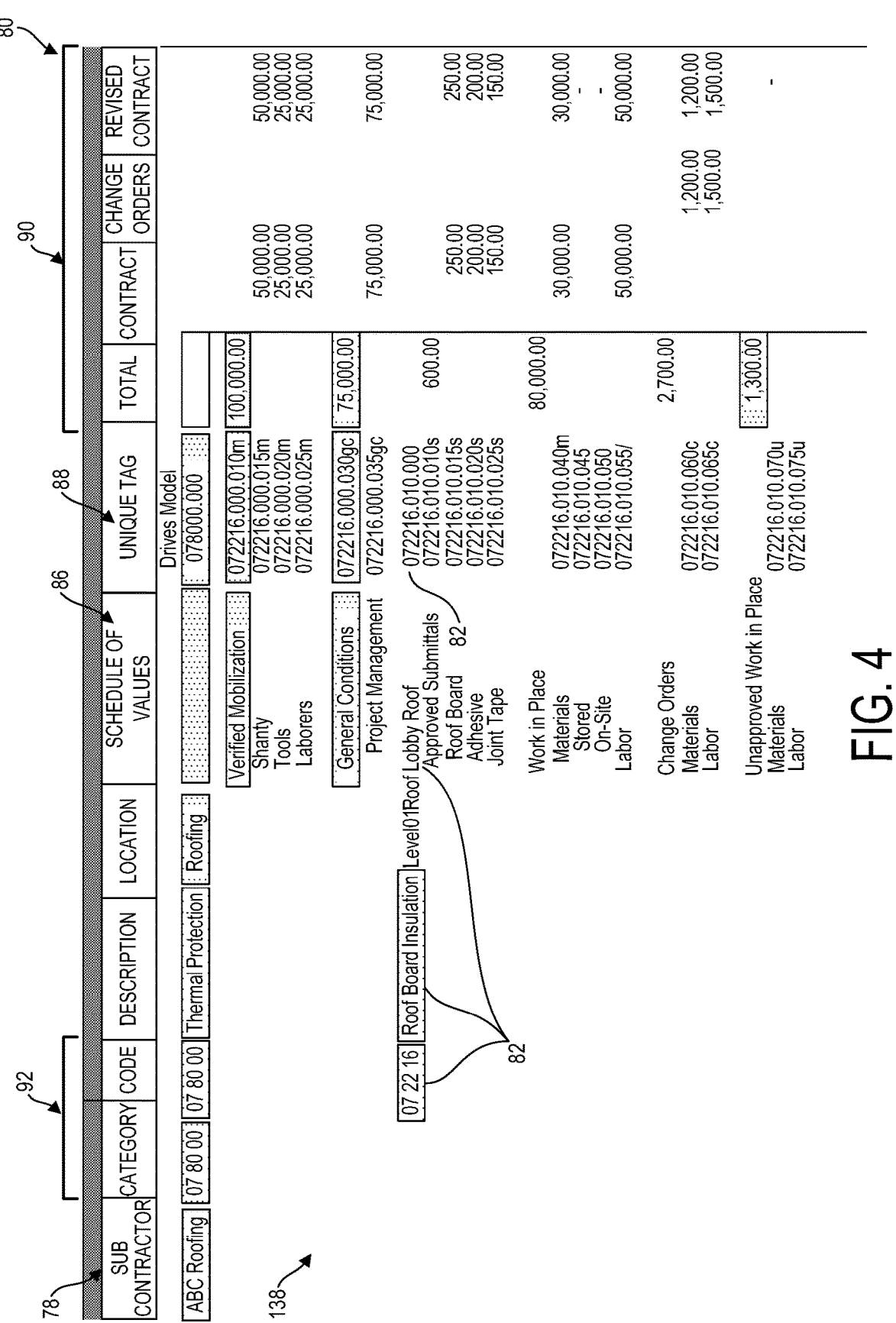
Figure 5B:
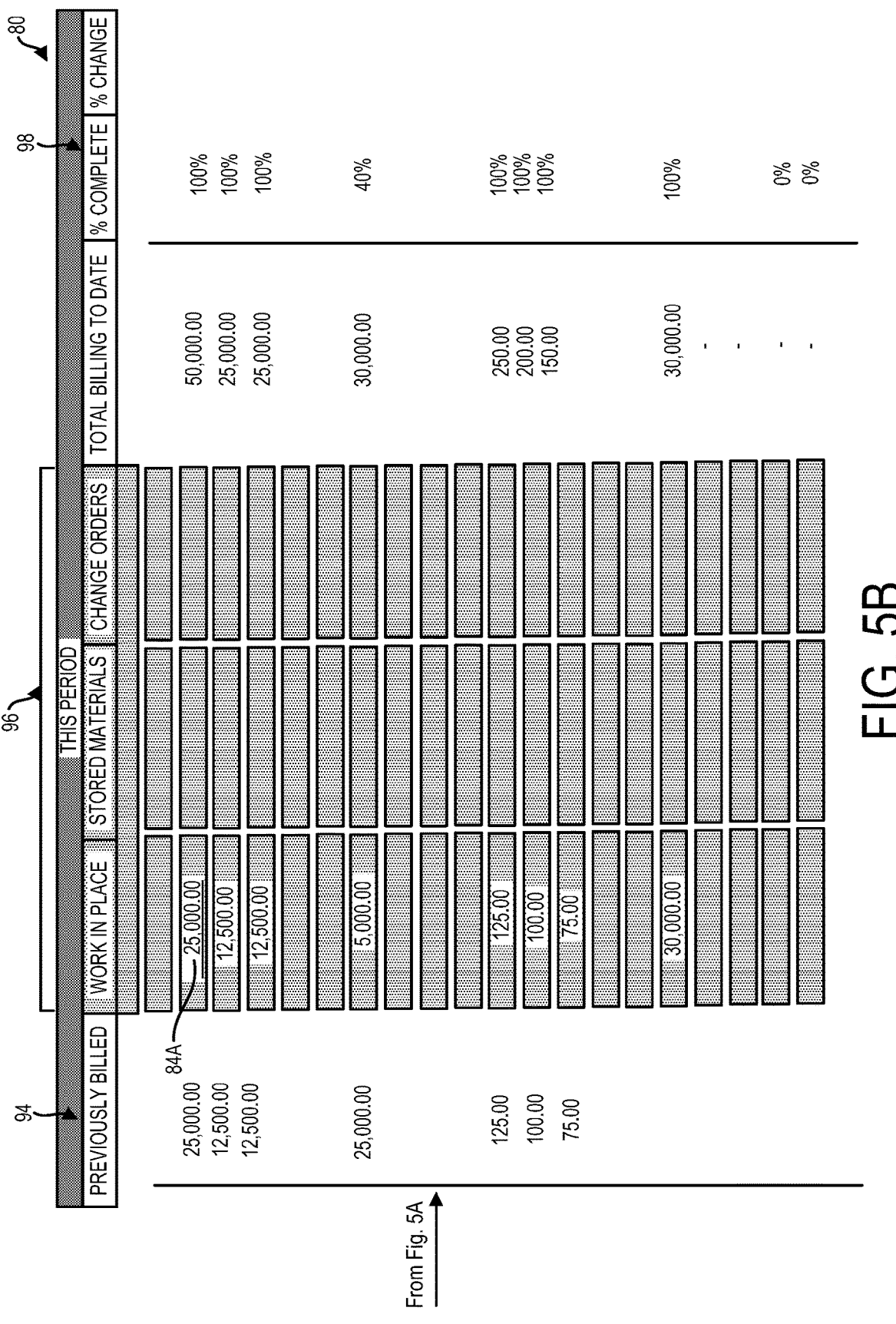
FIG. 5B provides a detailed view of a third portion of the exemplary data table of FIG. 3.
Figure 6:
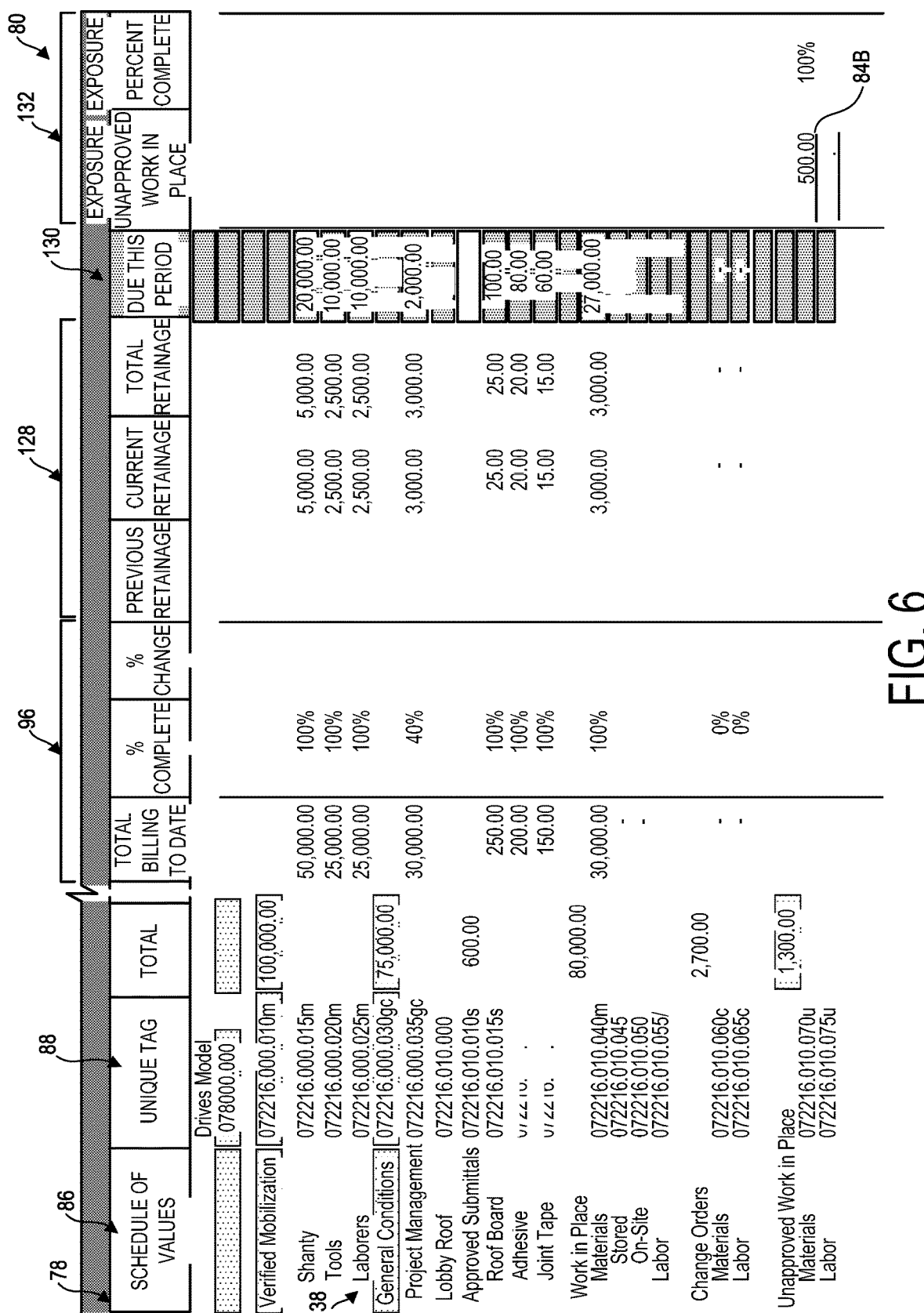

FIG. 3 shows an exemplary illustration of a portion of a data table 80 included in the data structure 26, which in the example shown stores data 22 related to a schedule of values (SOV) 104, as further described herein. The data table 80 shown in FIG. 3, for ease of illustration, is also shown in partial sections in FIGS. 4-6. The data structure 26 and/or the data base management system 24 may include one or more mapping instructions 20 and/or mapping applications for mediating the importation of data 22 into data tables such as the data table 80 shown in FIG. 3. As shown in FIGS. 3-6, the data table 80 includes a plurality of data elements 78, including a cost category and code elements generally indicated at 92, a schedule of values (SOV) description element 86, a SOV tag element 88, contract cost elements generally indicated at 96, retainage elements generally indicated at 128, etc. The data table 80 includes data fields 138 into which values 82 of each of the data elements 78 may be entered, where a value 82 of a data element 78 may also be referred to herein as a data item 82. For example, as shown in FIGS. 3-4, data items 82 "07 22 16", "Roof Board Insulation" "Lobby Roof", and "072216.010.000" are entered in data fields 138 corresponding, respectively, to data elements 78 "Code", "Description", "Schedule of Values", and "Unique Tag." In one example, the data items 82 stored in the data store 18 as data values of the one or more data elements 78 may be time stamped when received by the CM server 10, and the data item 82 and respective time stamp may be associated with each other in the data structure 26. The memory 14 is of a size and speed sufficient for manipulating the data structure 26, for executing instructions 20 and/or applications 24, and to execute instructions as required to perform the CM processes described herein. The CM server 10 includes a communication interface 16, which in an illustrative example may be configured as a modem, browser, or similar means suitable for accessing a network 76. In one example, the network 76 is the internet.

The CM server 10 may include various modules such as a bid module 28, a schedule of values (SOV) module 30, a contract module 32, a project schedule module 34, a reporting module 36, a payment module 38, a verification module 40, a requisition module 42, a change order module 44, a modeling module 46, a cost module 48, an unapproved work module 50, an inventory module 52, and an SOV tag module 54, described in further detail herein. The various modules 28, 30, 32, 34, 36, 38, 40, 42, 44, 46, 48, 50, 52, 54 may process, link and analyze different types of data, generate reports, generate models, etc., using instructions 20 which may be stored within the different modules 28, 30, 32, 34, 36, 38, 40, 42, 44, 46, 48, 50, 52, 54 and/or in the data store 18 and/or in one or more of the project management, payment and modeling systems 56, 58, 60, verification mechanisms 62, and user devices 70 in communication with the CM server 10. The instructions 20 may include, by way of example, one or more instructions 20 for generating SOV tags 88, one or more instructions 20 for linking SOV tags 88 to various data elements 78 including SOV descriptions 86 of work, contract costs 90, schedule elements, schedule times, completion statuses 98, verification components 64, one or more instructions 20 for analyzing verification components, one or more instructions 20 for performing data modeling, generating schedule recovery plans, cost exposure projections, and mitigation scenarios, generating heat maps, etc., as described in further detail herein. The examples describing the CM server 10 provided herein are illustrative and non-limiting. For example, it would be understood that the functions of the CM server 10 may be provided by a single server, or may be distributed among multiple servers, including third party servers, and that the data within the system 100 may be distributed among multiple data stores, including data stores in accessible by the CM server 10 via the network 76. For example, it would be understood that the plurality of modules shown in FIG. 1, and the distribution of functions among the various modules described herein, is for illustrative purposes, and the module functions as described herein may be provided by a single module, distributed among several modules, performed by modules distributed among multiple servers, including modules distributed on multiple servers accessible by the CM server 10 via the network 76, and/or performed by the CM server 10.

For example, the SOV tags 88 may be generated by identifying functional language from a scanned document. The SOV tags 88 may be generated by an inheritance process, i.e., analysis of a context of a given term with other terms adjacent to the given term. The SOV tags 88 may be generated by applying a unique code to each line item and/or each component within each line item (e.g., FIGS. 4 and 5). For example, the unique code may include a code for a category of construction, a code for a given work item for the category of construction, a sequential number, a code corresponding to a floor number, a code associated with the SOV, and the like. For example, the unique code for a line item associated with a verified mobilization work item may be marked with the letter "m"; the unique code for a line item associated with general conditions may be marked with the letters "gc"; the unique code for a line item associated with a work performed by a subcontractor may be marked with the letter "s"; the unique code for a line item associated with labor may be marked with the letter "l"; the unique code for a line item associated with a change order may be marked with the letter "c"; the unique code for a line item associated with unapproved work in place may be marked with the letter "u"; and the like.

The instructions 20 for analyzing verification components may include pixel data from images lined to an SOV. For example, a line item of the SOV may be associated to one or more elements of one or more image or data sources during a verification process. In some embodiments, the association is performed manually. In some embodiments, the association is assisted by machine vision. In some embodiments, the association is performed entirely by machine vision.

The CM system 100 may include one or more user devices 70 which may be in communication with one or more of the CM server 10, the verification mechanisms 62, the project management system 56, the payment system 58 and/or the modeling system 60, via the network 76. The user device 70 includes a memory 66, a central processing unit (CPU) 68 which may also be referred to herein as a processor, a communication interface 72, and one or more input/output interfaces 74. The user device 70 may be a computing device such as a mobile phone, a personal digital assistant (PDA), a handheld or portable device (iPhone, Blackberry, etc.) a notebook, laptop, personal computer, note pad or other user device configured for mobile communications, including communication with the network 76. The user device 70 is configured to communicate with the network 76 through the communication interface 72, which may be a modem, mobile browser, wireless internet browser or similar means suitable for accessing the network 76. The memory 66 of the user device may include, by way of example, Read Only Memory (ROM), Random Access Memory (RAM), electrically-erasable programmable read only memory (EEPROM), etc., i.e., non-transient/tangible machine memory of a size and speed sufficient for executing one or more CM applications which may be activated on the user device 70 including, for example, one or more user interfaces 74 (see FIGS. 7-15), as described in further detail herein. In one example, the user device 70 may be configured and used as a verification mechanism 62 for collecting verification components 64 and inputting the verification components 64 to the CM server 10 during a requisition process, as described in further detail herein. The input/output interfaces 74 of the user device 70 may include, by way of example, one or more of a keypad, a display, a touch screen, one or more graphical user interfaces (GUIs), a camera, an audio recorder, a bar code reader, an image scanner, an optical character recognition (OCR) interface, a biometric interface, an electronic signature interface, etc. input, display, and/or output, for example, data as required to perform elements of the CM process 200. The example shown in FIG. 2 is non-limiting, such that it would be understood that the CM system 100 may include multiple user devices 70. each in communication with the network 76 and one or more of the verification mechanisms 62 and project management, payment, and modeling systems 56, 58, 60. For example, the system 100 may include user devices 70 used by one or more users related to the project, as described in further detail herein, where users accessing the CM system 100 may include for example, contractors, suppliers, project managers, etc., directly involved with completion of the project, and may include users monitoring, related to or otherwise involved in the project, such as managers, investors, inspectors, etc.

Referring to the CM server 10 shown in FIG. 1, in one example, the bid module 28 may be configured to receive bid proposals 102 submitted to the CM system 100 by contractors bidding to perform work on a construction project. The bid module 28 may include instructions 20 for parsing, formatting, and storing bid information from bid documents 102 comprising each bid proposal 102, where the bid information may include, by way of non-limiting example, work descriptions 86, also referred to herein as SOV descriptions 86 of the specific work, materials, labor, general conditions, etc. included in the bid proposal 102, the proposal cost for each SOV description 86 included in the bid proposal 102, and the proposal time, e.g., the total time proposed by the contractor to complete the scope of work included in the bid proposal. As indicated previously herein, the terminology "document" is intended to be non-limiting, such that a bid proposal 102 may include paper documents, electronic documents, electronic data inputs, and/or a combination thereof. For example, the bid proposal 102 may include a paper document inputted, e.g., scanned or uploaded, to the CM server 10 and parsed using, for example, object character recognition technology to obtain the bid information from the bid document 102. The bid proposal 102 may include an electronic bid document generated using a fillable format or by inputting information into a bid portal in communication with the CM server 10 and configured for that purpose, etc. The bid module 28 may include instructions 20 for processing notifications to contractors of the acceptance or rejection of a bid proposal 102, and for processing the bid information from bid proposals 102 accepted for a construction project for integration into the project SOV 104, contract 106, project schedule 108, etc. within the CM system 100. In one example, the bid module 28 may be configured to store contractor information to the data store 18 including, for example, contractor contact information, license information, insurance information, trade designations, etc. The term "contractor" as used herein, is intended to include any entity which is contracted to provide labor, materials, goods, and/or services under a contract 106 associated with a project managed using the CM system 100. By way of example, a "contractor" as that term is used herein, may include one or more of a building contractor, trades contractor such as an electrical contractor, HVAC contractor, plumbing contractor, painting contractor, etc., a supplier such as a materials supplier, equipment supplier, tooling supplier, a vendor where the terms vendor and supplier may be used interchangeably unless described otherwise, a project manager, a program manager, and/or a consultant such as a planning consultant, architect, environmental specialist, etc. as may be needed to contribute work required to complete the project.

The schedule of values (SOV) module 30 is configured to generate a schedule of values (SOV) 104 using, for example, one or more instructions 20 and data 22 including, for example, a plurality of SOV descriptions 86, where each of the SOV descriptions 86 describes a specific work element to be performed under the SOV. The term "work element" is not limited to labor, and may include materials, planning, etc. An SOV description 86 may describe, for example, a constructed item (roof, floor, lighting), materials, labor, planning, project management, general conditions, etc. Further, an SOV description 86 is not limited to current conditions. By way of example, an SOV description 86 may describe work elements (labor, materials, planning, etc.) of a project which have been performed, present work in the process of being performed, future work yet to be performed, and may further include pending, approved and/or unapproved change orders and/or unapproved work in place. Each SOV description 86 may be associated with a work code and cost category, as indicated at 92 in FIGS. 3 and 4. In a non-limiting example, the work code and cost category for each of the SOV descriptions 86 may be designated using the MasterFormat® code listing published by the Construction Specifications Institute (CSI)). The SOV module 30 may access a data structure 26, such as the data table 70 shown in FIGS. 3-6, containing data 22 for use in generating the SOV 104. The SOV module 30 may include instructions 20 for generating an initial SOV 104 at the initiation of a construction project, and for periodically generating a current SOV 104 as the construction project progresses, where the current SOV 104 includes the then current SOV data 22 which has been received by the CM server 10 and stored to the data table 70 and/or the data structure 26. The current SOV data 22 may include data indicating the percent completion 98 of each SOV description 86, costs previously billed 94, costs incurred in the current period 96 (not previously billed), change order data (see 90), and/or unapproved work in place 132. In one example, the SOV 104 generated by the SOV module 30 may be generated in a format substantially similar to American Institute of Architects (AIA) Document G703TM. In another example, the SOV 104 generated by the SOV module 30 may be configured as shown by the data table 70, including for example, data elements relating to change orders and unapproved work in place. In one example, the SOV module 30 may generate the SOV 104 for display via a user interface 74 of a user device 70. The SOV module 30 may include instructions 20 for linking verification data to one or more of a data element 78, data field 138 and/or individual data item 82 of the SOV 104, and for generating links 84 in the displayed SOV 104 such that a user viewing the SOV 104 on a user device 70 may activate a link to view the linked data 22, where the linked data 22 may be displayed for convenient viewing, for example, in a pop-up window, a new window, as an annotation or label, etc. In a non-limiting example shown in FIG. 5, the "Work in Place" cost entry of $25,000 is linked via a link 84A, which in this example is configured as a hyperlink, to a verification component 64 showing completion of the SOV description "Shanty". In this illustrative example, the verification component 64 is a digital photograph 64A (see FIG. 11) of the completed "Shanty". In one example, the SOV module 30 may include a user menu for display to a user, from which the user may select one or more parameters for generating the SOV 104, including, for example, selecting from various SOV formats, selecting the time period for which the SOV 104 should be generated (such as the initial SOV, the SOV as of date xx-yy-zzzz, the current SOV, etc.). As described in further detail herein, the SOV module 30 may include instructions 20 for generating the current SOV 104 in real time, e.g., using the current data

22 stored in the data store 18 at the time the request for the current SOV 104 is inputted to the CM server 10.

The SOV 104 may include, as shown in FIGS. 3-6, a unique tag 88, also referred to herein as an SOV tag 88, generated by the SOV tag module 54 for each SOV description 86 included in a SOV 104. Each SOV tag 88 is unique to a single SOV description 86. For example, referring to FIG. 4, the SOV description "Shanty" has been assigned the unique SOV tag "072216.000.010m", the SOV description "Tools" has been assigned the unique SOV tag "072216.000.015m", and so on. Each SOV description 86 and its assigned SOV tag 88 are associated and stored in a data structure 26. In one example, the SOV description 86 and its assigned SOV tag 88 may be paired and stored in the data structure 26 as a SOV description-tag pair. The SOV tag module 54 includes one or more instructions 20 to generate a unique SOV tag 88 for association with a particular (single) SOV description 86. The SOV tag module 54 and/or the data base management applications 24 may include instructions 20 for associating the unique SOV tag 88 with the data item 138 (data value) of each data element 78 associated with the particular SOV description 86 to which the unique SOV tag 88 is assigned. Referring again to the example shown in FIGS. 3-6, the unique SOV tag "072216.000.010m" assigned to the particular SOV description "Shanty" is additionally associated in the data structure 26 with other data items 138 associated with the particular SOV description "Shanty", including, referring to data table 70 in FIG. 3, the data item 138 "ABC Roofing" (e.g., the data value associated with the SOV description "Shanty" for the data element "Subcontractor"). Similarly, the unique SOV tag "072216.000.010m" is associated with (reading across table 80 from left to right as shown on the page) "07 80 00", "07 80 00", "Thermal Protection", "Roofing", "50,000.00", "50,000.00", "25,000.00", "25,000.00", "50, 000.00", "100%", "5,000.00", "5,000.00", "20,000.00". The SOV tag module 54 may include one or more instructions 20 to associate each unique SOV tag 88 with other data specifically associated with the particular SOV description 86 to which the unique SOV tag 88 is assigned, where the other data may include, for example, project schedule data, contract costs, contract terms, modeling data including heat map and BIM data, verification data, etc. In the present example, the SOV tag module 54 may associate the unique SOV tag "072216.000.010m" assigned to the particular SOV description "Shanty" in the data structure 26 with a link 84A (see FIG. 5) which links the data item "25,000.00" (e.g., the value of the "Work in Place" data element for the "Shanty") to a verification component 64, which in the present example is a digital photograph 64A (see FIG. 11) submitted as a verification input 112 for the "Shanty" SOV description 86. The SOV tag module 54 may associate the unique SOV tag "072216.000.010m" assigned to the particular SOV description "Shanty" in the data structure 26 with the digital photograph 64A, thereby integrating the verification input 112 (the digital photograph 64) with the SOV 104 in the data structure 26. By way of example, the SOV tag module 54 further includes instructions 20 to associate the unique SOV tag "072216.000.010m" assigned to the particular SOV description "Shanty" to other data items 82 in the CM system 100, including associating, for example, unique SOV tag "072216.000.010m" to the contract 106 which includes the SOV description "Shanty" within its scope of work, to one or more schedule elements (tasks and/or activities) and schedule times in the project schedule 108 associated with the SOV description "Shanty", to one or more BIM elements associated with the SOV description "Shanty" in a BIM 160 of the construction project, to change orders 118 associated with the SOV description "Shanty", to unapproved work in place 122 associated with the SOV description "Shanty", and so on, such that information and data associated and/or affected by the SOV description "Shanty" is integrated in the data structure 26 and reconciled, e.g., aligned between the SOV 104, the project schedule 108, the contract 106, requisitions 114, verifications (either rejected or accepted) 116, verification input 112, models 124 including BIMs 160, reports 120 including heat maps 160, payments 126, bid documents 102, etc. By tagging, in the data structure 26, the various data items 82 related to a particular SOV description 86 in the various sub-systems of the CM system 100 with a unique tag 88, to associate the related data items 82 to the particular SOV description 86, the various sub-systems are integrated such that a change in the tagged data items 82 in any of the sub-systems which affects a tagged data item 82 in another of the sub-systems may be inputted and/or made in real time, thereby providing for real time updating of each of the SOV 104, project schedule 108, models 124 including BIM 160, reports 120, contracts 106 including contract costs, contract terms, etc., providing for real time reconciliation of data between and across the various sub-systems, and providing for real time reporting of the project status. As such, the CM system 100 described herein is advantaged by substantially minimizing and/or eliminating delay associated with delays in reporting and/or verifying the current status of a construction project, such that the project status may be reviewed in real time, and corrective and/or mitigation actions to minimize deviations from the project schedule 108, contract cost, etc. may be identified and implemented in a timely and expedient manner, e.g., at the earliest possible time.

The CM server 10 may include a contract module 32, which may include one or more instructions 20 for generating a contract 106 using data 22 from the data store 18. The contract 106 may include, for example, SOV descriptions 86, contract costs and contract times for each of the SOV descriptions 86, retainage terms, contractor information, change order information, requisition and verification requirements, etc. Certain terms of the contract 106, including for example, contract cost, contract time, or other terms such as delivery requirements, specifications, etc., may be linked to one or more SOV tags 88, such that the contract term linked to the SOV tag 88 may be associated in the data store 18 with the SOV description 86 associated with that SOV tag 88. The contract module 32 may include instructions 20 for generating an initial contract 106 at the initiation of a construction project which includes the contract sum, e.g., the total of contract costs for all SOV descriptions 86 included in the initial contract 106, and the contract time. The contract module 32 may include instructions 20 for periodically generating a current contract 106 as the construction project progresses, where the current contract 106 includes the then current contract data 22, including change orders 118, the then current contract sum including the cost of all current change orders 118, and the then current contract time including time adjustments, for example, associated with change orders 118 which have been received by the CM server 10 and stored to the data table 70 at the current time. The contract module 32 may be configured to access other modules, such as the change order module 44, the project schedule module 34, the requisition module 42, and the payment module 38, to obtain information and/or data 22 required to generate the initial contract 106 and/or a current contract 106.

The contract module 32 may include a master contract. The master contract may serve as hierarchically superior to other modules. For example, terms used in the master contract may be required or prompted in subordinate modules including, for example, the change order module 44 or the requisition module 42.

A project schedule module 34 is included in the CM server 10, and is configured to generate a project schedule 108 for the construction project being managed by the CM system 100. The project schedule module 34 may include one or more instructions 20 for identifying schedule elements, e.g., tasks and activities, for inclusion in the project schedule 108 using the SOV descriptions 86 included in the SOV 104. Generating the project schedule 108 may include identifying dependencies between the tasks and activities and assigning a schedule time to each schedule element, e.g., to each task and activity included in the project schedule 108, then ordering and scheduling the identified tasks and activities to generate the initial project schedule 108. The project schedule module 34 may include instructions 20 for generating an initial project schedule 108 at the initiation of the construction project, then periodically generating a current project schedule 108 as the construction project progresses, where the current project schedule 108 may include the then current contract time data, schedule elements, schedule times and dependencies added and/or modified as a result of change orders 118, status reporting of each schedule element such as on time, late, not started, etc. In one example, the project schedule module 34 may include instructions 20 for integrating unapproved work in place and dependencies resulting therefrom into the current project schedule 108, such that the impact of the unapproved work in place on the project timeline may be analyzed and/or reported. The project schedule module 34 may be configured to access other modules, such as the change order module 44, the requisition module 42, the verification module 40, the inventory module 52, and the unapproved work module 50, to obtain information and/or data 22 required to generate the project schedule 108. In one example, the project schedule module 34 is in communication with a project management system 56 via the network 76, where the project management system 56 is configured to generate the project schedule 108 in response to instructions generated by the project schedule module 34. The project management system 56 may be a third party system, such as Microsoft Project, Primavera P6 from Oracle, etc., which may be used to generate the project schedule 108. The project schedule module 34 may include instructions 20 for integrating the project schedule 108 and/or the related project schedule data generated by the project management system 56 with other modules in the CM system 100 and into the data structure 26.

Figure 17:
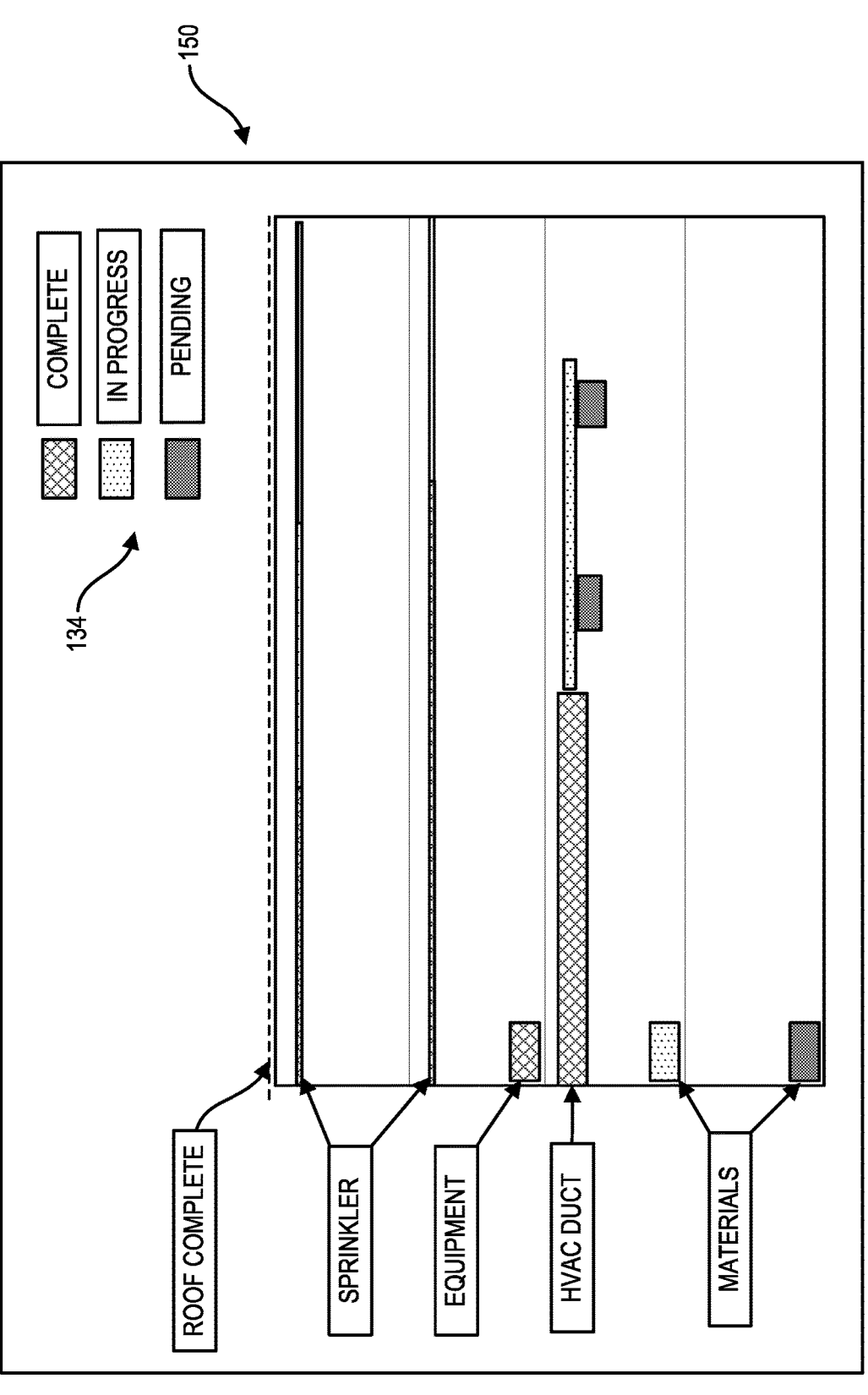
FIG. 17 provides a schematic illustration of a heat map of a construction worksite generated by the CM system of FIG. 1 and showing a current project status of the construction worksite.
Figure 18:
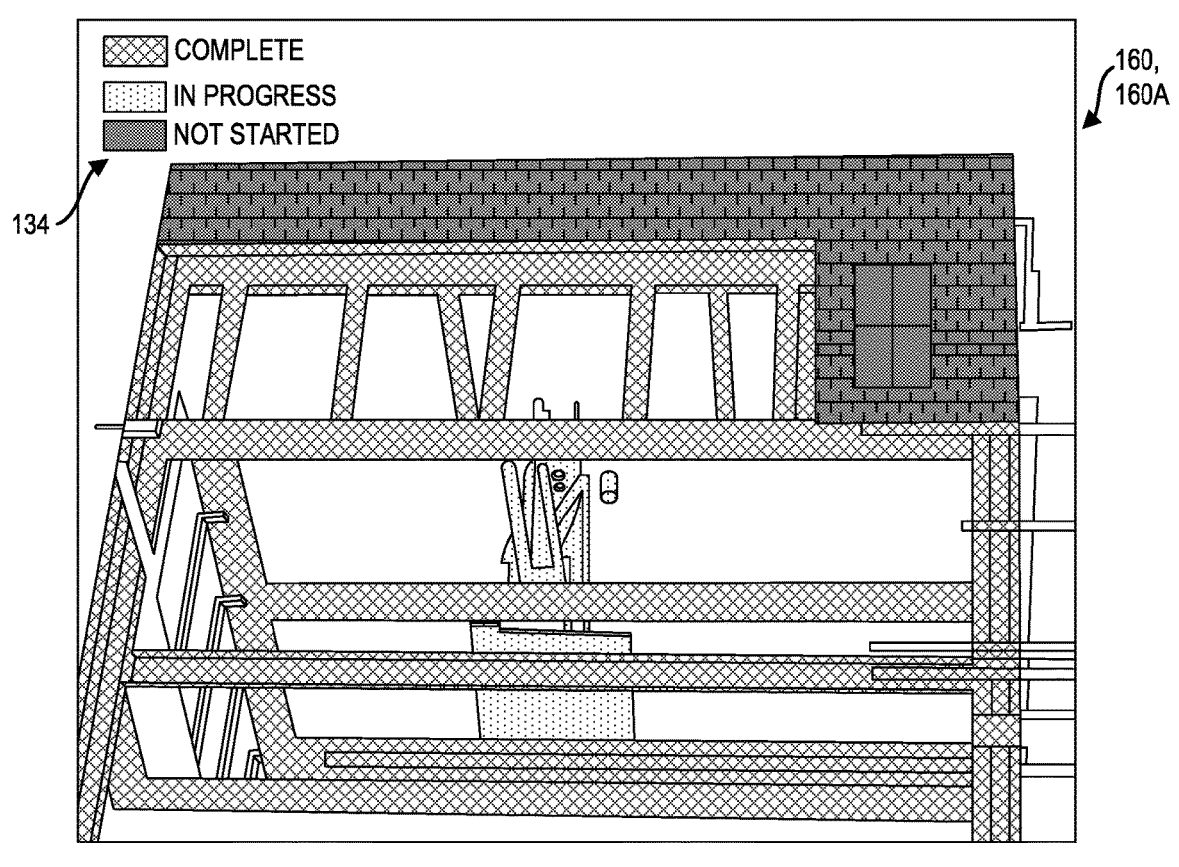
FIG. 18 provides a schematic illustration of a building information model (BIM) including a heat map generated using the CM process of FIG. 2.
Figure 19:
FIG. 19 provides an illustration of a holographic BIM generated using the CM process of FIG. 2.

The reporting module 36 may include one or more instructions 20 for compiling, generating, and outputting reports which may include project status reports, which may be generated in various formats including modeled outputs and for various parameters such as, by way of non-limiting example, project timing, project cost, percent completion of SOV descriptions 86, etc. The reporting module 36 may access other modules and the data store 18 to obtain data 22 and information required to generate a report. In one example, the reporting module 36 is in communication with the modeling module 46 and/or one or more modeling systems 60 via the network 76, where the modeling module 46 and/or the modeling system 60 is configured to generate a report 120 in response to instructions provided by the reporting module 36. By way of example, the report 120 may indicate the status of the construction project at a designated time which may be a time corresponding to a specific date xx-y-zzzz or may be a current time. In one example, the reporting module 36 is configured to generate a current report 120 in real time, such that the current report 120 is compiled using the then current data 22 available in the CM system 100 and/or in the CM server 10, which may include, as described in further detail herein, verification data received via the CM server 10 from a verification mechanism 62 in real time. The reporting module 36 may include instructions 20 for generating a report 120 in a heat map format, as shown in non-limiting examples illustrated by FIGS. 17 and 18, which may be graphical and/or multi-dimensional heat maps. FIG. 17 shows a schematic heat map 150 generated by building level. As shown in FIG. 18, the report 120 may include a heat map 150 imposed on a model 124, such as a BIM 160 of the construction project, to display the parameter status in a multi-dimensional format, where this reporting format may also be described herein as a BIM heat map 160A. The reporting module 36 and the modeling module 46 may be configured to update and/or generate the BIM heat map 160A in real time as current verification inputs are received by the CM server 10, such that a current report 120 may be generated in this format for reporting, review, and analysis of the project status in real time. In the examples shown in FIGS. 17 and 18, a key 134 is provided to identify the status condition, e.g., "Complete", "In Progress", and "Pending" corresponding to the color displayed on the heat map 150. In one example, the reporting module 36 in combination with the modeling module 46 may generate a model 124 such as the holographic BIM 160B shown in FIG. 19, which may be configured to visually display, e.g., report certain parameter conditions. For example, the holographic BIM 160B may be configured to display only those portions of the project structure which are currently completed, excluding uncompleted elements, such that, for example, uninstalled plumbing, HVAC, electrical, drywall, unconstructed floors of a building, would be missing from the holographic BIM 160B. In one example, a heat map report may be imposed on the holographic BIM 160B to visually display project status using color codes.

The payment module 38 may include one or more instructions 20 for determining the amount of payment due to a contractor for work performed in a current period 96, in response to a requisition 114 submitted by the contractor to the CM server 10 and verification input 112 submitted to the CM server 10 related to the requisition 114. The payment module 38 may access other modules such as the contract module 32, verification module 40, requisition module 42, change order module 44, cost module 48, inventory module 52, and the data store 18 to obtain information for determining the amount of payment due to the contractor for work performed in the current period 96, and may generate, for example, a payment authorization to a payment system 58, such as a bank or other financial institution, to issue payment to the contractor, and may generate a payment notification to the contractor notifying the contractor of the payment amount authorized. In one example, the payment system 58 may be a financial institution such as a bank, credit union, finance company, etc., in communication with the CM server 10 such that the payment system 58 may receive and execution payment authorizations and/or instructions from the CM server 10.

The verification module 40 includes one or more instructions 20 for receiving, reviewing, and analyzing verification input 112 received by the CM server 10, which may include various verification components 64 collected via one or more verification mechanisms 62, and collected and inputted to the CM server 10 in conjunction with a requisition 114 and/or at intervals during progress of the construction project, such that the verification data 22 may be continually updated during the duration of the construction project to facilitate real time reporting of the current conditions and current completion status 98 of the various SOV descriptions 86. The verification module 40 may include instructions 20 for determining whether the verification component 64 inputted to the CM server 10 is acceptable to verify the current completion status 98 of a respective SOV description 86 associated with the verification component 64, and may generate an acceptance or rejection of the verification component 64. By way of example, the verification module 40 may be configured to determine whether a verification component 64 is acceptable to verify the current completion status 98 of a respective SOV description 86 by one or more of viewing, e.g., reviewing, the verification component 64, comparing the verification component 64 to a verification standard, where the verification standard may include data 22 stored in the data store 18, and applying a verification instruction engine 20 to the verification component 64. In one example, the verification module 40 may include instructions 20 for reviewing, interpreting, and/or analyzing verification component data such as measurements, signals, sensor outputs, bar codes including quick response (QR) codes, photogrammetry data, thermal data, audio data, imaging data, radio frequency identification (RFID) data, etc., which may be received from one or more verification mechanisms 62.

The verification instruction engine 20 may be configured to apply tags to a scanned document based on a comparison with a verification database. For example, the scanned document may be support documents (or backup documents) to support a contention by a subcontractor that a work item is 100% complete. The verification instruction engine 20 may be configured to compare each item in a schedule of values (SOV) with evidence from one or more support documents. The user may be prompted to compare the item in the SOV with the evidence provided in support and prompted to approve or disapprove the line item.

In one example, the verification module 40 and/or instructions 20 may further include one or more artificial intelligence (AI) tools and/or AI applications which may be used by the verification module 40 to review and disposition a verification component 64 as being acceptable to verify the current completion status 98 of a respective SOV description 86 associated with the verification component 64. By way of non-limiting example, the AI tools and/or AI applications which may be used by or included in the verification module 40 may include one or more of image recognition, image processing, optical character recognition, optical mark recognition, including signature recognition, speech recognition, biometric recognition, automated reasoning, automated target recognition, fuzzy logic, machine learning, knowledge reasoning, computer vision, artificial general intelligence (AGI), rule-based AI, etc. The data store 18 and/or the verification module 40 may include instructions 20 for associating a respective verification component 64 with a respective SOV description 86 and/or a respective SOV tag 88 associated with the respective SOV description 86.

The requisition module 42 may include one or more instructions 20 for generating, receiving, reviewing, analyzing, and/or dispositioning requisitions 114 submitted, for example, by contractors applying for payment for work completed within a current requisition period. The requisition 114 may include, by way of non-limiting example, contract information identifying the contract 106 for which payment is being requested, the requisition period, e.g., the period of time in which the work was completed for which payment is being requested in the requisition 114, the original contract sum, e.g., the sum total of the initial contact costs (see FIG. 5 at 90) of the SOV definitions 86 within that contractor's contract 106, the sum total of costs of change orders (see FIG. 5 at 90) approved for that contractor's contract 106, the sum total of work completed under the contract 106 (see FIG. 5 at 98), retainage for work and materials completed (see FIG. 6 at 128), the total amount earned under the contract 106, the previous amount paid to the contractor under the contract 106, and the current amount of payment (see FIG. 6 at 130) for current work completed (see FIG. 5 at 96) being applied for by submission of the requisition 114. In one example, the requisition 114 may include an SOV identifier which identifies the particular SOV 104 included in the contract 106, and/or the particular SOV descriptions 86 which are included within the contract 106. As previously described herein, the contract 106 may be associated with each of the particular SOV descriptions 86 included in the contract 106 via the SOV tags 88 assigned to each of the particular SOV descriptions 86 included in the contract 106. The requisition 114 may include a certification statement for signature by the contractor, and the contractor's signature. In one example, a notarization or other authentication of the contractor's signature may be included in the requisition. In one example, the requisition 114 may be in a format substantially similar to AIA Document G702TM. This example is non-limiting, and other formats or combinations of data and information may be included in the requisition 114. For example, the requisition 114 may include the total exposure cost of unapproved work in place (see FIG. 6 at 132) and/or the total cost of pending unapproved change orders, the total cost of materials on order and not yet received, and/or other such data as may be useful in reporting, determining, modeling, analyzing and/or mitigating exposure to changes and/or overruns in the total project cost and/or changes and/or delays to the project schedule. In one example, the requisition module 42 may include one or more instructions 20 for generating a waiver for submission with and/or incorporated into the requisition 114, and/or may be configured to receive a waiver submitted by the contractor with the requisition 114. The waiver, for example, may be a conditional waiver and release upon payment of the requisition 114, to release the contractor's rights to lien, etc., for labor and service provided and equipment and material delivered which has been paid for as claimed through the requisition 114, or may be in other forms including, for example, an unconditional waiver, as may be required by the contract 106. In one example, the requisition 114 and/or the waiver includes identifying information such as contract information, SOV information, etc., such that the requisition 114 and/or the waiver may be associated in the data store 18 with at least one SOV tag 88 assigned to a respective SOV description 86 related to the requisition 114 and/or waiver.

Figure 7:
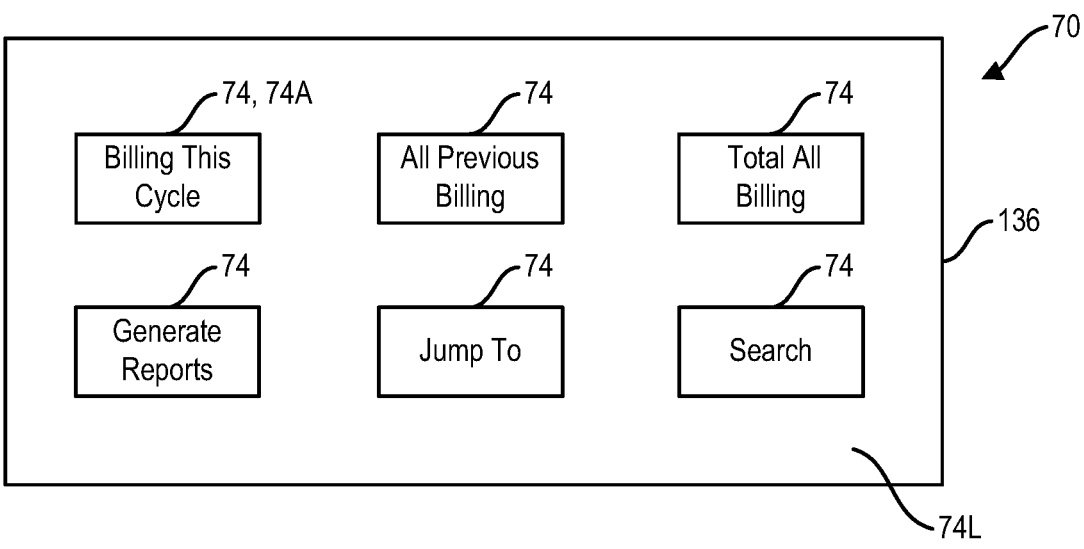
FIG. 7 provides a schematic illustration of a user device of the CM system of FIG. 2, the user device displaying at least one exemplary user interface (UI) element.
Figure 8:
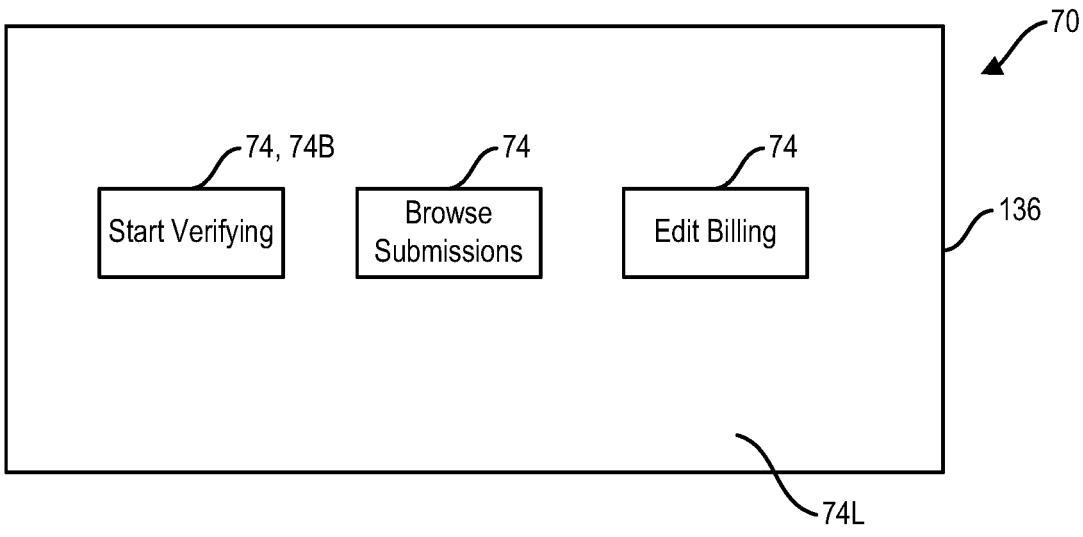
FIG. 8 provides a schematic illustration of the user device of FIG. 7, the user device displaying another exemplary UI element.
Figure 9:
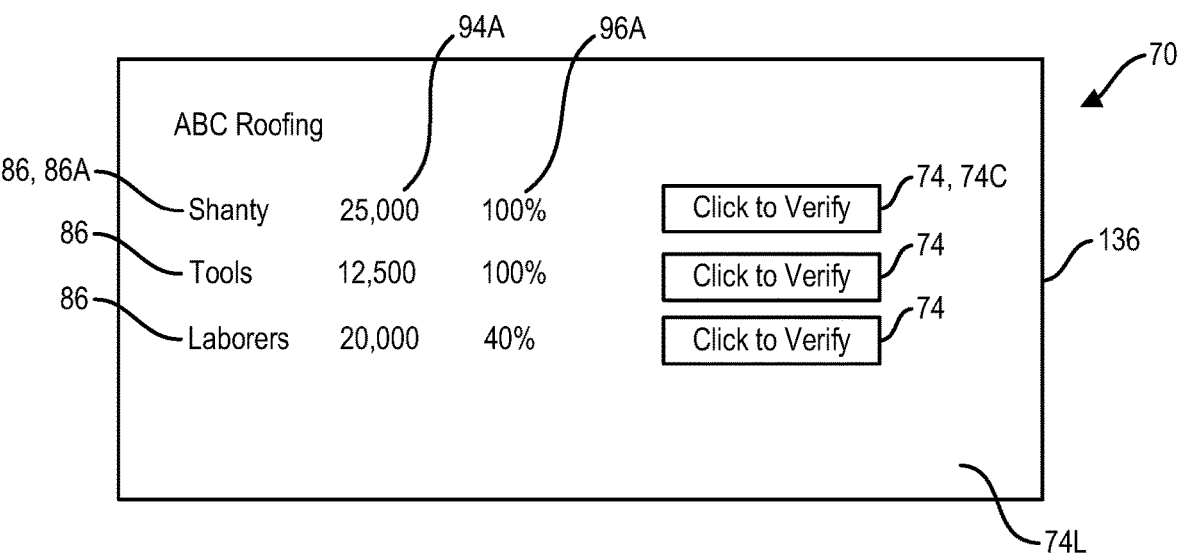
FIG. 9 provides a schematic illustration of the user device of FIG. 7, the user device displaying another exemplary UI element.
Figure 10:
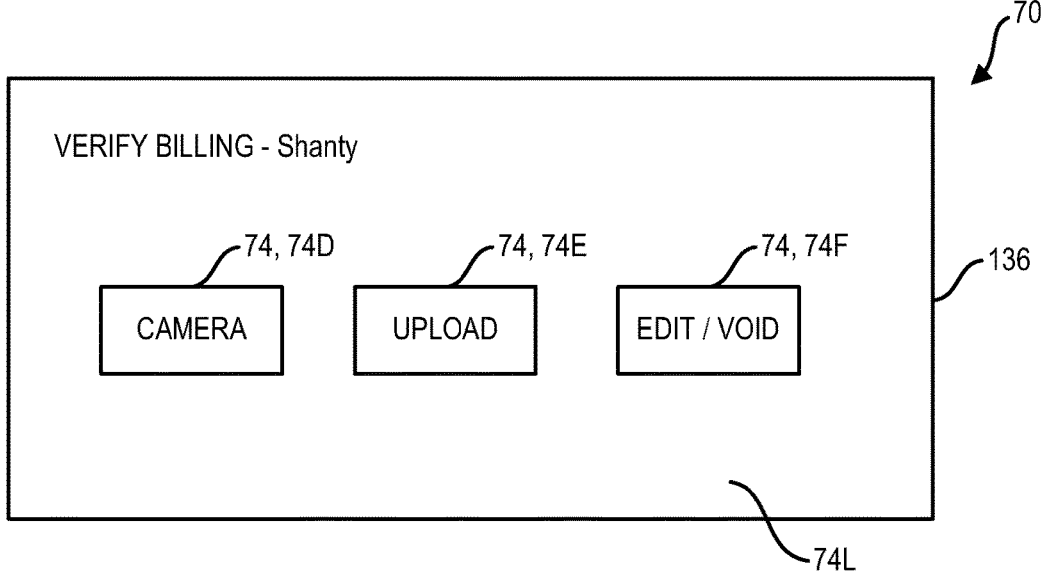
FIG. 10 provides a schematic illustration of the user device of FIG. 7, the user device displaying another exemplary UI element.
Figure 11:
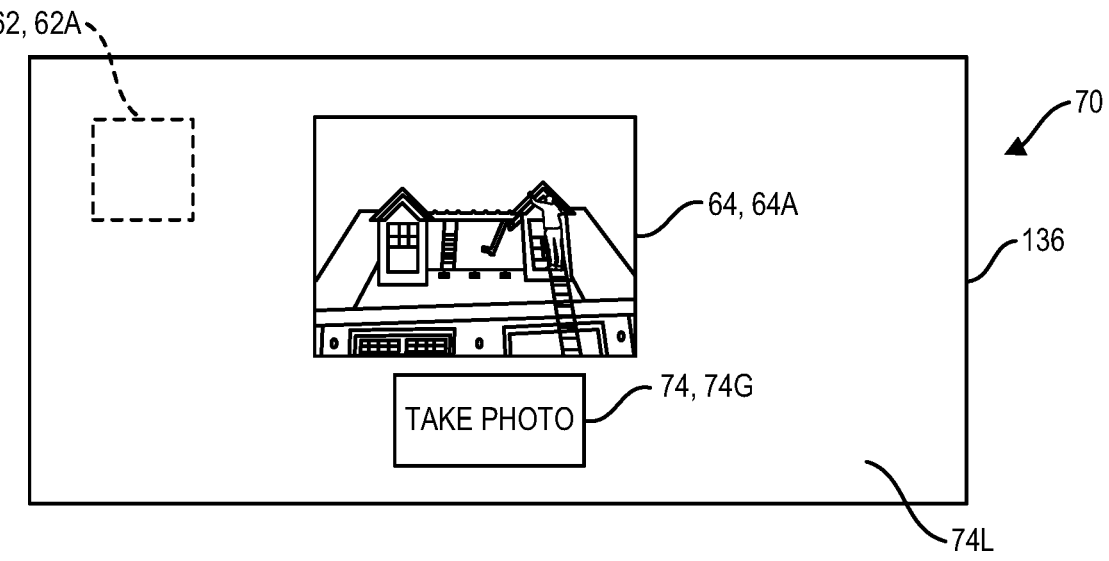
FIG. 11 provides a schematic illustration of the user device of FIG. 7, the user device displaying another exemplary UI element, a verification mechanism configured as a camera, and a verification component configured as a digital photograph.
Figure 12:
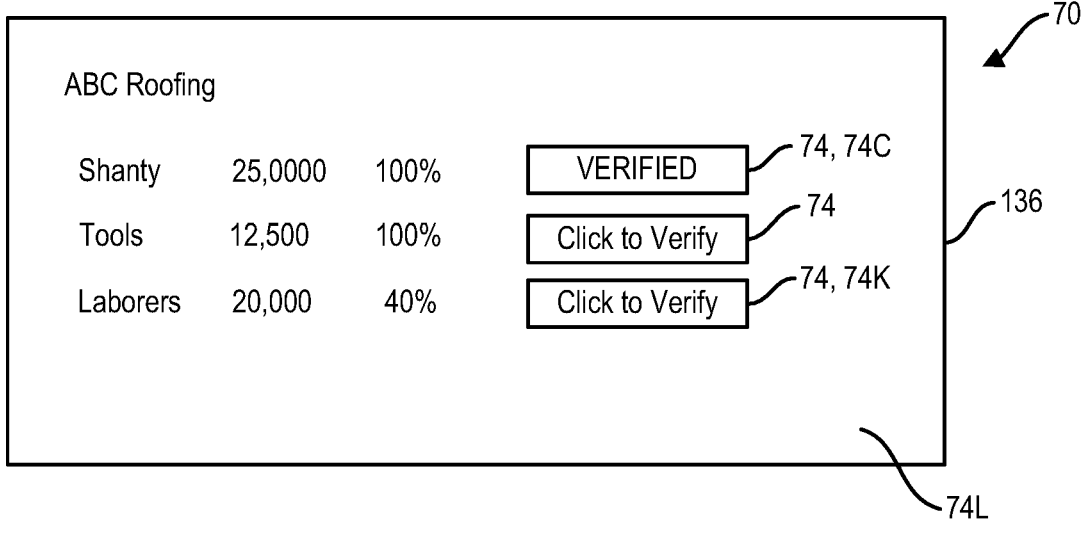
FIG. 12 provides a schematic illustration of the user device of FIG. 7, the user device displaying another exemplary UI element.

In one example, the requisition 114 may be submitted to the CM server 10 contemporaneously with submission of a current SOV 104 and/or contemporaneously with submission of verification inputs 112 corresponding to the work completed in the requisition period for which payment is being requested. In another example, the verification inputs 112, comprising one or more verification components 64, may be submitted to the CM server 10 in advance of submitting the requisition 114, such that the when the requisition 114 is submitted to the CM server 10 and/or the requisition module 42, the requisition module 42 associates the requisition 114 with the verification inputs 112 stored in the data store 18, and/or accesses the verification components 64 components associated with the requisition 114 in the data store 18 for use by the requisitioning module 42 in determining the verification status for each claim for payment of current work included in the requisition 114. In one example, the SOV 104 may be continuously updated in real time, such that SOV 104 stored in the data store 18 at the time the requisition 114 is submitted is a current SOV 104 which may be retrieved by the requisition module 42 for use in processing the requisition 114. As previously described, verification components 64 submitted to the CM server 10 as verifying one or more of the SOV descriptions 86 in the SOV 104 are linked via SOV tags 88 to the SOV descriptions 86, such that, in this example, upon receipt of the requisition 114, the requisition module 42 is prompted to retrieve from the data store 18 the current SOV 104 and the verification components 64 linked, via an assigned SOV key 88, to those SOV descriptions 86 for which the requisition 114 is claiming payment for work completed in the requisition period. The requisition 114 may be submitted as a paper document inputted to the CM server 10, which may be parsed using, for example, object character recognition technology to obtain the requisition information from the requisition 114. In one example, the CM server 10 and/or requisition module 42 may include instructions 20 for generating a requisition document which may be accessed via a portal, for example, via the communication interface 16, for on line completion by a contractor. In this example, the requisition 114 may be generated as an electronic document having a fillable format or as a user interface through which the contractor may input the requisition information. In one example, the requisition 114 is accessible through a user interface 74 such as a requisition interface, which may be accessed via a user device 70 in communication with the CM server 10. By way of example, the user interface 74 may be configured to provide prompts, which may be displayed by the user device 70 and/or outputted as verbal prompts, to the contractor to prompt the contractor for inputs. By way of one example, the contractor may input information as touch inputs, textual input, voice input, etc. In one example, requisitioning, e.g., applying, for payment of work completed in the requisition period for each SOV description 86 may be completed by a contractor as illustrated by screenshots 136 of a user device 70 shown in FIGS. 7-9. Referring to FIG. 7, a screenshot 136 of the user interface 74L, e.g., the touch screen display 74L, shows a plurality of user interfaces 74 displayed as a menu, from which the contractor, via the touch screen 74L of the user device 70, may select. In the present example, the contractor may select the user interface 74A labeled "Billing This Cycle" (see FIG. 7), which prompts display of the screenshot 136 shown in FIG. 8, which includes a plurality of user interfaces 74 displayed as a menu, from which the contractor, via the touch screen 74L, may select a user interface 74B labeled "Start Verifying". In response, the screenshot 136 shown in FIG. 9 is generated on the touch screen 74L, displaying a listing of SOV descriptions 86 for which the contractor has submitted a contract cost 94 for work completed in the requisition period. For example, a current cost 94A of $25,000 is being requisitioned for the SOV description "Shanty". A current completion status 96A of 100% is reported for the SOV description "Shanty." The contractor, in this example, selects, e.g., touches the user interface 74C to verify the submitted cost 94A and completion status 96A. In response, the screenshot 136 shown in FIG. 10 is generated on the touch screen 74L, displaying a menu of actions to be taken to verify the requisition submission shown in FIG. 9. In the example, the contractor selects the "Camera" user interface 74D, which actuates the camera 62A of the user device 70, as shown in FIG. 11, and prompts the contractor to take a photo using the user interface 74G. The photo 64A is saved to the user device 70 for transmission to the CM server 10. Referring to FIG. 1, in the current example the camera 62A of the user device 70 is operating as a verification mechanism 62 by collecting, e.g., capturing, the photo 64A as a verification component 64 to be submitted to the CM server 10 as verification of completion of the SOV description "Shanty." Referring again to FIGS. 10 and 11, after the photo 64A has been taken, the contractor is prompted by the menu displayed in FIG. 10 to actuate user interface 74E to upload the photo 64A for transmission to the server 10 with the requisition 114. The contractor is provided the option in the menu displayed in FIG. 10 to actuate a user interface 74E to edit the photo 64A prior to uploading, or to void the photo 64A and restart the verification step. In the example, the contractor actuates the "upload" user interface 74E to upload the photo 64A to the CM server 10, for verification in real time by the verification module 40. In the present example, the verification module 40 receives the photo 64A and verification request for the SOV description "Shanty", determines the photo 64A to be an acceptable verification input 112, and returns an acceptance, in real time, of this requisition item to the user device 70, which generates the screenshot 136 shown in FIG. 12, indicating via a user interface 74C that the requisition for payment of $25,000 for completion of the SOV description "Shanty" has been verified. The contractor, in the present example, may then select another SOV description "Laborers" for requisitioning, by actuating the user interface 74K. In this example, the contractor may be prompted at the verification screen to upload a file including labor time and/or wage records as a verification component 64. The example shown in FIGS. 7¬12 is non-limiting, and other configurations may be provided. For example, referring to FIG. 7, the user interface 74L may include options such as the "Jump to" and "Search" menu prompts, which may be selected by the user to jump to, navigate, and/or search within the project schedule 108, the SOV 104, a BIM 160, for example, during the process of submitting the requisition 114. In an illustrative example, the user may access, search and/or sort information by location (floor, area, etc.) within the project, by trade (electrical, plumbing, HVAC, etc.), by construction type (rough-in, insulation, framing, roofing, etc.), by work element type (labor, material, planning, project management, equipment, etc.) during the requisitioning process.

Figure 13:
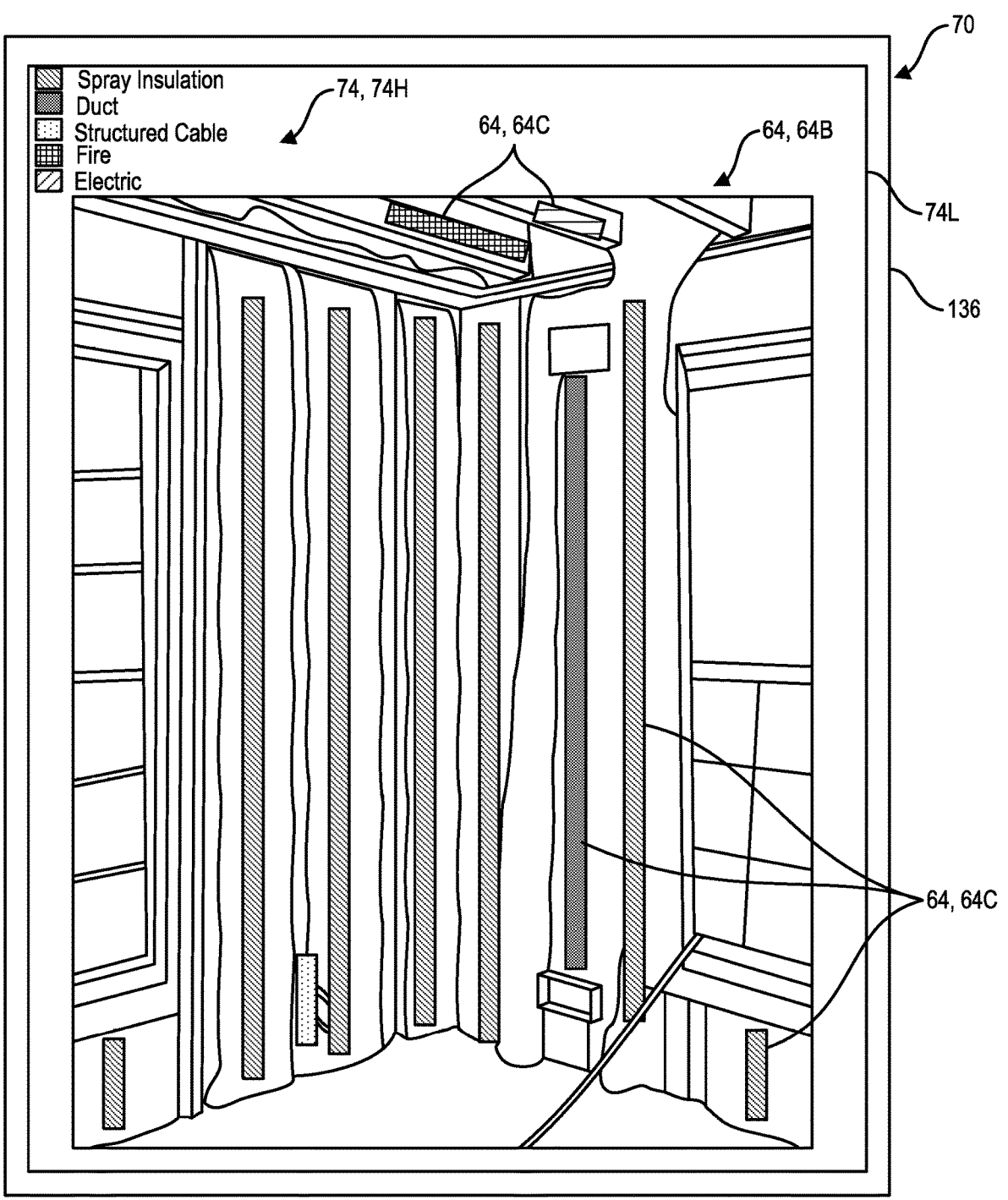
FIG. 13 provides a schematic illustration of the user device of FIG. 7, the user device displaying another exemplary UI element, a verification component configured as a digital photograph, and a plurality of verification components configured as color coded annotations to the digital photograph (the UI displays five different colors for five different trades; the five different colors are represented here with five different textured elements for ease of illustration)
Figure 14:
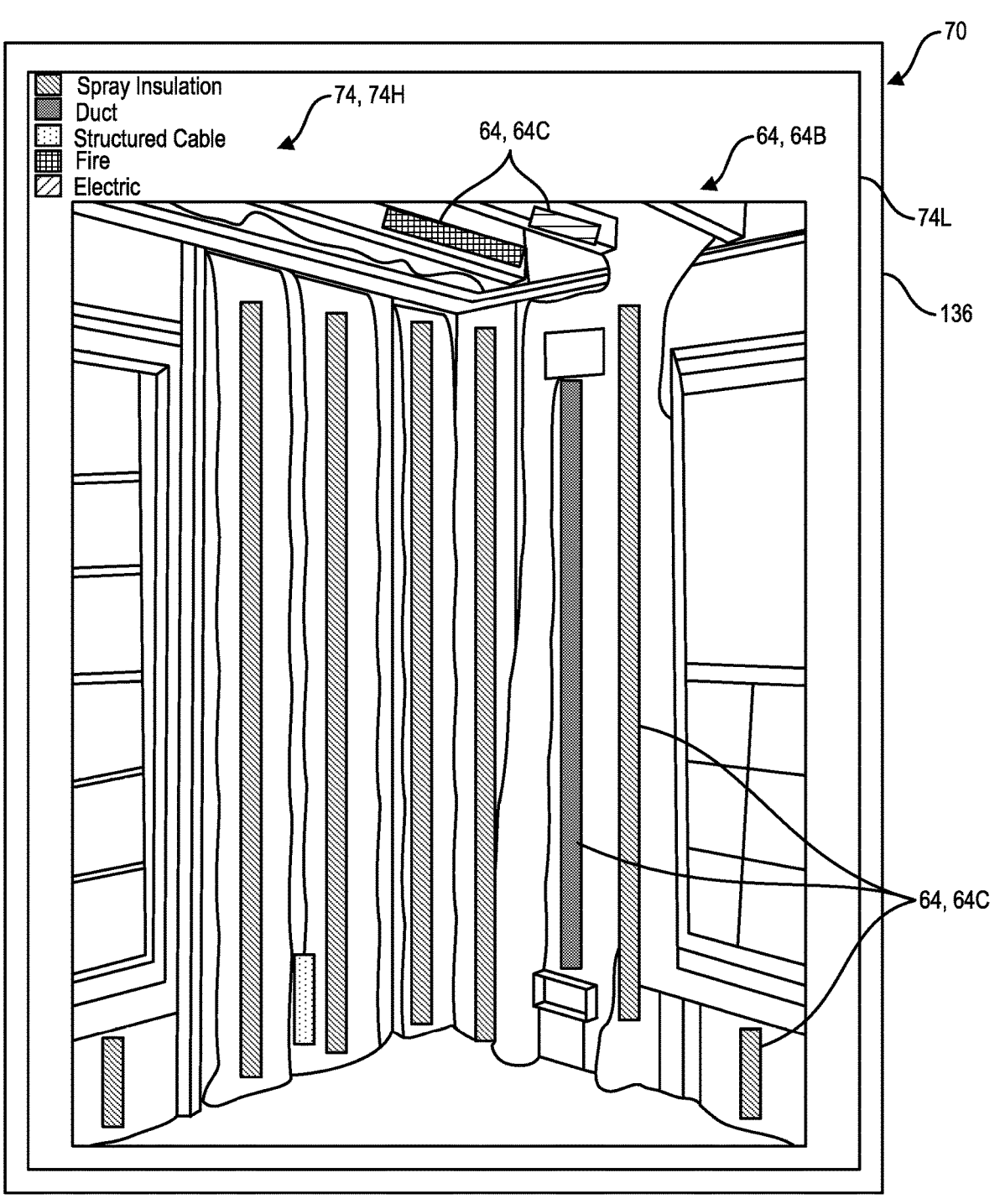
FIG. 14 provides a schematic illustration of the user device of FIG. 7, the user device displaying yet another exemplary UI element, a verification component configured as a digital photograph, and a plurality of verification components configured as textured elements.
Figure 15:
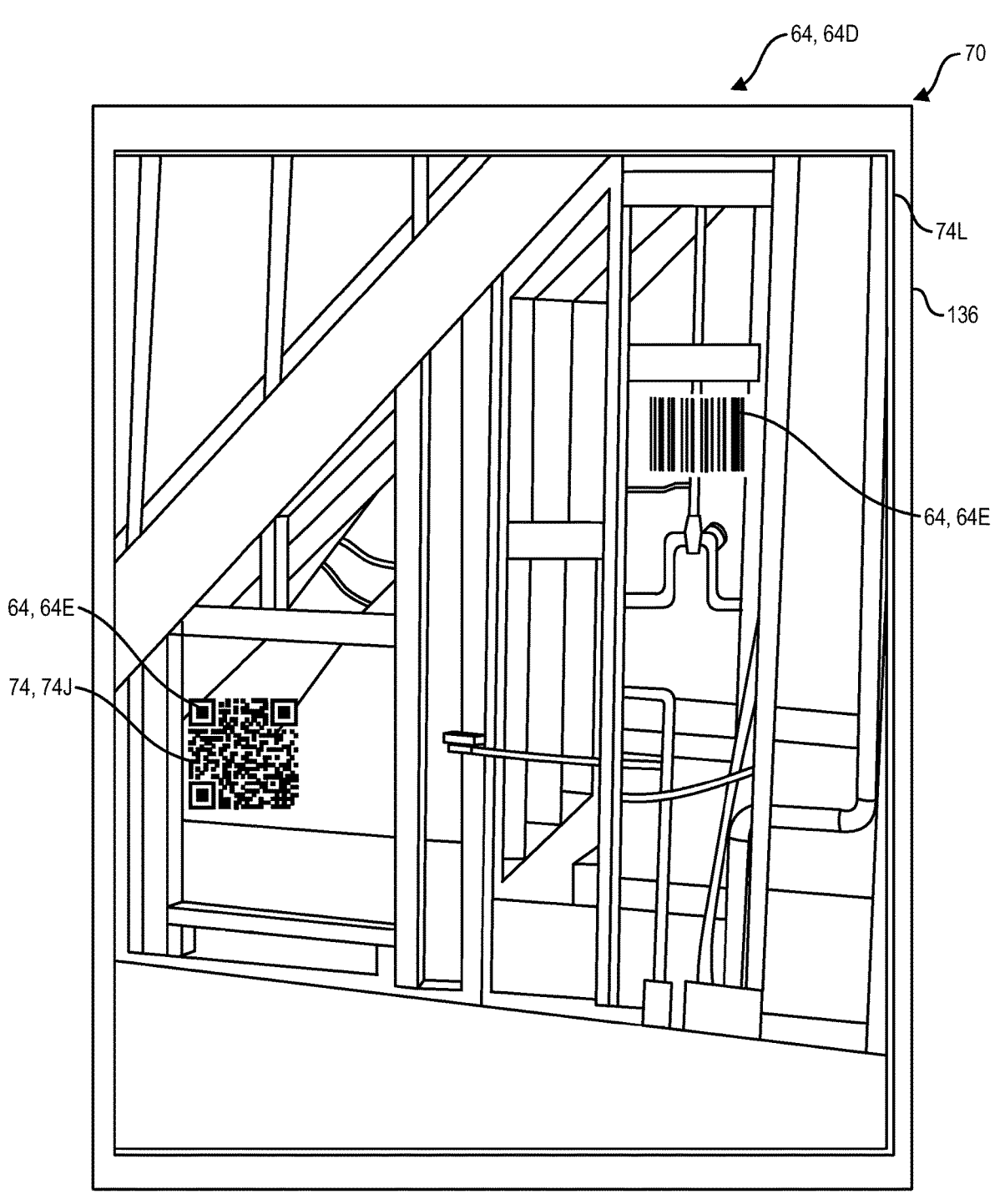
FIG. 15 provides a schematic illustration of the user device of FIG. 7, the user device displaying another exemplary UI element, a verification component configured as a digital photograph, and a plurality of verification components configured as bar codes.

FIGS. 13-15 illustrate other examples of verification inputs 112 which may be submitted. For example, FIG. 13 shows a photo 64B of a partially constructed area of a construction project, displayed on a touch screen 74L. For illustrative purposes, the photo 64B is shown including color annotations (represented by graphic annotations) in FIG. 13, and the GUI may also be configured to display, in lieu of color annotations, graphic annotations (suitable for monochrome or grayscale displays or printouts, and the like) in FIG. 14. In the example shown, the photo 64B is edited prior to submission with a requisition 114 by using annotations to indicate the various areas of work completed in the construction area shown in the photo 64B. In the example, a user interface 74 is displayed on the touch screen 74L including a key 7411 with color codes corresponding to the various areas of work. In the example, a user may select one of the color codes, for example, by a touch input to the key 74H, then using a touch input, edit the photo 64B to add annotations 64C to indicate the completed work. In another example, FIG. 15 shows a photo 64D of a partially constructed area of a construction project, displayed on a touch screen 74L of a user device 70. The photo 64D has been edited to include annotations 64E, which in the example are bar codes which correspond to, for example, materials which have been installed in the areas associated with the bar codes 64E in the photo 64D. In the example shown, one of the bar codes 64E is associated with a user interface 74J, such that a touch input to the user interface 74J opens a link or pop-up screen, for example, in which additional information associated with the bar code and/or the work condition being annotated may be inputted for submission with the requisition 114, and/or in which, for example, a textual description of the bar code, cost information, or other information may be displayed. As illustrated by the examples shown in FIGS. 13 through 15, a single photo may be submitted as a verification component 64 for verification of multiple SOV descriptions 86, such that the verification component 64 may be associated in the data store 18 with more than one SOV descriptions 86 and/or more than one SOV tags 88. For example, the annotated photo 64D shown in FIG. 15 may be submitted as a verification component 64 for verifying a first SOV description 86 related to the plumbing installation shown in the photo 64D. In the present example, the first SOV description 86 is assigned to a first SOV tag 88, such that upon submission to the CM server 10, the annotated photo 64D is associated in the data store 18 with the first SOV tag 88. Continuing in the present example, the annotated photo 64D shown in FIG. 15 may be submitted as a verification component 64 for verifying a second SOV description 86 related to the HVAC components shown in the photo 64. In the present example, the second SOV description 86 is assigned to a second SOV tag 88, such that upon submission to the CM server 10, the annotated photo 64D is further associated in the data store 18 with the second SOV tag 88. As such, the present example is illustrative that a single verification component 64 may be used for verification of multiple SOV descriptions 86, and as such, associated in the data store 18 with multiple SOV tags 88. The examples shown are illustrative, and other combinations, configurations, annotation methods and forms of verification components 64 may be inputted as verification inputs 112, as further described herein.

In one example, the requisition module 42 may generate a user interface 74 for outputting to the user device 70, requesting the contractor submit an electronic signature, a digital signature, a biometric input such as a fingerprint, retinal scan, voice input, for example, to certify the requisition 114, by presenting a user interface 74 configured, for example, as a signature pad, a prompt for a digital signature, or a biometric input interface through which a fingerprint or retinal or iris scan, for example, may be inputted. In a non-limiting example, the requisition module may generate the user interface 74 as a display outputted to the user device 70. In one example, the requisition module 42 may output a voice prompt, e.g., a voice command, for example, via the user device 70, to verbally request that the contractor submit information to the CM server 10, for example, via the user device 70. The requisition module 42 may include instructions 20 for processing notifications to contractors of the acceptance or rejection of all or a portion of a requisition 114, where the notification, in one example, may include notification of the amount of payment authorized for the requisition 114, notification of the acceptance or rejection of each of the verification components 64 associated with the requisition 114, and/or notification of the SOV descriptions 86 for which payment has been authorized or declined. The requisition module 42 may be configured such that an approver approving and/or authorizing payment of the requisition 114, for example, the project owner, project manager, or project architect, may submit an electronic signature, a digital signature, and/or a biometric input, for example, if required for approval and/or authorization of payment of the requisition 114.

The requisition module 42 may form a core module of the system 100. The requisition module 42 may be a repository for financial data associated with a project. The financial data from the requisition module may serve as input into the data store 18, which may be analyzed by a data science tool including an artificial intelligence engine. The analyzed financial data may be used to generate one or more risk areas including: a risk of a subcontractor withdrawing from a project due to financial insolvency or inability to perform; a risk of inventory and/or material supply shortage or insufficiency; a risk of potential critical events based on historical data; and the like.

The change order module 44 may include one or more instructions 20 for receiving, reviewing, and dispositioning a change order 118. The change order 118 may include, by way of non-limiting example, contract information identifying the contract 106 for which the change order 118 is being requested, an explanation of the change, which may include and/or reference one or more SOV descriptions 86 to be added to or changed in the SOV 104 associated with the contract 106 for which the change order 118 is being requested, the change in contract cost requested by the change order 118, e.g., the change order cost, a schedule time for the change, the change in the contract time due to the change, and the signature of the contractor requesting the change. In one example, the change order 118 may be in a format substantially similar to AIA Document G701TM. This example is non-limiting, and other formats or combinations of data and information may be included in the change order 118. For example, the change order 118 may include a description and/or cost of unapproved work in place which is included in the scope of the change order 118, and/or other such data as may be useful in reviewing and dispositioning the change order 118, including modeling, analyzing and/or mitigating exposure to changes and/or overruns in the total project cost and/or changes and/or delays to the project schedule related to the change order 118. Upon approval of the change order 118, the change order module 44 may communicate and/or instruct other modules in the CM server 10 to integrate the change order 118 and the SOV tag 88 assigned to the change order 118, into the contract 106, SOV 104, project schedule 108, reports 120, and models 124 including for example, a BIM, 160, such that upon approval of the change order 188, the integration of the change order 118 into each of these CM sub-systems occurs in real time and in a coordinated manner, and changes in the project status due to the change order 118, including the impact of the change order 118 on each of the cost of the contract 106, the SOV 104, the project schedule 108, reports 120, and models 124 including for example, a BIM, 160 may be reviewed and monitored in real time. The change order 118 may be submitted as a paper document inputted to the CM server 10, which may be parsed using, for example, object character recognition technology to obtain the change order information from the change order 118. In one example, the CM server 10 and/or change order module 44 may include instructions 20 for generating a change order request form which may be accessed via a portal, for example, via the communication interface 16, for on line completion by a contractor. In this example, the change order 118 may be generated as an electronic document having a fillable format or as a user interface through which the contractor may input the change order information. By way of example, the user interface 74 may be configured to provide prompts, which may be displayed by the user device 70 and/or outputted as verbal prompts, to the contractor to prompt the contractor for inputs. By way of one example, the contractor may input information as touch inputs, textual input, voice input, etc. In one example, the change order 118 is accessible through a user interface 74 such as a change order interface, which may be accessed via a user device 70 in communication with the CM server 10. In one example, the change order interface 74 is configured to such that a contractor submitting a change order 118 may submit an electronic signature, a digital signature, and/or a biometric input, for example, if required to submit the change order 118. The change order module 44 may include one or more instructions 20 for processing notifications to contractors of the acceptance or rejection of all or a portion of a change order 118.

The CM server 10 may include a modeling module 46 which may include one or more instructions 20 for generating one or more types of models 124 which may be used to report and analyze the project status. In one example, the modeling module 46 is configured to generate a BIM model 160 using data 22 from the data store 18, which may include, for example, data 22 derived from the SOV 104, the project schedule 108, and architectural and engineering data related to the construction project. In one example, the BIM model 160 is generated by a modeling system 60, which may be a third party system in communication with the CM server 10, and accessed by the modeling module 46 to generate the BIM model 160. In one example, the BIM data 22 and/or the BIM model 160 is integrated with other sub-systems such as the SOV 104, project schedule 108, and contract 106 by associating the various SOV tags 88 generated for each SOV description 86 with one or more elements of the BIM data 22 in the data structure 26, such that the BIM model 160 may be generated and/or updated by the modeling module 46 in real time. The modeling module 46 may further include instructions 20 and/or artificial intelligence (AI) for modeling various conditions, including for example, the impact of change orders 118, unapproved work in place 122, project schedule delays, etc., and outputting from the modeling module 46 a model, which may be a BIM model 160, a modeled project schedule 108, a modeled cost schedule, etc., based on current information, for reviewing and analyzing potential actions, including recovery and mitigation actions, in real time.

The CM server 10 may include a cost module 48 for accounting the project costs in real time, including, for example, the initial and revised costs 90 for each SOV description 86, costs associated with change orders 188, costs associated with unapproved work in place 122, etc. Each of the cost elements accounted in the cost module 48 may be associated via an SOV tag 88, such that each cost may be associated via the SOV tag 88 to the SOV description 86 to which the SOV tag 88 is assigned, including for example, SOV descriptions 86 associated with change orders 118 and/or unapproved work in place 122, to tasks and/or activities in the project schedule 108 associated with the SOV tag 88, and to modeling elements including BIM elements to which the SOV tag 88 is associated, etc., such that, at any time, the project costs may be generated and reviewed in real time. The cost module 48 may be configured, in one example, to interface with and/or be in communication with one or more accounting systems, which may include at least one third party accounting system in communication with the CM server 10, for example, via the network 76, such that accounting information may be transferred between the accounting system and the CM server 10. In one example, accounting and/or cost information received by the CM server 10 from a third party accounting system may be stored in the data store 18 and/or associated with one or more SOV tags 88 by the cost module 48 and/or the SOV tag module 54. The CM server 10 may include an unapproved work module 50 through which unapproved work in progress 132 may be reported. As shown in FIGS. 3 and 6, an SOV tag 88 may be assigned to each element of unapproved work 132. In one example, the unapproved work 132 may be integrated into the various systems including the SOV 104, project schedule 108, contract 106 via the assigned SOV tag 88 such that the impact of the unapproved work 132 may be evaluated and/or reported through these systems. The CM server 10 may include an inventory module 52, through which inventories, including inventories of materials, equipment, supplies, etc., may be tracked and accounted. In one example, the inventory module 52 an include one or more instructions 20 for associating the various inventory elements with an SOV tag 88, such that accounting of the inventory elements may be integrated into the various subsystems of the CM system 100, including for example, the SOV 104, the project schedule 108, and contract 106 and the BIM 124.

The cost module 48 may be configured to recommend elements in trade input. The cost module 48 may be configured to translate a schedule from the BIM into billing and cost data for the cost module. The cost module 48 may be configured to estimate project duration by trade. The cost module 48 may be configured to estimate progress by trade. The cost module 48 may be configured to estimate cost by trade.

Referring to FIG. 1, the CM system 100 may include a plurality of verification mechanisms 62 for collecting verification components 64 as required to verify completion of work, including completion of SOV descriptions 86. The verification components 64 which are collected via the verification mechanisms 62 are inputted as verification input 112 to the CM server 10, for example, via the network 76, in real time, to the verification module 40, and stored as data 22 in the data store 18. Each verification component 64 is associated in the data store 18 with one or more of the SOV tags 88, such that the current completion status of each SOV description 86 may be updated in real time. Because the SOV 104 is integrated with the project schedule 108, contract 106, and BIM 160 via the SOV tags 88, as each verification component 64 is received by the CM server 10, each of these sub-systems may be updated in real time using the verification input 112 generated by the verification component 64.

The CM system 100 may include various types of verification mechanisms 62 which may be used to submit various types of verification components 64 to the CM server 10. In the example shown in FIGS. 7-12, a camera 64A included in a user device 70 was used as the verification mechanism 62 to collect, e.g., generate digital photos 64A, 64B, 64D which were inputted via the user device 70 and network 76 as verification components 64 to the verification module 40. The example of a camera as a verification mechanism 62 and a digital photo as a verification component 64 is non-limiting, and it would be appreciated that a variety of verification mechanisms 62 could be used to collect various types of verification components 64. By way of non-limiting example, verification mechanisms 62 which may be used to collect verification components 64 may include one or more of digital cameras, multi-dimensional cameras including photogrammetry devices, image scanners, optical character recognition devices, bar code scanners, RFID sensors, thermographic analyzers, infrared cameras, laser measurement devices, audio sensors and records, weight scales, thermal sensors, video recorders, gages, scales, rulers, etc. which may be used in conjunction with devices and/or tools such as computers, smart phones, laptops, tablets, GPS systems, navigation systems, registration markings, etc., to collect the verification components 62. By way of non-limiting example, verification components 62 may include photographic images, video images, audio recordings, thermographic images, data collected from one or more of the verification mechanisms including sensor data, gage inputs, etc., images of bar codes, labels, RFID tags, time sheets, labor records, material invoices, checklists, annotations and edits applied to each of these, etc.

Figure 16:
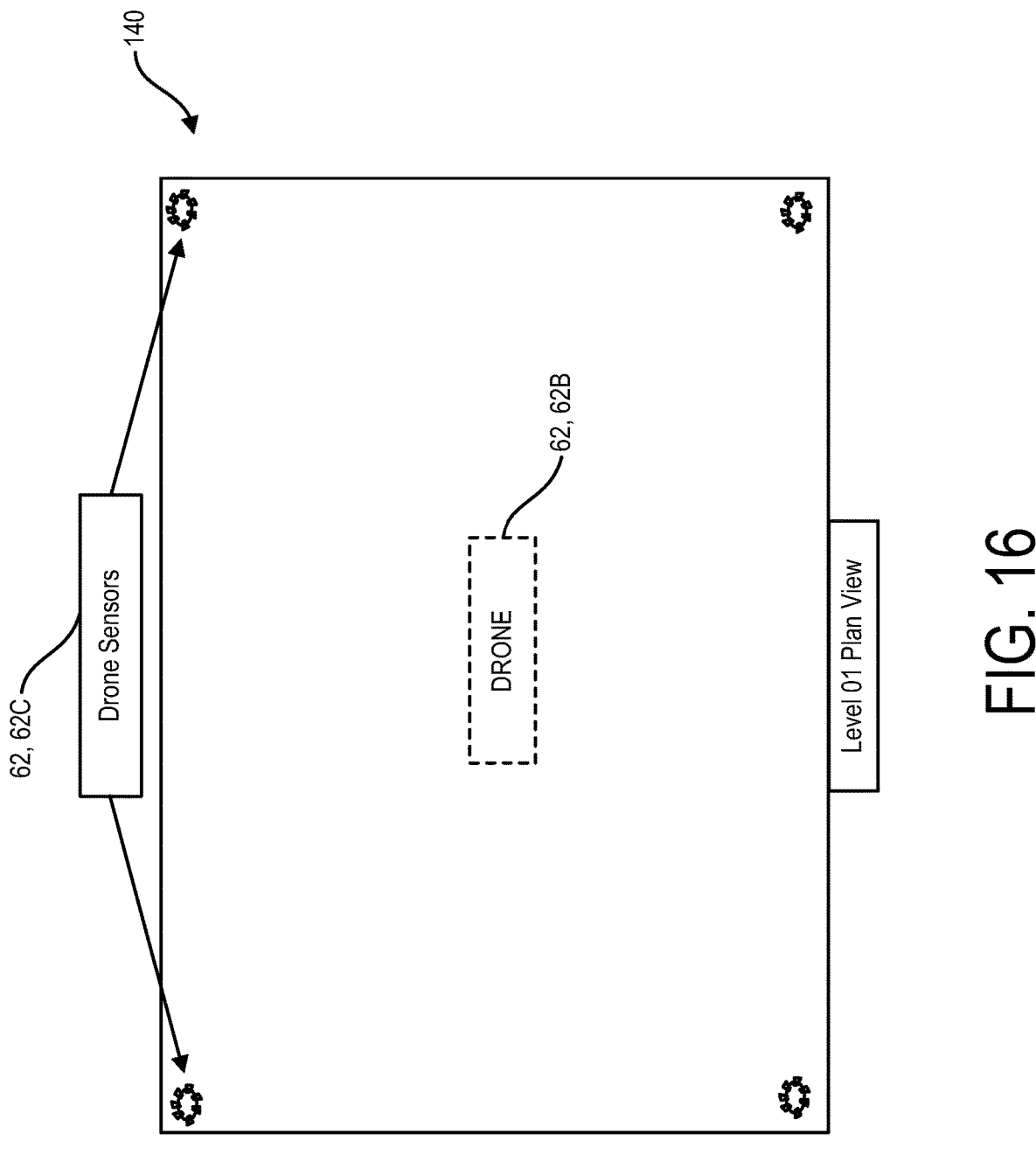
FIG. 16 provides a schematic illustration of a plurality of verification mechanisms of the CM system of FIG. 1 located in a worksite.

At least some of the process of collecting and inputting the verification input 112 may be automated such that the collection of verification components 64 may occur without requiring a contractor, project manager, architect, or other person to be physically present, and as such, eliminating delay which could occur waiting a person to be physically available to collect the verification components 64. In an illustrative example shown in FIG. 16, an automated verification mechanism 62 is shown configured as an unmanned aerial system (UAS), also referred to as a drone 62C. The drone 62C may be equipped with, by way of non-limiting example, one or more data collection devices and/or surveillance devices such as a digital camera, thermographic analyzer, video/audio recorder, image scanner, etc. for recording verification components 64. The drone 62C may be remotely operated, auto-piloted, and/or may include programming, instructions, or instructions 20 for conducting surveillance and/or inspection of a construction site and collecting and/or transmitting verification components 64. In one example, the verification data collected by the drone 62C is transmitted in real time to the CM server 100, for example, via the network 76. The drone 62C may include a global positioning system (GPS) for determining and reporting its position, and may be configured to sense and/or record its position relative to location markers and/or other registration elements which may be provided at the construction site. In the example in FIG. 16, a drone 62B including surveillance equipment such as cameras, scanners, records, recorders, etc. is deployed and travels along a surveillance path through the construction site to collect verification components 64.

In the present example, drone sensors 62C are installed in locations within the construction site. In one example, a drone sensor 62C is in communication with the CM server 10 and is configured to send surveillance instructions received from the CM server 10 to the drone 62C for collecting verification components 64 in the area immediate the sensor 62C, in the present example, level 01 of the construction project. The surveillance instructions received from the CM server 10 may correspond, in one example, to requisitions 114 which have been submitted to the CM server 10 requesting verification of current completed work. In another example, the drone sensors 62C may be configured as location or registration markers which are sensed by the drone 62C to establish and/or determine the location coordinates of the drone 62C within the construction project.

The data sensed from the location sensors 62C may be recorded, in one example, in conjunction with GPS data to record the position of the drone 62C to correlate this position with verification component data collected at that position, including for example, photographic/video images collected at that position. The examples described herein are illustrative and non-limiting. For example, other types of verification mechanisms 62 may be used within the CM system 100 for automated collection of verification components 64, such as robots, autonomous and/or unmanned devices including unmanned vehicles and unmanned aerial vehicles/systems (UAV/UAS), premises security system elements installed at a construction project site and/or equipment and inventory storage location including for example, permanently mounted security cameras, audio sensors, motion sensors, etc.

Process Overview

FIG. 2 provides an exemplary illustration of a CM process 200 which may be executed using the CM system 100 shown in FIG. 1. The process 200 shown in FIG. 2 is illustrative and non-limiting, such that it would be understood that the CM process 200 described herein may include other process flows and methods incorporating combinations of the system elements described herein. The CM process 200 is described herein referring to the CM server 10 as performing functions which may be performed, as previously described herein, by one or more modules 28, 30, 32, 34, 36, 38, 40, 42, 44, 46, 48, 50, 52, 54 or a combination of modules, and/or systems 56, 58, 60, or one or a combination of the systems 56, 58, 60 in conjunction with the one or a combination of the modules.

Referring again to the example shown in FIG. 2, the CM process 200 may include the submission of one or more bid documents 102 to the CM system 100. In one example, a bid document 102 may be submitted by each contractor bidding to perform work in a construction project to be managed using the CM system 100. The CM process 200 continues with generating, via the CM server 10, a schedule of values (SOV) 104, which as previously described herein includes a plurality of SOV descriptions 86. The CM server 10 generates, using a tagging instruction engine 20, a plurality of SOV tags 88. Each one of the SOV tags 88 is unique from each other one of the SOV tags 88. Each unique SOV tag 88 is associated with a single one of the SOV descriptions 86 in a data store 18.

The tagging instruction engine 20 may be configured to apply tags to a scanned document based on a comparison with a tagging database. The tagging database may include a risk drivers database including one or more keywords associated with risk drivers in construction projects. The tagging instruction engine 20 may be configured to tag the document when a word in the scanned document matches a word in the risk drivers database.

A contract cost (see FIG. 3 at 90) is generated by the CM server 10 for each SOV description 86 using the bid documents 102, and is stored in the data store 18. Additional data elements 86, such as cost categories and codes 92, subcontractor information, etc., may be generated and/or associated with the SOV description 86 in the data store 18. A project schedule 108 is generated using the SOV descriptions 86 and/or information from the bid documents. The project schedule 108, as previously described, includes schedule elements including tasks and activities and schedule times for each of the schedule elements, which are stored as data 22 in the data store 18. A contract time for completing the SOV descriptions 86 included in the SOV 104, may be generated by the CM server 10. A contract 106 is generated based on the SOV 104 which may one or more elements from the SOV 104, the project schedule 108, the contract cost 90, and the contract time.

As shown in FIG. 1 at 110, the CM process 200 includes associating each SOV tag 88 assigned to a respective SOV description 86 in the data store 18, for example in a data structure 26 using a data base management system 24, with other data items 82 associated with the respective SOV description 86. For example, at 110, a unique SOV tag 88 assigned to a respective SOV description 86 is associated, as described previously herein, with a contract cost 90 assigned to the respective SOV description 86, with one or more project schedule elements and schedule times associated with the respective SOV description 86, with a cost category and code 92, etc. such that the data elements 78 included in the contract 106, the SOV 104 and the project schedule 108 which are associated to a respective SOV description are associated with each other in the data store 18 via the data structure 26. This data structure 26 of associating the various elements 76 from the sub-systems of the SOV 104, project schedule 108, and contract 106 with a unique SOV tag 88, is advantaged by providing a means, via the SOV tag 88, for integrating the sub-systems of the SOV 104, project sched-ule 108, and contract 106 such that, when a change is made in a data element 78 of any one of these integrated sub-systems, the other sub-systems may be updated in real time, thus allowing for the reporting and analysis of the impact of the change in real time, and minimizing and/or eliminating delay in identifying and/or actioning recovery plans or mitigation actions where required in response to the change. The CM process 200 may include generating one or more models 124 using the information and/or data 22 from the SOV 104, project schedule 108, etc., architectural and engineering data which may be included in the data store 18, etc., where the models 124 may include, as described previously herein, one or more building information models (BIMs) 160, heat maps 150, project schedule recovery models, etc. The data store 18 may include one or more data structures 26 for associating the data 22 used for generating the models 124, such as BIM elements, with a respective SOV tag 88, such that when a change is made in a data element 78 associated with a respective SOV tag 88, the change may be integrated in real time with each of the models 124.

Referring again to FIG. 2, the CM process 200 may include receiving a change order 118 which may include a change order cost and a change order contract time. Upon approval of the change order 118, the change order may be added to the SOV 104 as a new SOV description 86, the at 110, a unique SOV tag 88 may be assigned to the new (change order) SOV description. The change order may be included in the project schedule 108 and any schedule elements associated with the change order may be associated with the (change order) SOV tag 88 in the data structure 26. Similarly, the change order may be included in the BIM model 160, and any BIM elements associated with the change order may be associated with the (change order) SOV tag 88 in the data structure 26. By integrating the change order 118, via the SOV tag 88 in the SOV 104, project schedule 108, models 124 including BIM models 160, and contract 106 in real time, e.g., at the time the change order is entered into the CM system 10, these sub-systems 104, 106, 108, 124, 160 are kept in alignment with each other, e.g., all are updated in real time to include the same information, such that the impact of the change order on any of these sub-systems may be identified and/or mitigated, if required, in real time.

Similarly, the CM process 200 may include inputting unapproved work in place 122 into the CM system 100, such that the exposure related to the unapproved work in place 122 may be reported and analyzed in an expedient manner by integrating the unapproved work in place 122 into the SOV 104, the project schedule 108, etc. For example, at the time when unapproved work is identified and/or initiated, the unapproved work 122 may be inputted into the CM system for exposure tracking. In one example, the unap-proved work 122 may be inputted as an SOV description 86 and assigned a unique tag 88, such that any changes in the project schedule 108 caused or anticipated due to the unap-proved work 122 may be associated with the assigned SOV tag 86 and reported as a schedule exposure. Likewise, the cost associated with the unapproved work 122 may be entered into the SOV 104 and/or tracked by the cost module 48, where the cost of the unapproved work 122 may be associated with the SOV tag assigned to the unapproved work SOV description 86, for reporting in real time as an exposure cost. By integrating unapproved work in place 122, via the assigned SOV tag 88 in the SOV 104, project schedule 108, models 124 including BIM models 160, and contract 106 in real time, e.g., at the time the unapproved work 122 is identified and/or initiated, the exposure, e.g., risks related to the unapproved work 122 to cost, scheduling, building design (via the BIM), etc., may be reported and analyzed for recovery and/or mitigation actions, as required.

Referring again to FIG. 2, the CM process 200 includes collecting, using a verification mechanism 64, at least one verification component 62 at a current verification time, where as previously described herein, the verification com-ponent 64 at least partially defines a current completion status 98 of a respective SOV description 86 at the current verification time. The verification component 64 is trans-mitted by the verification mechanism 62 to be received by the CM server 10. The CM server associates, in the data store 18, the verification component 64 with the respective SOV component 86 and with the respective SOV tag 88 assigned to the component, such that the verification com-ponent 64 is available in the data store 18 contemporane-ously with the receipt of the verification component 64 by the CM server 10. The CM process 200 may include associating, in the data store 18, a time stamp with the verification component 64, where the time stamp is gener-ated by one of the CM server 10 and the verification mechanism 62 submitting the verification component 64, and where the time stamp is generated contemporaneously with receiving the verification component 64 via the CM server 10.

The CM process 200 further includes receiving, via the CM server 10, a requisition 114 requesting verification of the current completion status 98 of the respective SOV descrip-tion 86. The CM server 10, as previously described herein, determines whether the verification component 64 is accept-able to verify the current completion status 98 of the respective SOV description 86, and when the verification component 64 is determined to be acceptable, verifies in the data structure 26, the current completion status 98 of the respective SOV description 86. Alternatively, when the submitted verification component 64 is determined to be unacceptable, the CM server 10 rejects the current comple-tion status 98 of the respective SOV description 86, and generates a notification of rejection. In response, the veri-fication component 64 may be resubmitted for consider-ation, corrected, etc. The CM process 200 may include the CM server 10, generating a current contract cost of the respective SOV description 86 when the verification component 86 has been determined to be acceptable, where the current contract cost is generated using the current completion status 98 of the respective SOV description 86, and associating in the data store 18, the current contract cost with the respective SOV tag 88 associated with the respective SOV description 86. The CM process 200 includes determining a current payment for the requisition 114, using the current contract cost of the respective SOV description 86 when the at least one verification component 64 has been determined to be acceptable, and generating a payment authorization, for example, to a payment provider 126, where the payment authorization authorizes the payment provider 126 to issue payment of the requisition 114 in the amount of the current payment to the contractor.

The CM process 200 illustrated in FIG. 2 may further include generating one or more reports. In one example, the CM process 200 includes generating a current cost heat map using the CM server 10, a reporting instruction engine 20, and the current contract cost calculated by the CM server 10, where the current cost heat map compares the current contract cost to the contract cost, and outputting the current cost heat map, for example, to a user device 70 for viewing and analysis. In one example, the CM process 200 includes generating, using a modeling instruction engine 20 and a plurality of BIM elements, a building information model 160 (BIM) of the project, where the BIM 160 includes the plurality of BIM elements. As described previously, the CM process 200 includes associating in the data store 18, using the CM server 10, each respective SOV tag 88 with at least one BIM element of the plurality of BIM elements used to generate the BIM 160. The CM process 200 may include generating a BIM cost heat map 160A using the respective current contract cost associated with the respective SOV value, and outputting the BIM cost heat map for example, to a user device 70 for viewing and analysis.

The reporting instruction engine 20 may be configured to generate a report for a user based on data in the system. The reporting instruction engine 20 may be configured to populate a heat map (e.g., FIGS. 17-19 and 36). The reporting instruction engine 20 may be configured to generate a 3D and/or holographic image of a project (e.g., FIGS. 18, 19 and 36).

The CM process 200 may include associating in the data store 18, using the CM server 10, the current completion status 96 and the current time with the at least one respective schedule element associated with the at least one of the respective SOV description 86 and with the respective SOV tag 88. The CM process 200 may further include generating a current project schedule 108 using the CM server 10, the current completion status and the current time, and generating a current contract time using the current project schedule. In one example, the CM process 200 includes modeling a recovery plan for the project schedule 108, using the CM server 10, a modeling instruction engine 20, and the current project schedule 108.

The CM process 200 may include generating, using a modeling instruction engine 20 and a plurality of BIM elements, a building information model (BIM) of the project, associating in the data store 18, using the CM server 10, each respective SOV tag 88 with at least one BIM element of the plurality of BIM elements, and generating a BIM schedule heat map using the respective current schedule time associated with the respective SOV value. The BIM schedule heat map may be outputted by the CM server 10, for example, to a user device for viewing and analysis.

The modeling instruction engine 20 may be configured to compare a BIM model, to a billing document or a projection. The modeling instruction engine 20 may be configured to generate a model based on previously identified markers of project progress. The modeling instruction engine 20 may be configured to generate a projection based on a financial/cost controls database.

The CM process 200 may include steps and/or process elements in addition to those described above, as would be understood as being performed within the scope of the functions of the various modules, systems, components and mechanisms described herein.

Figure 20:
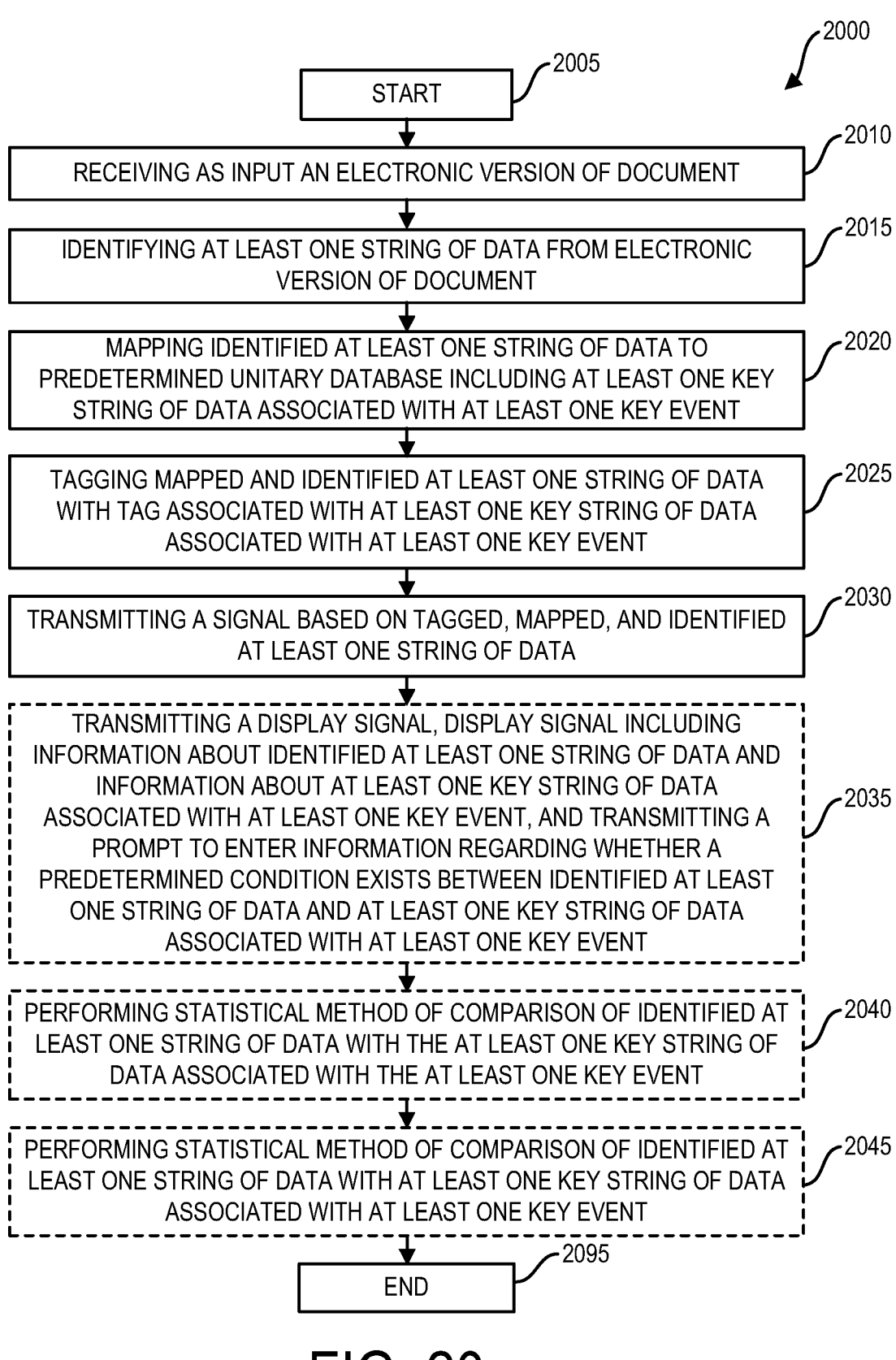
FIG. 20 a flow chart of a method for CM according to an exemplary embodiment.
Figure 21:
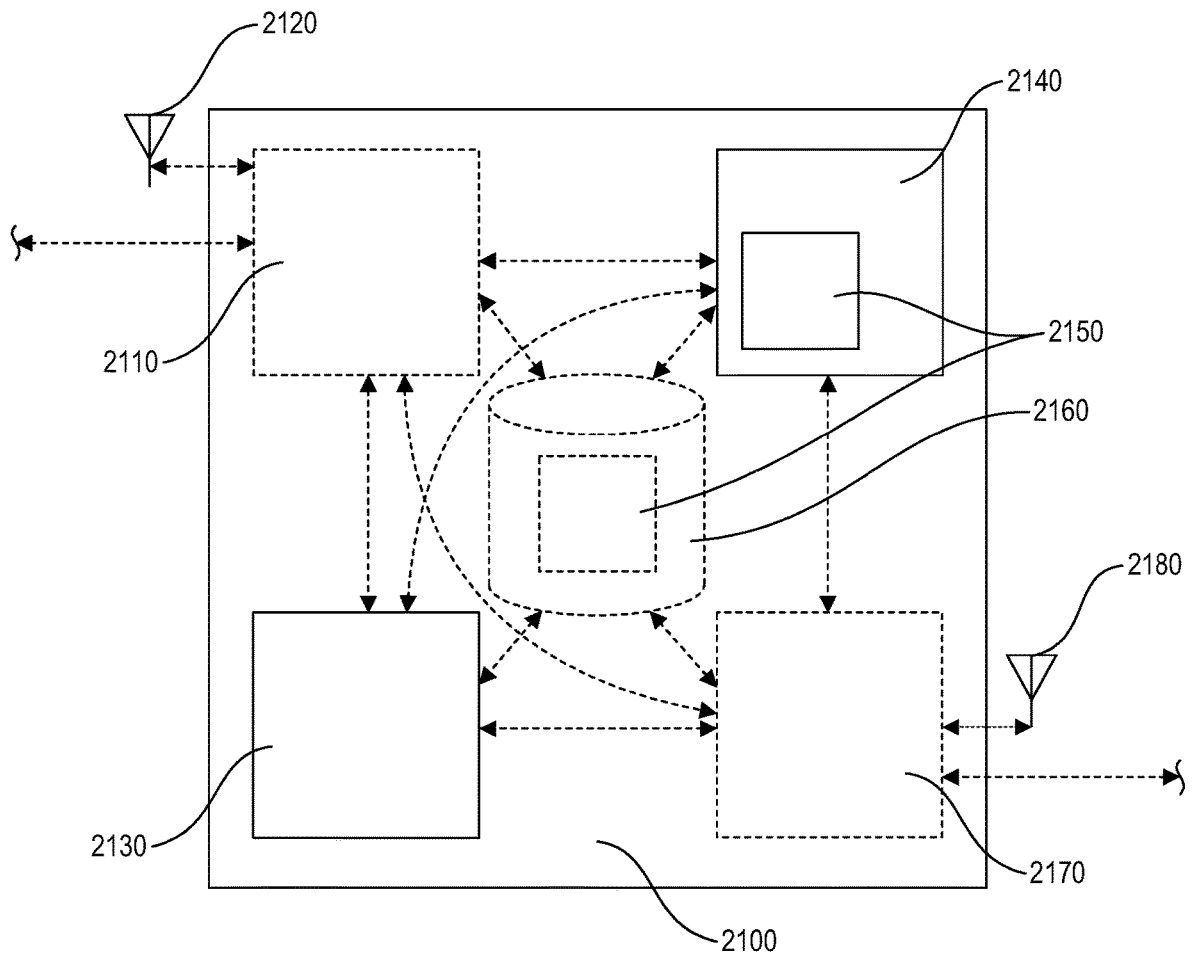
FIG. 21 is a schematic diagram of a computer device or system including at least one processor and a memory storing at least one program for execution by the at least one processor according to an exemplary embodiment.

FIG. 20 a flow chart of a method for CM according to an exemplary embodiment; FIG. 20 is a flow chart of a method 2000 for image and/or waveform analysis according to an exemplary embodiment. The method 2000 may include a start 2005 and an end 2095. The method 2000 may include receiving as input an electronic version of a document 2010. The method 2000 may include identifying at least one string of data from the electronic version of the document 2015. The method 2000 may include mapping the identified at least one string of data to a predetermined unitary database including at least one key string of data associated with at least one key event 2020. The method 2000 may include tagging the mapped and identified at least one string of data with a tag associated with the at least one key string of data associated with the at least one key event 2025. The method 2000 may include transmitting a signal based on the tagged, mapped, and identified at least one string of data 2030. The method 2000 may include transmitting a display signal, the display signal including information about the identified at least one string of data and information about the at least one key string of data associated with the at least one key event, and transmitting a prompt to enter information regarding whether a predetermined condition exists between the identified at least one string of data and the at least one key string of data associated with the at least one key event 2035. The method 2000 may include performing a statistical method of comparison of the identified at least one string of data with the at least one key string of data associated with the at least one key event 2040. The method 2000 may include performing a machine learning method of comparison of the identified at least one string of data with the at least one key string of data associated with the at least one key event; and a combination of any of the group 2045. One or more of the above-referenced steps of the method 2000 may be omitted, repeated or modified to include one or more features of the exemplary embodiments without limitation. The steps may be performed in any suitable order. FIG. 21 is a schematic diagram of a computer device or system including at least one processor and a memory storing at least one program for execution by the at least one processor according to an exemplary embodiment. Specifically, FIG. 21 depicts a computer device or system 2100 comprising at least one processor 2130 and a memory 2140 storing at least one program 2150 for execution by the at least one processor 2130. In some embodiments, the device or computer system 2100 may further comprise a non-transitory computer-readable storage medium 2160 storing the at least one program 2150 for execution by the at least one processor 2130 of the device or computer system 2100. In some embodiments, the device or computer system 2100 may further comprise at least one input device 2110, which may be configured to send or receive information to or from any one of: an external device (not shown), the at least one processor 2130, the memory 2140, the non-transitory computer-readable storage medium 2160, and at least one output device 2170.

The at least one input device 2110 may be configured to wirelessly send or receive information to or from the external device via a means for wireless communication, such as an antenna 2120, a transceiver (not shown) or the like. In some embodiments, the device or computer system 2100 may further comprise at least one output device 2170, which may be configured to send or receive information to or from any one from the group consisting of: an external device (not shown), the at least one input device 2110, the at least one processor 2130, the memory 2140, and the non-transitory computer-readable storage medium 2160. The at least one output device 2170 may be configured to wirelessly send or receive information to or from the external device via a means for wireless communication, such as an antenna 2180, a transceiver (not shown) or the like.

OCR, Search and Highlight Process

Document Upload and Text Recognition

The CM system 100 may be configured to apply optical character reading (OCR), search and highlighting. Specifically, the CM system 100 may be configured to receive an original document with text (e.g., an upper portion of FIG. 22) and/or handwriting (e.g., a lower portion of FIG. 22) as an uploaded document. The CM system 100 may be configured to use an OCR module to detect and read printed and handwritten text within the uploaded document. The CM system 100 may be configured to display a bounding box around one or more detected word (e.g., FIG. 23). For each word detected, printed or handwritten, the CM system 100 may be configured to receive from the OCR module, x and y coordinates of the detected text's bounding box's location within the uploaded document (e.g., FIG. 24). The CM system 100 may be configured to normalize x and y coordinates of the detected text's bounding box's location within the uploaded document. The CM system 100 may be configured to save the text content received, including the x and y coordinates, and the normalized data in an index. The CM system 100 may be configured to provide full-text search of all documents uploaded to the platform.

Annotation Location and XY Recalculation

The CM system 100 may be configured, for each user search, to identify matching text stored in a search index (e.g., data store 18, FIG. 1). The CM system 100 may be configured, for each document recognized as having the searched text, to analyze a size of a screen of a user device and a browser that is currently being used compared to a size of the document page that holds the searched text. The CM system 100 may be configured to adjust the location of the x and y coordinates stored for the matched text. The CM system 100 may be configured, for each match, to generate an annotation, which may include a yellow colored box (e.g., FIG. 25) and/or a shaded region (e.g., FIG. 26). The CM system 100 may be configured to use the recalculated x and y coordinates to place the annotation on top of the searched text providing an appearance of highlighted text (e.g., FIG. 26).

Handwriting Search

The CM system 100 may be configured to receive any document. The CM system 100 may be configured to scan the document. FIG. 27 depicts three non-limiting examples of input.

Figure 28:
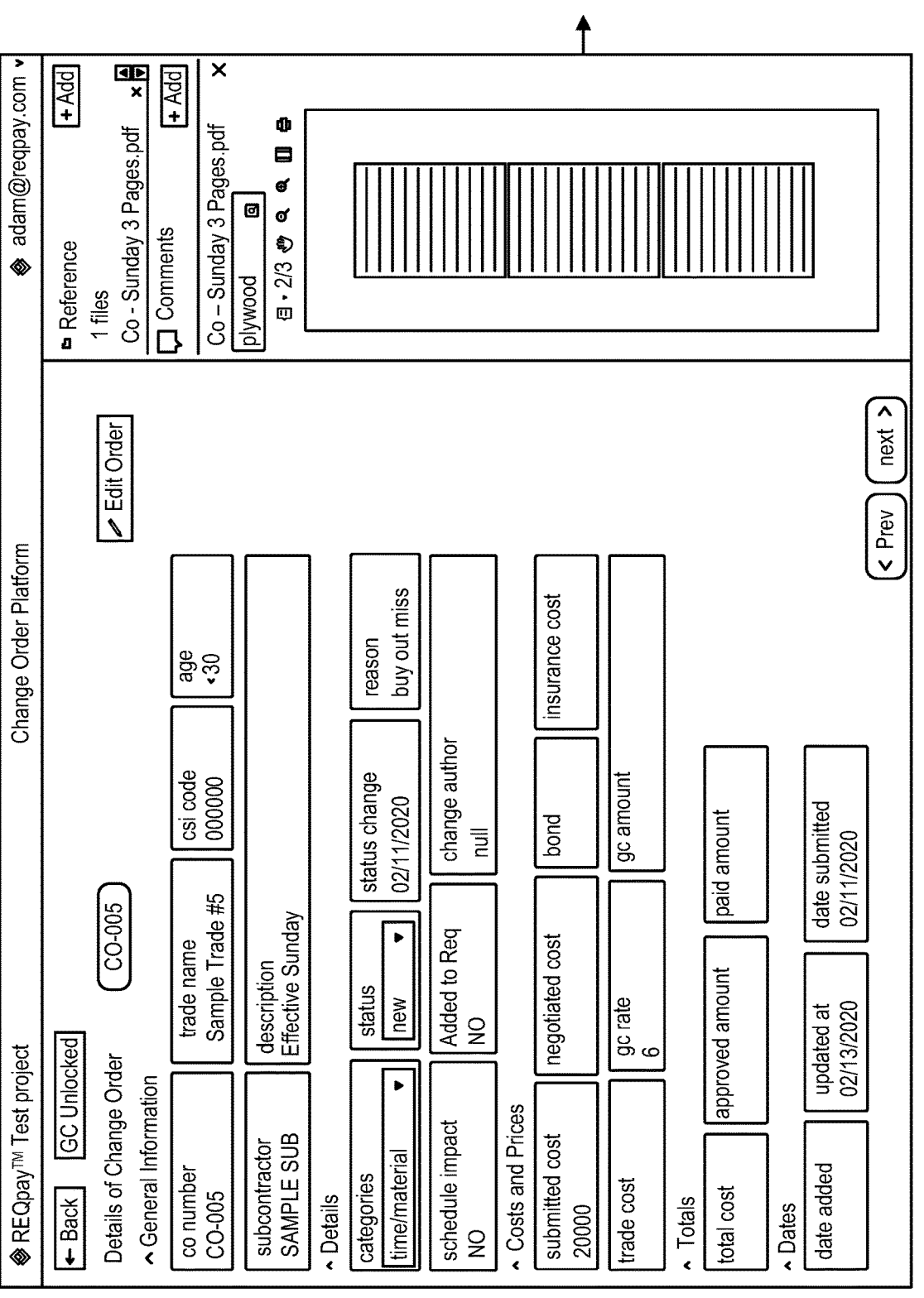
FIG. 28 depicts a graphical user interface (GUI) associated with an extraction step of the handwriting search function for the method for CM according an exemplary embodiment.

The CM system 100 may be configured to extract desired information from the scanned document. FIG. 28 depicts a graphical user interface (GUI) associated with an extraction step of the handwriting search function for the method for CM according an exemplary embodiment. The example of FIG. 28 relates to a change order. The GUI may be a change order platform. The change order platform may include general information, details, costs and prices, totals, dates, references, comments, a search window, navigation features, and the like. The general information may include a change order number, a trade name, a Construction Specifications Institute (CSI) or other suitable code, an age (e.g., in days), a subcontractor, a description, and the like. The details may include categories (e.g., time/material), a status (e.g. new), a status change date, a reason (e.g., buy out miss), a schedule impact field (e.g., No), an added to requisition field (e.g., No), a change author field, and the like. The costs and prices may include a submitted cost (e.g., 20000 or $20,000), a negotiated cost, a bond, an insurance cost, a trade cost, a general contractor (GC) rate, a GC amount, and the like. The totals may include a total cost, an approved amount, a paid amount, and the like. The dates may include a date added, an updated at date, a date submitted date, and the like. The references may include a listing of scanned documents (e.g., "CO—Sunday 3 Pages.pdf"). The comments may include a thumbnail display of the scanned documents. The search window may prompt a user to input a search term, e.g., "plywood". The searched word, e.g., "plywood", may be highlighted and displayed with the scanned document (e.g., FIG. 29). The search term may be a single word, multiple words, a phrase, and/or a sentence.

Figure 30:
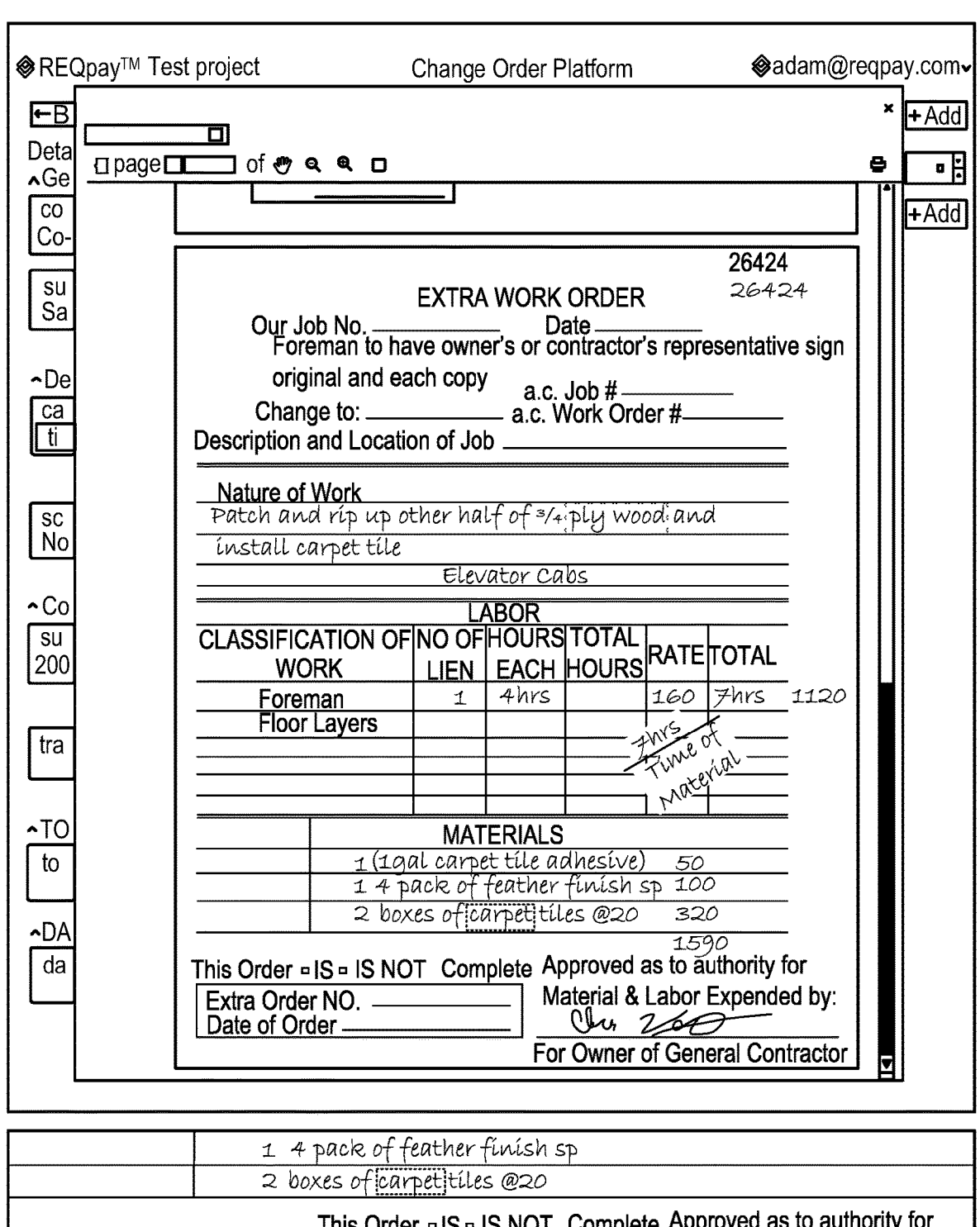
FIG. 30 depicts a GUI associated with a search step of the handwriting search function for the method for CM according an exemplary embodiment.

The CM system 100 may be configured to present the user with a search window. The search window may be configured to floats over another screen, e.g., the change order platform screen of FIG. 28. For example, FIG. 30 depicts a GUI associated with a search step of the handwriting search function for the method for CM according an exemplary embodiment. In this example, the search term is "carpet". The search window may include a zoomed-in portion of the scanned document including the highlighted search term (see, e.g., a bottom portion of FIG. 30).

Figure 31:
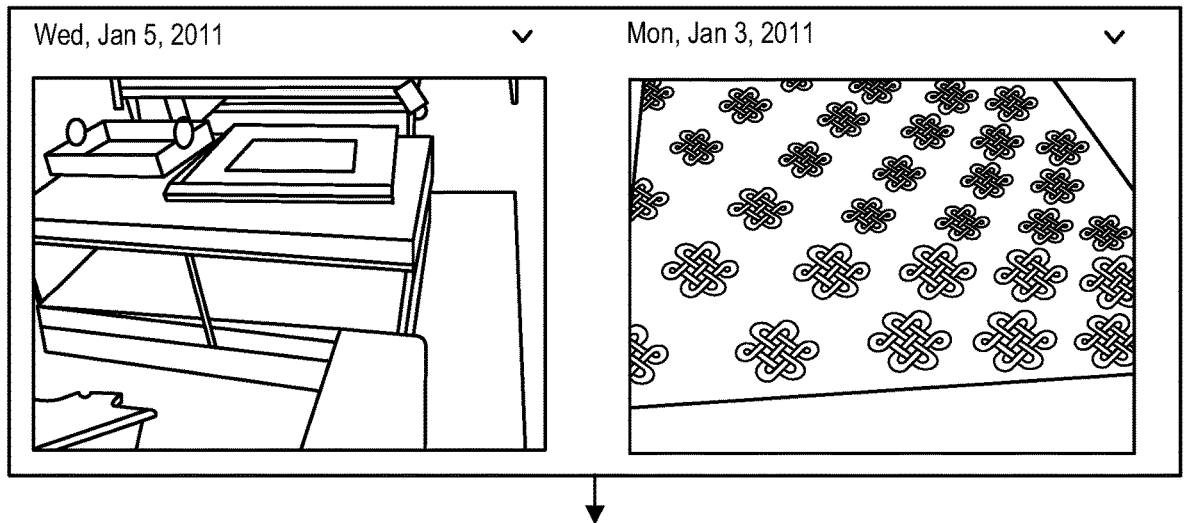
FIG. 31 depicts an image display step of the handwriting search function for the method for CM according an exemplary embodiment.

The CM system 100 may be configured to present the user with images related to the search term. For example, FIG. 31 depicts an image display step of the handwriting search function for the method for CM according an exemplary embodiment. In this example, two images of "carpet" are displayed.

The CM system 100 may be configured to link the GUI of FIG. 28 with any of the previously described displays including FIGS. 3-19, inclusive.

The CM system 100 may be configured to search via a cloud based system. FIG. 32 depicts an original document to be scanned using the handwriting search function for the method for CM according an exemplary embodiment; and FIG. 33 depicts a GUI associated with a highlighting step of the handwriting search function for the method for CM according an exemplary embodiment. The CM system 100 may be configured to read any format including PDF, PNG, JPG, and the like. The CM system 100 may be configured to read "flat" documents, i.e., a document in which text is not readily text-searchable, and which must be scanned using software to make the document text-searchable, e.g., an OCR module. The GUI of FIG. 33 may be configured to highlight one or more search terms. In this example, the search term "sample" and the search phrase "regular test" are highlighted in the original document. Also, a search screen is displayed over the highlighted original document. The CM system 100 may be configured to display highlighted handwriting, text or a combination of handwriting and text. The CM system 100 may be configured to display results with annotations. The CM system 100 may be configured to generate a report containing the highlighted search terms.

Figure 34:
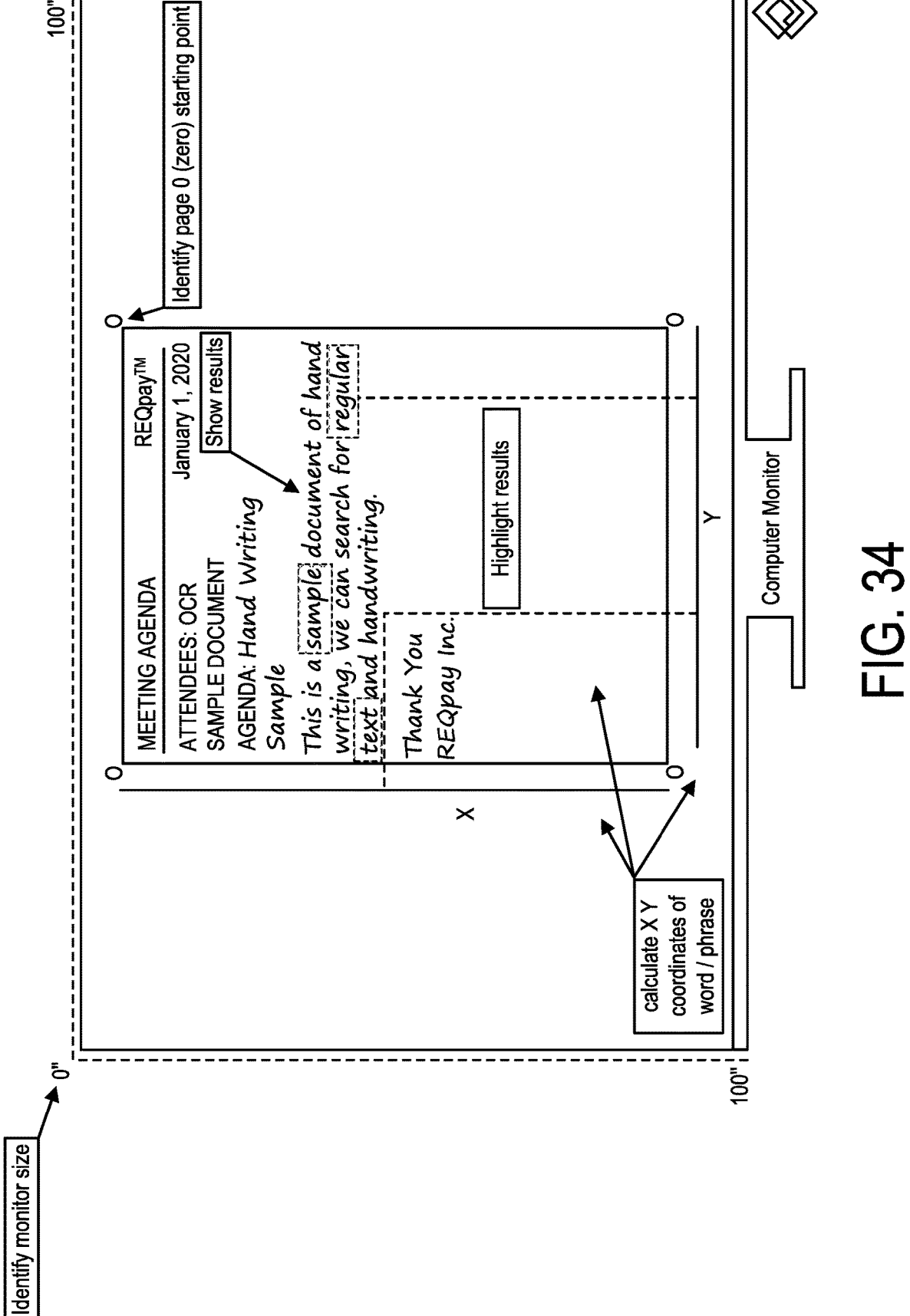
FIG. 34 depicts a display configured to display a GUI and features relating to a coordinate step of the handwriting search function for the method for CM according an exemplary embodiment.

FIG. 34 depicts a display or monitor configured to display a GUI and features relating to a coordinate step of the handwriting search function for the method for CM according an exemplary embodiment. The CM system 100 may be configured to detect a size of the display or monitor. The CM system 100 may be configured to determine four corners of the scanned document. The CM system 100 may be configured to apply an XY coordinate system to the scanned document. The CM system 100 may be configured to determine XY coordinates for a highlight search term. The CM system 100 may be configured to display and highlight search results using the XY coordinate system. Since uploaded documents and displays or monitors may have different dimensions, and since browsers may utilize different systems for displaying content, the above-referenced process allows the CM system 100 to be used with a wide variety of documents, display devices and browsers.

Requisition Dashboards and GUIs

Figure 35:
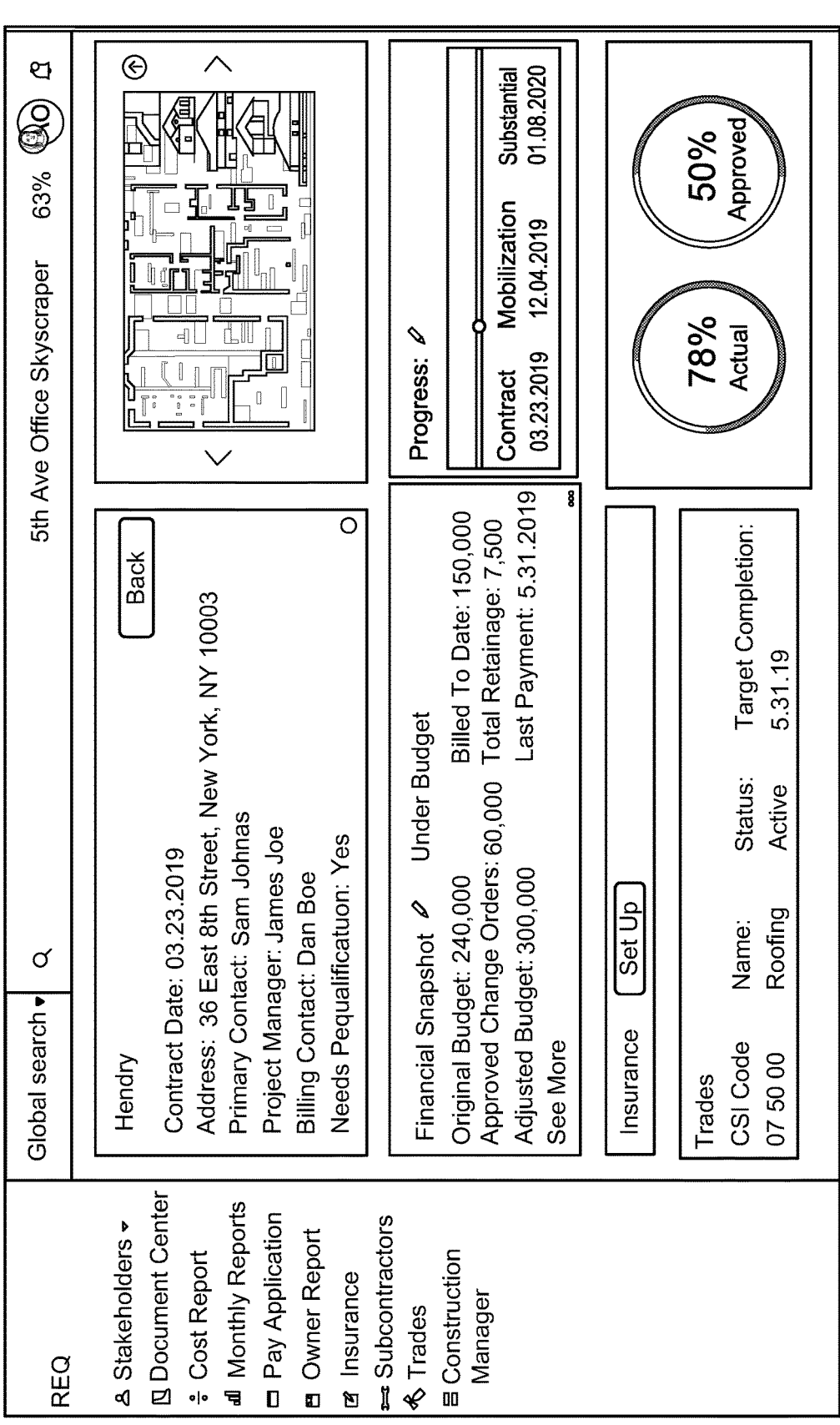
FIG. 35 depicts a dashboard GUI associated with the method for CM according an exemplary embodiment.

FIG. 35 depicts a dashboard GUI associated with the method for CM according an exemplary embodiment. The dashboard GUI may include one or more of a menu, a search field, a project summary field, a financial snapshot field, an insurance field, a trades field, an image display field, a progress bar field, a metrics field, navigation features, and the like. The menu may include one or more of a stakeholders tool, a document center, a cost report, monthly reports, a pay application, an owner report, an insurance tool, a subcontractors tool, a trades tool, a construction manager tool, and the like. An example of the search field is described in greater detail above. The project summary field may include one or more of a project name field, a contract date field, a project address field, a primary contact field, a project manager field, a billing contact field, a needs pre-qualification field, and the like. The financial snapshot field may include one or more of an under/over budget field, an original budget field, an approved change orders field, an adjusted budget field, a billed to date field, a total retainage field, a last payment field, and the like. The trades field may include one or more of a CSI code field, a trade name field, a status field, a target completion date field, and the like. The image display field may include one or more images associated with the project, the trade, or the like. In the example of FIG. 35, a sheet from a set of construction drawings is displayed in thumbnail format. The progress bar field may include a contract date field, a mobilization date field and a substantial completion date field. The progress bar field may include an indicator of a progress of the project. The indicator may be any suitable indicator for showing progress. In the example of FIG. 35, progress is depicted with a button on a sliding bar above the contract date field, the mobilization date field and the substantial completion date field, and the progress is after contract and before mobilization. The metrics field may include one or more of an actual progress completion field and an approved field. The actual progress completion field and the approved field may include any suitable indicator for showing progress. In the example of FIG. 35, each the actual progress completion field and the approved field is a ring-shaped graphic with 100% corresponding with a completely filled ring-shaped graphic and partial percentages corresponding with a proportionately sized partially filled ring-shaped graphic.

FIG. 36 depicts partial GUIs associated with the schedule of values, 3-D modeling and scheduling for the method for CM according an exemplary embodiment. That is, the CM system 100 may be configured to display a GUI for a schedule of values for one or more subcontractors (e.g., an upper portion of FIG. 36) as well as 3-D models of the project (e.g., a lower left portion of FIG. 36) and a construction schedule (e.g., a lower right portion of FIG. 36). The CM system 100 may be configured to apply analytics to construction project data. The CM system 100 may be configured to develop effective and actionable insights based on the analytics. The CM system 100 may be configured to digitize documents associated with at least one requisition process. The CM system 100 may be configured to capture and analyze data to produce indicators that predict cost overruns, delays, and/or risks. The CM system 100 may be configured to perform predictions and risk management in real-time. The CM system 100 may be configured to generate insights for stakeholders to use in making informed decisions during project management. The CM system 100 may be configured to link the schedules of values, building information model (BIM) models, imagery, and construction schedules into a unified data platform. The unified data platform may be configured to identify risk in real-time.

Second Architecture

Figure 37:
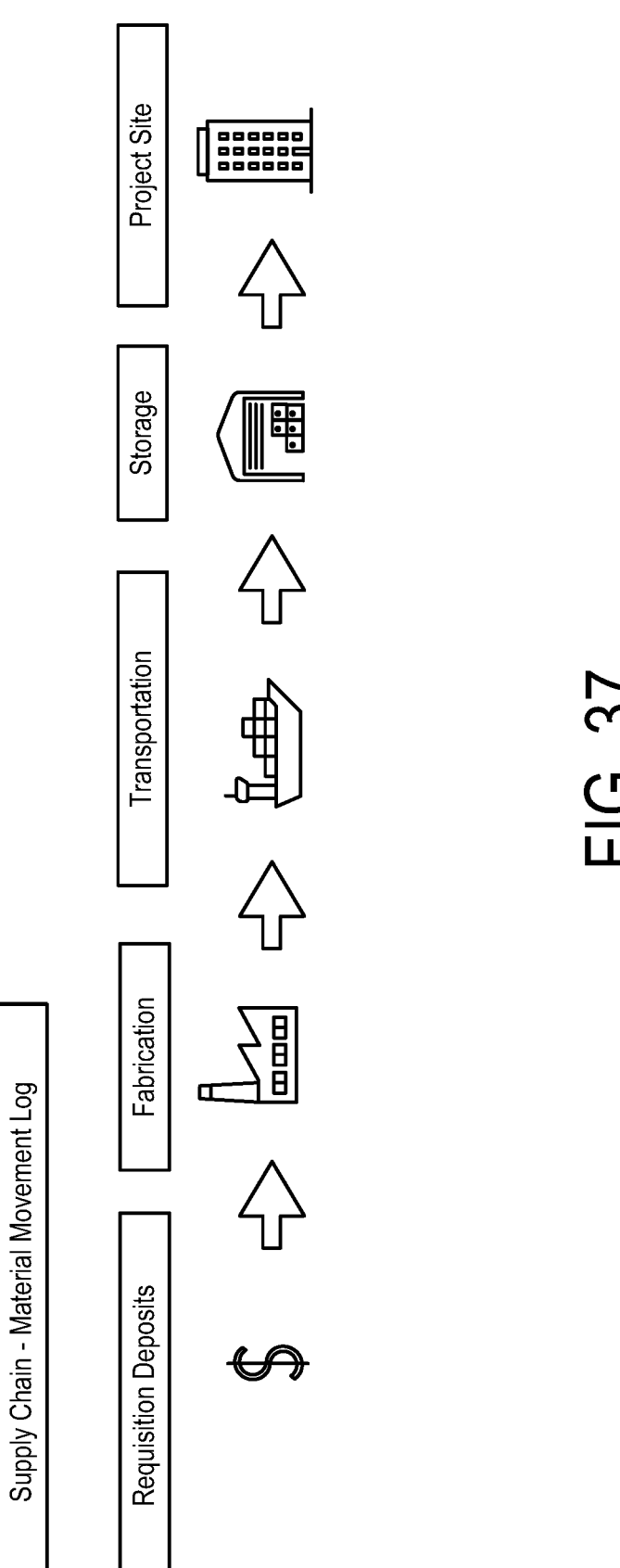
FIG. 37 depicts an architecture for the method for CM according an exemplary embodiment.

FIG. 37 depicts an architecture for the method for CM according an exemplary embodiment. The architecture may include an integration of information regarding material movement logs across an entire supply chain. The supply chain may include movement of material from requisition deposit (e.g., in a financial institution), to fabrication, transportation, storage, and installation at a project site.

OCR Process

Figure 24:
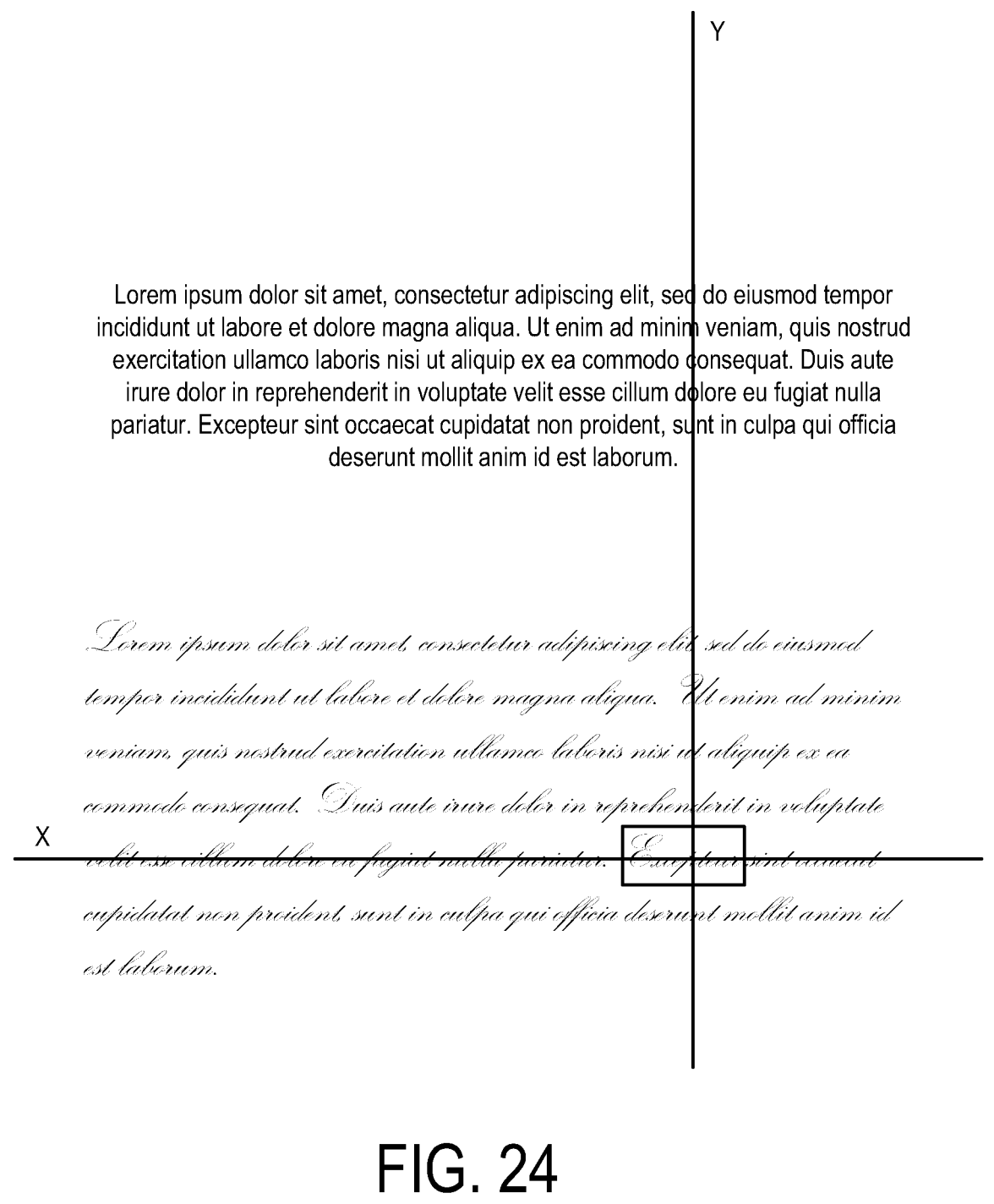
Figure 25:
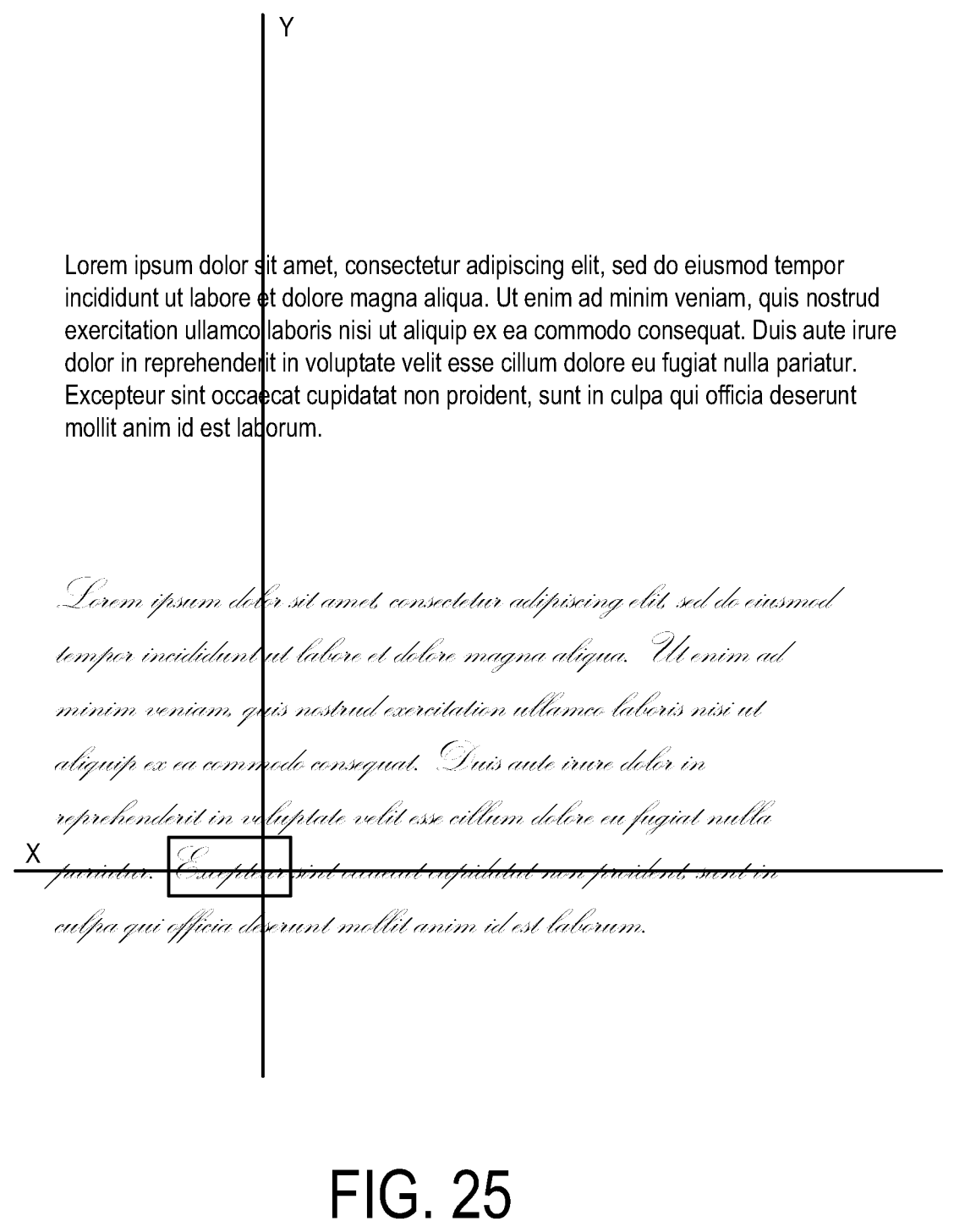

FIG. 38 depicts an OCR process for the method for CM according an exemplary embodiment. The OCR process may include uploading a document (e.g., FIGS. 22 and 27). The OCR process may include detecting and reading printed and handwritten text from the uploaded document (e.g., FIGS. 23, 24, 29 and 30). The OCR process may include determining, receiving and saving X and Y coordinates of the detected text (e.g., FIGS. 24 and 34). The OCR process may include determining, receiving and saving X and Y coordinates of a bounding box associated with the detected text (FIGS. 24 and 25). The OCR process may include normalizing the X and Y coordinates (e.g., FIGS. 25 and 34). The OCR process may include saving the original and normalized X and Y coordinates in a search index (e.g., data store 18, FIG. 1).

Search and Highlight Process

FIG. 39 depicts a searching and highlighting process for the method for CM according an exemplary embodiment. The searching and highlighting process may include prompting a user to enter a search of a document (e.g., FIGS. 28, 30, 33 and 35). The searching and highlighting process may include identifying one or more terms of the search as matching text stored in the search index (e.g., data store 18). The searching and highlighting process may include analyzing a size of a screen and/or a browser (e.g., FIG. 34). The searching and highlighting process may include adjusting the X and Y coordinates based on the size analysis (e.g., FIG. 24 to FIG. 25). The searching and highlighting process may include generating an indicator, which may include a yellow colored box (e.g., FIG. 25) and/or a shaded region (e.g., FIG. 26). The searching and highlighting process may include annotating the document to include the generated indicator and displaying the annotated document (e.g., FIGS. 26, 29, 30, 33 and 34).

Third Architecture

Figure 40B:
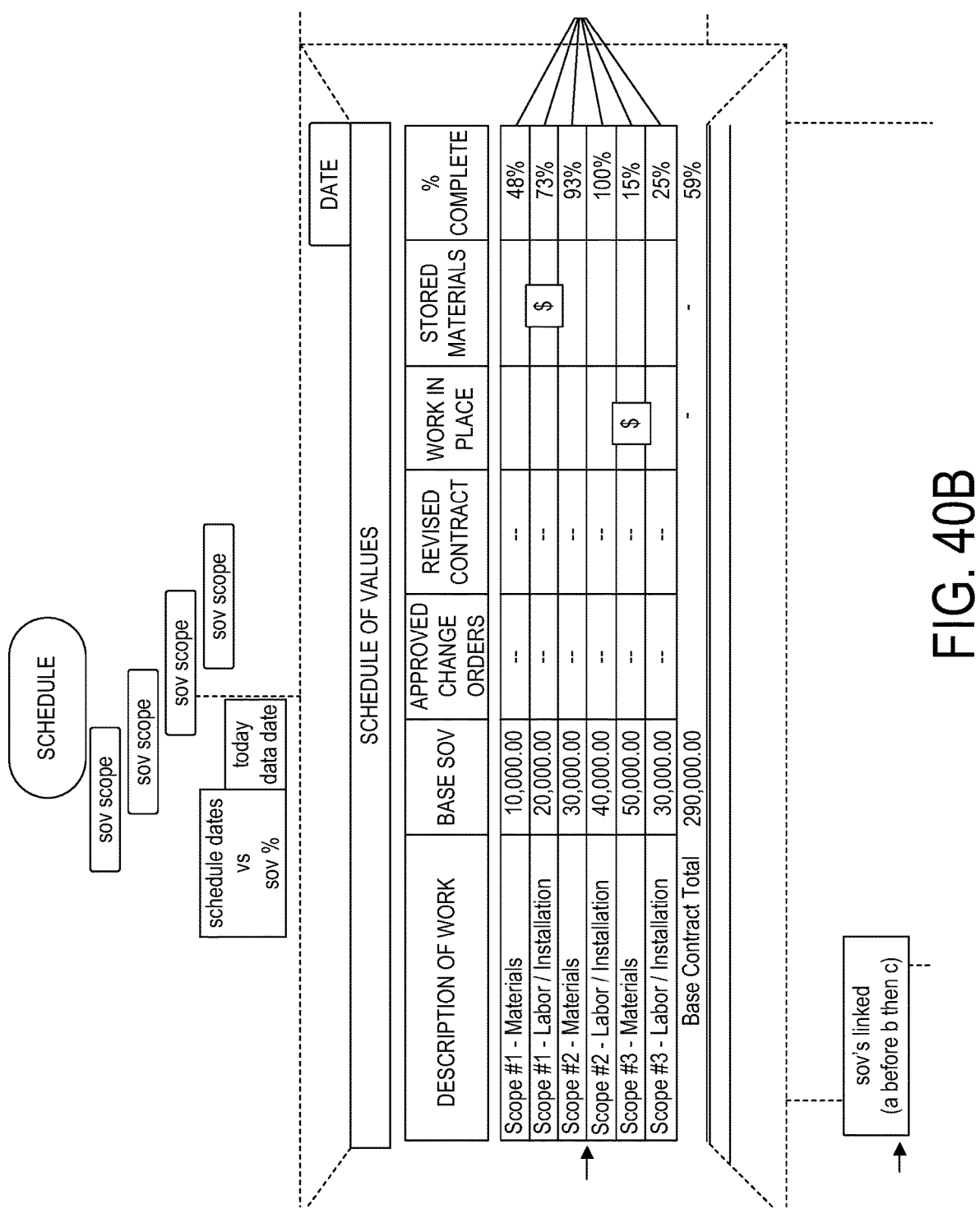
FIG. 40B, which depicts a schedule module and a schedule of values module for the method for CM according an exemplary embodiment.
Figure 40C:
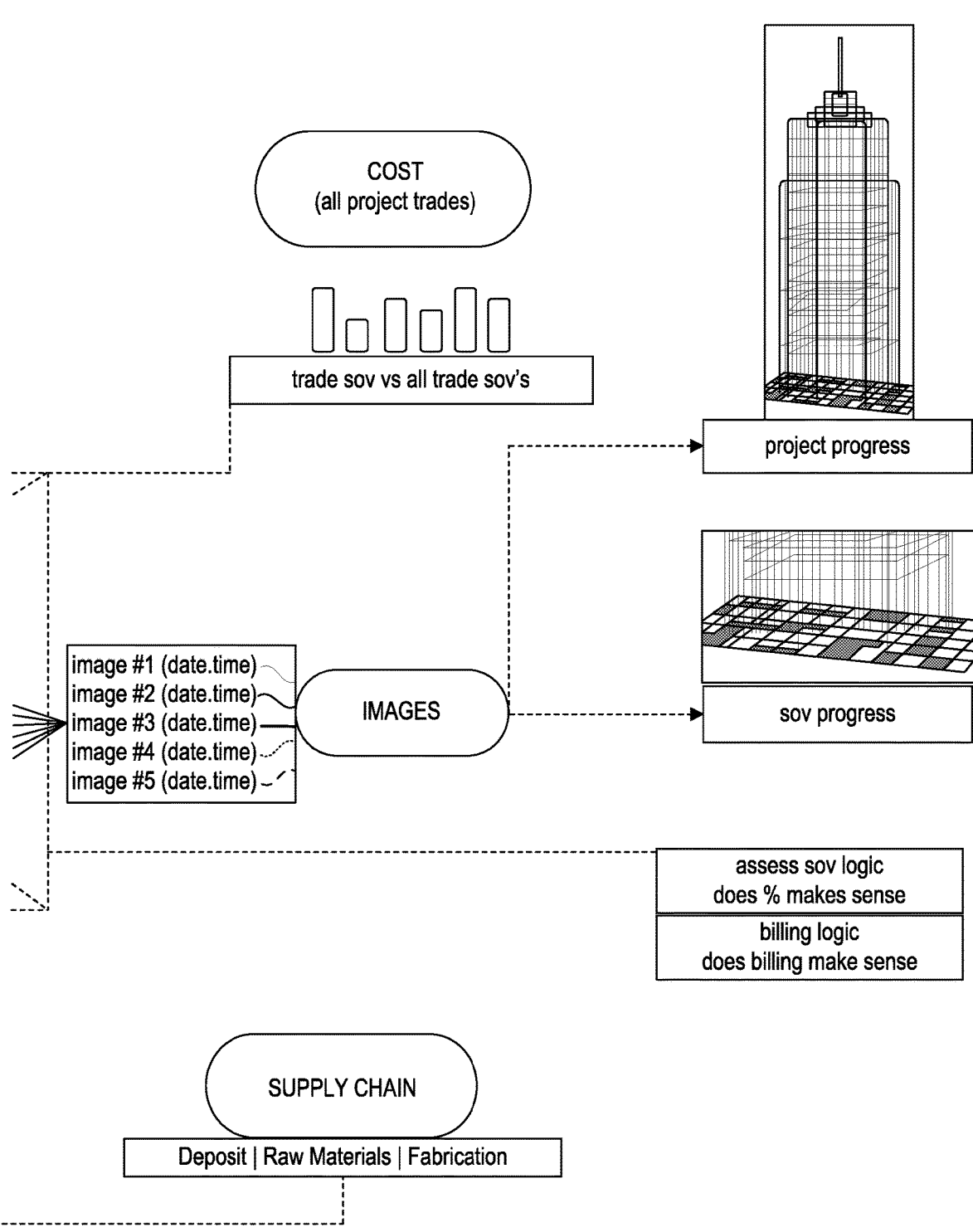
FIG. 40C depicts a cost module, an images module, and a supply chain module for the method for CM according an exemplary embodiment.

The CM system 100 may be configured to incorporate one or more features of an architecture depicted in FIG. 40. Also, the CM system 100 may be configured to run concurrently with the architecture of FIG. 40. FIG. 40 depicts an architecture for the method for CM according an exemplary embodiment. The architecture may include one or more of four sections, including a section depicted in FIG. 40A, which depicts a BIM/coordination module and a bidding module for the method for CM according an exemplary embodiment; a section depicted in FIG. 40B, which depicts a schedule module and a schedule of values module for the method for CM according an exemplary embodiment; a section depicted in FIG. 40C depicts a cost module, an images module, and a supply chain module for the method for CM according an exemplary embodiment; a section depicted in FIG. 40D depicts schedules of values for the schedule of values module for the method for CM according an exemplary embodiment; and the like. That is, the architecture may include one or more of the BIM/coordination module, the bidding module, the schedule module, the schedule of values module, the cost module, the images module, the supply chain module, and the like. Please note, FIG. 40 may be used as a key for FIGS. 40A-40D, inclusive, in which a right side of FIG. 40A lines up with a left side of FIG. 40B, a right side of FIG. 40B lines up with a left side of FIG. 40C, and a bottom of FIG. 40B lines up with a top of FIG. 40D.

In FIGS. 40-40D, inclusive, where direct connections are illustrated between adjacent components, the system CM 100 may include additional components therebetween. Where indirect connections are illustrated between two components with at least a third component therebetween, the CM system 100 may omit the third component therebetween and thus the two components may be directly connected components, where otherwise functional.

Any one of the BIM/coordination module, the bidding module, the schedule module, the schedule of values module, the cost module, the images module, and the supply chain module may be directly or indirectly connected to any other one of the BIM/coordination module, the bidding module, the schedule module, the schedule of values module, the cost module, the images module, the supply chain module. In FIG. 40, each of the BIM/coordination module, the bidding module, the schedule module, the schedule of values module, the cost module, the images module, the supply chain module is connected to every other one of the BIM/coordination module, the bidding module, the schedule module, the schedule of values module, the cost module, the images module, the supply chain module; however, the architecture is not limited to this arrangement.

The BIM/coordination module may include a schedule of values (SOV) item coordination status module and an SOV line item percentage complete module. The BIM/coordination module may be configured to compare an SOV item coordination status with an SOV line item percentage complete for display as a percentage in the SOV module. The bidding module may include a trade scope, a group total (e.g., $ value), a list of details for each SOV, and the like. The bidding module may send and/or receive a standardized SOV or a detailed SOV to and/or from the SOV module.

The schedule module may include one or more SOV scopes. The schedule module may be configured to compare a schedule of dates with an SOV percentage. The schedule module may be configured to determine the comparison of the schedule of dates with the SOV percentage for any given date including today's date.

The schedule of values module may include one or more of the following: a date field, a description of work field, a base SOV field, an approved change orders field, a work in place field, a stored materials field, a percentage (%) complete field, a base contract total field, a work in place total field, a stored materials total field, and a total percentage complete field. The description of work field may include a scope description, a scope number, information regarding whether the scope relates to, e.g., materials, labor/installation, and the like. The base SOV field may include a dollar amount. The percentage complete field may be a weighted average of the percentage complete for each item in the description of work field. The weight may be based on the base SOV for each item in the description of work field. For example: Total Percentage Complete=[(Base SOV(x)/Base Contract Total)*% Complete (x)+(Base SOV(x+1)/Base Contract Total)*% Complete (x+1)+ . . . (Base SOV(x+n)/Base Contract Total)*% Complete (x+n)], where x is the number of each description of work, and n is the total number of descriptions of work. The total percentage complete may be compared to SOV data using an SOV comparator to ensure that the total percentage complete makes sense. The total percentage complete may be compared to billing data using a billing comparator to ensure that the total percentage complete makes sense.

The cost module may include data from all project trades. The cost module may be configured to compare one trade's SOV with SOV's from all trades. A date and time may be associated with each image.

The images module may include project progress data, project progress photos, SOV progress data, and the like. As noted in detail hereinabove (e.g., FIGS. 13-19 and their related descriptions), images may be coded to indicate a percentage complete for one or more trades.

The supply chain module may include data associated with movement of material from requisition deposit (e.g., in a financial institution), to fabrication, transportation, storage, and installation at a project site (e.g., FIG. 37).

SOVs may be linked according to a critical path of the project, e.g., SOVa before SOVb, then SOVc, or the like.

The architecture may be configured to receive SOVs as input. In some exemplary embodiments, inputs may include a description of work, a trade associated with performing a work task, a base contract value for an SOV line item, change orders, and a percentage of completion. The architecture may be configured to receive these inputs, and analyze the inputs. The analysis of the inputs may be performed in a background of the architecture. A detailed analysis may be performed to generate an informed data set, which may include a relational database. The informed data set may linked to multiple elements of a construction process.

For example, an SOV may be compared with a billing percentage of completion on any given trade. A risk of schedule delay may be calculated based on a hierarchy of events on a construction schedule. The risk of schedule delay may be calculated based on an order of operations. The order of operations may include a critical path, i.e., one or more tasks that must be complete before a subsequent task may begin. The risk of schedule delay may be based on a comparative analysis of relationships between construction schedule items. Billing of one trade may be restricted until other trades are complete. An estimate of a future date when a given work item is expected to be complete may be based on the comparative analysis of the relationships between construction schedule items. An estimate of risk of delay to the critical path may be based on the comparative analysis of the relationships between construction schedule items. The critical path may relate to an overarching construction schedule, which may have multiple critical paths.

Also, the trade billing percentages in the SOV may be compared with a single trade, The single trade may be compared with total trade billings. Based on these comparisons, a risk to cost overages and/or schedule delays may be calculated.

3D and/or BIM models may be used to compare the SOVs to a coordination status. The system may be configured to generate one or more mitigation flags. For example, if an attempt is made to bill a trade that is not in coordination (e.g., a subsequent trade that should have started after completion of an earlier trade starts prematurely early), a mitigation flag may be generated and transmitted. One or more images, e.g., from the 3D and/or BIM models, from photography, or the like, may be linked to one or more items in the SOV. The system may be configured to compare an image of a given work item, compare the image to what is expected by data in the SOV, and determine in real-time whether the percentage of billing completion is consistent with what is actually present in the field. If misalignment is detected, then a mitigation flag may be generated and transmitted. For example, a mitigation flag may be generated and transmitted when the percentage of completion for drywall is 100% in the SOV, but an analysis of an image of the drywall work detects incomplete work.

The system may be configured to generate one or more 3D models of construction updated by SOV % of completion in real-time.

Risk may be assessed through the supply chain by comparing movements of materials and comparing the movements of materials with the percentage of billing completion through the SOV. For example, when a disruption occurs in a supply chain, a mitigation flag may be generated and transmitted. The system may be configured to generate a risk of delay, a duration of possible delay, a predicted effect on affected trades.

During the bidding process, relationships may work backwards from the SOV. That is, analysis and bidding may be performed based on measurements and calculations of trade efficiency. For example, a given trade on the critical path may be incentivized to increase an offer to perform work knowing that change orders are costly to downstream construction tasks. The system may be configured to analyze historic data including, e.g., a complete analysis of trades, to provide guidance for the bidding process. For example, if a determination is made that sheetrock has a 50% likelihood of generating a project delay, the system may be configured to flag the trade and transmit the flag to the bidding system. The user may then be prompted to review and annotate contracts. For example, the prompt may suggest adding language to the contract guaranteeing delivery of a given work item by the subcontractor, implementing stronger penalties for delay by the subcontractor, emphasizing "act of God" provisions set forth by the subcontractor, and the like. As a result, the system promotes efficient bidding of jobs and mitigation of potential change orders.

Schedule Module

The schedule module may be configured to compare SOV line items with a percentage of completion. The schedule module may be configured to compare SOV line items with one or more schedules. The schedule module may be configured to coordinate with a payment module. For example, when the payment module is generating a bill involving certain line items of the SOV, and the system determines that completion of another trade is incomplete (e.g., a breakdown in the work structure or schedule), a warning flag may be generated and transmitted. An example of a rule that may be encoded into the system: in order to begin painting, priming must be at least 50% complete. Another example of a rule that may be encoded into the system: a sheetrock wall must be 100% complete before priming to begin.

The schedule module may be configured to mitigate a front-end loading issue. That is, at a beginning of a project, SOV line item data may be inputted, and, as work progresses, a percentage of completion of a total scope of a trade may be inputted, which may trigger billing of line items. Descriptions and dates may be inputted. The system may be configured to analyze data using an artificial intelligence (AI) engine, data science modules, and comparative analysis modules. The system may be configured, based on the analysis of data, to output a risk of delay to the overarching construction schedule. The system may be configured, based on the analysis of data and the BIM and/or 3D model, to output a risk of impact.

BIM

The BIM may show 100% completion. However, a condition contrary to the 100% completion entry may be detected by the system. An example of the condition, is an image of a roof drain out of alignment with a roof penetration. Another example of the condition may be rework, such as when sheetrock is hastily installed, ripped out, and reinstalled. Conversely, once the 100% completion is confirmed in the field, the BIM module may generate and transmit a coordination complete signal. The system may, in response to a completion signal, be configured to detect incomplete billing, and prompt the user to bill 100%. Another example of the condition is presence of a non-conformance report (NCR) without resolution.

Supply Chain Module

In an instance where a supply chain is affected, ceiling tile hangers may not be installed (thus delaying installation of ceiling tile). The system may be configured to generate and transmit a flag directing a user to review the SOV line item. The percentage of completion may be recalculated or the display of the percentage of completion may be flagged (e.g., displayed with an alert or with a different color) when the supply chain for a given trade is affected. In the foundation trades, the present system may be configured to compare current percentage of completion with historical data.

Images Module

The images module may include images associated with a completed sheetrock wall and an incomplete sheetrock wall. The BIM coordination function may be linked to the images module, and the percentage of completion of the SOV.

Bidding Module

The bidding module may be configured by trade. The bidding module may include a scope of work for a bid to be bid out. The bidding module may summarize detail of a group of related work items within a trade. The bidding module may be configured to highlight bids requiring takeoffs. Please note, in construction, a "takeoff" refers to a process of quantifying a material quantity required for a construction project. The quantification may include counting and measuring items from a set of drawings. The quantification may be performed manually or with the aid of a scanning and analysis module.

The bidding module may be configured to annotate an architect's drawings with symbols linking to bids in the bidding module. The bidding module may be configured to sort information related to the bids. The bidding module may prompt use of a standardized requisition. For example, in response to a determination that a trade has a high risk, the bidding module may suggest replacement of an existing requisition with the standardized requisition. The bidding module may be configured to transmit detail from the current SOV. The bidding module may be configured so that an administrator of the CM system may transmit suggestions to users of the CM system.

The bidding module may be configured to receive a manual takeoff from a trade, scan the manual takeoff, highlight key terms in the scanned takeoff, highlight key work items in the drawings, and populate an incorporated takeoff based on the scanned takeoff. The system may be configured to identify commonalities between a project in progress and historical projects. The system may be configured with keywords associated with commonalities linked to risk, e.g., risk of delay or cost overrun.

Figure 41:
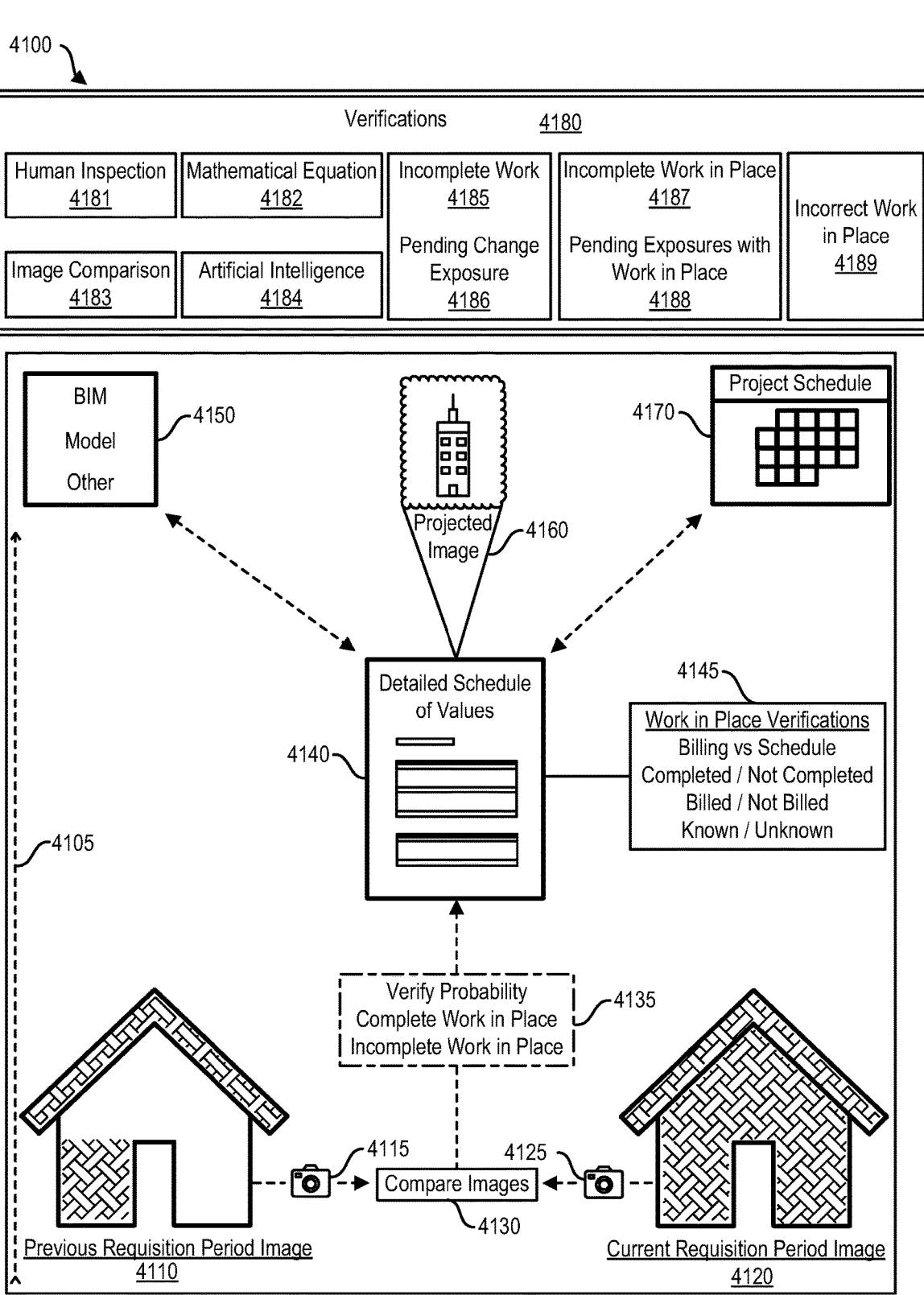
FIG. 41 depicts a flow chart for a system, method and operations including various features of the above-referenced exemplary embodiments.

FIG. 41 depicts a flow chart for a system 4100, a related method and related operations including various features of the above-referenced exemplary embodiments. One or more features of the system 4100, the related method, and the related operations may be omitted, repeated or modified to include one or more features of the exemplary embodiments without limitation. The sequence is exemplary. Steps and operations may be performed in any suitable order.

Each of the system 4100, the related method, and the related operations may include a processing consistent with arrow 4105, i.e., from a bottom of FIG. 41 to a top. The system 4100, the related method, and the related operations may include receiving as input a first image of a previous requisition period 4110. The first image of the previous requisition period 4110 may be captured by any suitable means including an input device 4115, which may include a camera, a drone, a scan of a document in the field, or any other suitable input depicting a previous state of the project. Similarly, the system 4100, the related method, and the related operations may include receiving as input a second image of a current requisition period 4120. The second image of the current requisition period 4120 may be captured by any suitable means including input an input device 4125.

The system 4100, the related method, and the related operations may include a comparison 4130 of the first image 4110 and the second image 4120. The system 4100, the related method, and the related operations may include a verification process 4135. The comparison 4130 may identify changes in any project parameter including, e.g., a percentage of complete work in place, a percentage of incomplete work in place, and the like. The verification process 4135 may include determining a probability that a particular project parameter has been achieved. The probability may be based on the comparison 4130.

The determined probability may be verified. The determined probability may be verified manually by a user of the system 4100, by semiautomated or automated comparison with a schedule of values 4140 or any other suitable method. The detailed schedule of values 4140 may be include any of the features of any of the schedules of values described hereinabove. The detailed schedule of values 4140 may be configured to receive and/or send information from/to systems configured to conduct work in place verifications 4145. The work in place verifications 4145 may include one or more of a comparison of billing versus a schedule, a comparison of completed versus not completed work, a comparison of billed versus not billed items, a comparison of known and unknown items, and the like.

The system 4100, the related method, and the related operations may be configured to send and/or receive information to/from another system 4150. The system 4150 may include a model (e.g., 124), including BIMs. The system 4100, the related method, and the related operations may include a system 4160 for generating, transmitting and projecting an image representing the project or an update to such image. The image may be a past, present or future state of the project. The system 4100, the related method, and the related operations may include a system 4170 for generating, transmitting and projecting a schedule image representing the project or an update to such schedule. The schedule may be related to a past, present or future state of the project.

The system 4100, the related method, and the related operations may include a verifications system 4180, such as the verification module 40, the verifications 116 or any other related system or sub-system. The vertifications system 4180 may include any form of information generated by a human inspection 4181, a mathematical equation 4182, an image comparison 4183, an artificial intelligence system 4184, an indicator of incomplete work 4185, an indicator of a pending change of exposure 4186, an indicator of incomplete work in place 4187, an indicator of pending exposures with work in place 4188, an indicator of incorrect work in place 4189, an update associated with any of the information or indicator, a combination of any of the information or indicator, and a physical, scanned or digital version of any of the information or indicator.

The system 4100, the related method, and the related operations support long-term growth trajectory of all asset classes at scale. The system 4100, the related method, and the related operations may be configured to be deployed across projects regardless of budget size and geographic region.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The illustrated aspects of the disclosure may also be practiced in distributed computing environments where certain tasks are performed by remote processing devices that are linked through a communications network. In a distributed computing environment, program modules may be located in both local and remote memory storage devices.

Moreover, it is to be appreciated that various components described herein may include electrical circuit(s) that may include components and circuitry elements of suitable value in order to implement the embodiments of the subject innovation(s). Furthermore, it may be appreciated that many of the various components may be implemented on at least one integrated circuit (IC) chip. For example, in one embodiment, a set of components may be implemented in a single IC chip. In other embodiments, at least one of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks may include those components or specified sub-components, some of the specified components or sub-components, and/or additional components, and according to various permutations and combinations of the foregoing. Sub-components may also be implemented as components communicatively coupled to other components rather than included within parent components (hierarchical). Additionally, it should be noted that at least one component may be combined into a single component providing aggregate functionality or divided into several separate sub-components, and any at least one middle layer, such as a management layer, may be provided to communicatively couple to such sub-components in order to provide integrated functionality. Any components described herein may also interact with at least one other component not specifically described herein but known by those of skill in the art.

In addition, while a particular feature of the subject innovation may have been disclosed with respect to only one of several implementations, such feature may be combined with at least one other feature of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with at least one specific functionality. For example, a component may be, but is not limited to being, a process running on a processor (e.g., digital signal processor), a processor, an object, an executable, a thread of execution, a program, and/or a computer. By way of illustration, both an application running on a controller and the controller may be a component. At least one component may reside within a process and/or thread of execution and a component may be localized on one computer and/or distributed between two or more computers. Further, a "device" may come in the form of specially designed hardware; generalized hardware made specialized by the execution of software thereon that enables the hardware to perform specific function; software stored on a computer-readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which may include computer-readable storage media and/or communications media, in which these two terms are used herein differently from one another as follows. Computer-readable storage media may be any available storage media that may be accessed by the computer, is typically of a non-transitory nature, and may include both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by at least one local or remote computing device, e.g., via access requests, queries or other data retrieval protocols, for a variety of operations with respect to the information stored by the medium.

On the other hand, communications media typically embody computer-readable instructions, data structures, program modules or other structured or unstructured data in a data signal that may be transitory such as a modulated data signal, e.g., a carrier wave or other transport mechanism, and includes any information delivery or transport media. The term "modulated data signal" or signals refers to a signal that has at least one of its characteristics set or changed in such a manner as to encode information in at least one signal. By way of example, and not limitation, communication media include wired media, such as a wired network or direct-wired connection, and wireless media such as acoustic, radio frequency (RF), infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure may occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units to perform the exemplary process, it is understood that the exemplary processes may also be performed by one or plurality of modules.

The use of the terms "first", "second", "third" and so on, herein, are provided to identify various structures, dimensions or operations, without describing any order, and the structures, dimensions or operations may be executed in a different order from the stated order unless a specific order is definitely specified in the context.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

CONCLUSION

It is to be understood that the above description is intended to be illustrative and not restrictive. Many embodiments and applications other than the examples provided would be apparent to those of skill in the art upon reading the above description. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed teachings.

The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems, processes and methods will be incorporated into such future embodiments. In sum, it should be understood that the present teachings are capable of modification and variation and is limited only by the following claims. All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The subject matter described herein may be embodied in systems, apparatus, methods, and/or articles depending on the desired configuration. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other embodiments may be within the scope of the following claims.

What is claimed is:

1. A system for construction management, the system comprising:

a device having at least one processor and a memory storing at least one program for execution by the at least one processor, the at least one program including instructions that, when, executed by the at least one processor, causes the at least one processor to perform operations comprising:

generating, with the at least one processor, a schedule of values (SOV) in real time based on a plurality of SOV descriptions, each of the SOV describing a specific construction work element for a construction project;

receiving as input, with the at least one processor, a verification component related to an actual condition of the specific construction work element of the construction project, and storing the verification component in a predetermined unitary database, the input being generated using at least one of:

one or more sensors, and one or more automated surveillance devices positioned at a project worksite of the construction project and communicatively coupled to the at least one processor, transmitting, automatically, the input to the at least one processor wherein one of the one or more sensors and the one or more automated surveillance devices are remotely operated using one or more programming instructions, the one or more programming instructions:

including an identification of at least one of a location and a predetermined surveillance travel path in the project worksite for collection of the verification component by at least one of one or more sensors and the one or more automated surveillance devices, being automatically generated and transmitted by the at least one processor to the at least one of one or more sensors and the one or more automated surveillance devices in response to receiving an electronic requisition, and being configured to cause the at least one of one or more sensors and the one or more automated surveillance devices to:

perform, in response to receiving the one or more programming instructions, inspection of the project worksite of the construction project, and collect, based on the inspection that is performed, the verification component, and transmit the verification component to the at least one processor;

determining, with the at least one processor, a current completion status of the specific construction work element by comparing the verification component with a prior version of the verification component and/or a predetermined condition;

determining whether the verification component is acceptable, partially acceptable or unacceptable for verifying the current completion status of at least one of the plurality of SOV descriptions corresponding to the specific construction work element based on an additional comparison of one of:

a pixel data extracted from one or more electronic images, a portion of one or more electronic documents, or a portion of one or more electronic images and any combination thereof, wherein each of the pixel data, the portion of the one or more electronic documents, or the portion of the one or more electronic images are included in the input with data associated with the actual condition of the specific construction work element, the comparing of the verification component with the prior version of the verification component and/or the predetermined condition including an additional inspection of the actual condition independent of requiring presence and/or a manual input; and generating, with the at least one processor, a payment authorization in response to the determining being acceptable, transmitting the payment authorization that is acceptable to a payment provider, and authorizing payment to a contractor by the payment provider of an amount of a payment corresponding to a requested amount of the electronic requisition.

2. The system of claim 1, wherein the operations further comprise:

generating, with the at least one processor, a notification of rejection in response to the verification component being partially acceptable or unacceptable; resubmitting, with the at least one processor, the verification component determined to be partially acceptable or unacceptable for consideration and/or correction of the specific construction work element of the construction project; and updating, with the at least one processor, the SOV in real time based on the determining the current completion status and/or the determining whether the verification component is acceptable, partially acceptable or unacceptable.

3. The system of claim 2, wherein the operations further comprise updating, with the at least one processor, the SOV in real time based on the determining the current completion status and/or the determining whether the verification component is acceptable, partially acceptable or unacceptable.

4. The system of claim 3, further comprising:

identifying at least one string of data from the electronic requisition;

mapping the identified at least one string of data to the predetermined unitary database including at least one key string of data associated with at least one key event;

tagging the mapped and identified at least one string of data with a tag associated with the at least one key string of data associated with the at least one key event;

determining corrective and/or mitigation actions to minimize deviations from a schedule of the project based on the tagged, mapped, and identified at least one string of data and the tagged, mapped, and identified historic collection;

transmitting the corrective and/or mitigation actions, wherein the corrective and/or mitigation actions are determined by use of a data structure including data elements associated with the SOV, the schedule of the project, and a contract of the project with a unique SOV tag for integrating the SOV, the schedule of the project, and the contract of the project, and wherein, in response to a change to at least one of the data elements, the operations further comprise updating the SOV, the schedule of the project, and the contract of the project.

5. The system of claim 3, wherein the comparison of the verification component with the actual condition of the specific construction work element includes inspection of the actual condition with one or more of a robot, an autonomous device, an unmanned device, an unmanned vehicle, an unmanned aerial vehicle, an unmanned aerial system, a premises security system element, a security camera, an audio sensor, and a motion sensor.

6. The system of claim 3, wherein the comparison of the verification component with the actual condition of the specific construction work element includes:

comparing each of the SOV descriptions to a coordination status;

determining from the comparing of each of the SOV descriptions to the coordination status whether a trade is in coordination or out of coordination; and generating and transmitting a mitigation flag based on the determining of whether the trade is coordination or out of coordination.

7. The system of claim 3, wherein the operations further comprising:

determining and updating in real time, with the at least one processor, the current completion status of the specific construction work element by comparing the verification component with the prior version of the verification component and/or the predetermined condition;

adjusting the current completion status in real time, with the at least one processor, based on one or more of:

an unapproved work in place, an instruction to correct work in place that is determined not to meet a condition of the contract, an unapproved change order, a total cost of materials on order and not yet received, a change in general conditions of the contract, an unpredictable event, an accident, a natural disaster, and an act of God; and actioning, with the at least one processor, a recovery plan and/or a mitigation action in response to the adjusting the current completion status in real time.

8. The system of claim 3, wherein the operations further comprising:

displaying via a graphical user interface (GUI) an image of the SOV and the current completion status of the specific construction work element:

adjusting, with the at least one processor, the current completion status in real time in response to the determining, with the at least one processor, whether the verification component is acceptable, partially acceptable or unacceptable to verify the current completion status of the SOV description of the specific construction work element based on a comparison of the verification component with the actual condition of the specific construction work element;

continuously updating the SOV displayed on the GUI based on the adjusted current completion status in real time, wherein the displaying, adjusting, and continuously updating are performed before the generating, with the at least one processor, the payment authorization in response to the acceptable determination, transmitting the acceptable payment authorization to the payment provider, and authorizing the payment to the contractor by the payment provider of the amount of the payment corresponding to the requested amount of the requisition; and/or the generating, with the at least one processor, the notification of rejection in response to the determination being partially acceptable or unacceptable, and resubmitting, with the at least one processor, the partially acceptable or unacceptable verification component for consideration and/or correction of the specific construction work element of the construction project.

9. The system of claim 2, wherein the comparing includes at least one of:

performing a computer-implemented statistical method of the comparing of the verification component with the prior version of the verification component and/or the predetermined condition;

performing, with an artificial intelligence system operatively connected to the at least one processor, a machine learning method of comparison of the verification component with the prior version of the verification component and/or the predetermined condition; and a combination of any of the group.

10. The system of claim 2, wherein the predetermined unitary database includes at least one of:

a historic collection of at least one of: a bid document, a contract, a schedule of values tag, a project schedule, an historic schedule of values, an historic requisition, a verification, a change order, an unapproved work in place, a work authorization, a report, an email, a file, a text message, an electronic notebook, a database, a model, a payment, an invoice, a receipt, an image of any of a group, an update associated with any of the group, a combination of any of the group, and a physical, scanned or digital version of any of the group;

an analysis of the historic collection; and an association of the analysis of the historic collection with at least one key event;

wherein the operations further comprise:

displaying via a graphical user interface an image of the SOV and the current completion status of the specific construction work element;

adjusting, with the at least one processor, the current completion status in real time in response to a change in one or more of the historic collection, the analysis of the historic collection, the association of the analysis of the historic collection with the at least one key event; and continuously updating the SOV displayed on the graphical user interface based on the current completion status that is adjusted in real time, wherein the at least one key event is at least one of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

11. The system of claim 2, wherein the operations further comprise:

receiving as an additional input an electronic version of a document, wherein the document includes at least one of a bid document, a change order, an unapproved work in place, and a verification input; and mapping the at least one of the bid document, the change order, the unapproved work in place, and the verification input to the SOV.

12. A method implemented by a computer, comprising:

generating, with at least one processor of the computer, a schedule of values (SOV) in real time based on a plurality of SOV descriptions, each of the SOV describing a specific construction work element for a construction project;

receiving as input, with the at least one processor, a verification component related to an actual condition of the specific construction work element of the construction project, and storing the verification component in a predetermined unitary database, the input being generated using at least one of:

one or more sensors, and one or more automated surveillance devices positioned at a project worksite of the construction project and communicatively coupled to the at least one processor, transmitting, automatically, the input to the at least one processor wherein one of the one or more sensors and the one or more automated surveillance devices are remotely operated using one or more programming instructions, the one or more programming instructions:

including an identification of at least one of a location and a predetermined surveillance travel path in the project worksite for collection of the verification component by at least one of one or more sensors and the one or more automated surveillance devices, being automatically generated and transmitted by the at least one processor to the at least one of one or more sensors and the one or more automated surveillance devices in response to receiving an electronic requisition, and being configured to cause the at least one of one or more sensors and the one or more automated surveillance devices to:

perform, in response to receiving the one or more programming instructions, inspection of the project worksite of the construction project, and collect, based on the inspection that is performed, the verification component, and transmit the verification component to the at least one processor;

determining, with the at least one processor, a current completion status of the specific construction work element by comparing the verification component with a prior version of the verification component and/or a predetermined condition;

determining whether the verification component is acceptable, partially acceptable or unacceptable for verifying the current completion status of at least one of the plurality of SOV descriptions corresponding to the specific construction work element based on an additional comparison of at least one of:

a pixel data extracted from one or more electronic images, a portion of one or more electronic documents, or a portion of one or more electronic images and any combination thereof, wherein each of the pixel data, the portion of the one or more electronic documents, or the portion of the one or more electronic images are included in the input with data associated with the actual condition of the specific construction work element, the comparing of the verification component with the prior version of the verification component and/or the predetermined condition including an additional inspection of the actual condition independent of requiring a presence and/or a manual input; and generating, with the at least one processor, a payment authorization in response to the determining being acceptable, transmitting the payment authorization that is acceptable to a payment provider, and authorizing payment to a contractor by the payment provider of an amount of a payment corresponding to a requested amount of the electronic requisition.

13. The method of claim 12, further comprising:

generating, with the at least one processor, a notification of rejection in response to the verification component being partially acceptable or unacceptable; resubmitting, with the at least one processor, the verification component determined to be partially acceptable or unacceptable for consideration and/or correction of the specific construction work element of the construction project; and updating, with the at least one processor, the SOV in real time based on the determining the current completion status and/or the determining whether the verification component is acceptable, partially acceptable or unacceptable.

14. The method of claim 13, wherein further comprising updating, with the at least one processor, the SOV in real time based on the determining the current completion status and/or the determining whether the verification component is acceptable, partially acceptable or unacceptable.

15. The method of claim 14, wherein the comparing includes at least one of:

performing a computer-implemented statistical method of the comparing of the verification component with the prior version of the verification component and/or the predetermined condition;

performing, with an artificial intelligence system operatively connected to the at least one processor, a machine learning method of comparison of the verification component with the prior version of the verification component and/or the predetermined condition; and a combination of any of the group.

16. The method of claim 14, further comprising:

identifying at least one string of data from the electronic requisition;

mapping the identified at least one string of data to the predetermined unitary database including at least one key string of data associated with at least one key event;

tagging the mapped and identified at least one string of data with a tag associated with the at least one key string of data associated with the at least one key event;

determining corrective and/or mitigation actions to minimize deviations from a schedule of the project based on the tagged, mapped, and identified at least one string of data and the tagged, mapped, and identified historic collection;

transmitting the corrective and/or mitigation actions, wherein the corrective and/or mitigation actions are determined by use of a data structure including data elements associated with the SOV, the schedule of the project, and a contract of the project with a unique SOV tag for integrating the SOV, the schedule of the project, and the contract of the project, and wherein, in response to a change to at least one of the data elements, updating the SOV, the schedule of the project, and the contract of the project.

17. The method of claim 14, wherein the comparison of the verification component with the actual condition of the specific construction work element includes inspection of the actual condition with one or more of a robot, an autonomous device, an unmanned device, an unmanned vehicle, an unmanned aerial vehicle, an unmanned aerial system, a premises security system element, a security camera, an audio sensor, and a motion sensor.

18. The method of claim 14, wherein the comparison of the verification component with the actual condition of the specific construction work element includes:

comparing each of the SOV descriptions to a coordination status;

determining from the comparing of each of the SOV descriptions to the coordination status whether a trade is in coordination or out of coordination; and generating and transmitting a mitigation flag based on the determining of whether the trade is coordination or out of coordination.

19. The method of claim 14, further comprising:

determining and updating in real time, with the at least one processor, the current completion status of the specific construction work element by comparing the verification component with the prior version of the verification component and/or the predetermined condition;

adjusting the current completion status in real time, with the at least one processor, based on one or more of:

an unapproved work in place, an instruction to correct work in place that is determined not to meet a condition of the contract, an unapproved change order, a total cost of materials on order and not yet received, a change in general conditions of the contract, an unpredictable event, an accident, a natural disaster, and an act of God; and actioning, with the at least one processor, a recovery plan and/or a mitigation action in response to the adjusting the current completion status in real time.

20. The method of claim 14, the operations further comprising:

displaying via a graphical user interface (GUI) an image of the SOV and the current completion status of the specific construction work element:

adjusting, with the at least one processor, the current completion status in real time in response to the determining, with the at least one processor, whether the verification component is acceptable, partially acceptable or unacceptable to verify the current completion status of the SOV description of the specific construction work element based on a comparison of the verification component with the actual condition of the specific construction work element;

continuously updating the SOV displayed on the GUI based on the adjusted current completion status in real time, wherein the displaying, adjusting, and continuously updating are performed before the generating, with the at least one processor, the payment authorization in response to the acceptable determination, transmitting the acceptable payment authorization to the payment provider, and authorizing the payment to the contractor by the payment provider of the amount of the payment corresponding to the requested amount of the requisition; and/or the generating, with the at least one processor, the notification of rejection in response to the partially acceptable or the unacceptable determination, and resubmitting, with the at least one processor, the partially acceptable or unacceptable verification component for consideration and/or correction of the specific construction work element of the construction project.

21. The method of claim 13, wherein the predetermined unitary database includes at least one of:

a historic collection of at least one of: a bid document, a contract, a schedule of values tag, a project schedule, an historic schedule of values, an historic requisition, a verification, a change order, an unapproved work in place, a work authorization, a report, an email, a file, a text message, an electronic notebook, a database, a model, a payment, an invoice, a receipt, an image of any of a group, an update associated with any of the group, a combination of any of the group, and a physical, scanned or digital version of any of the group;

an analysis of the historic collection; and an association of the analysis of the historic collection with at least one key event.

22. The method of claim 21, further comprising:

displaying via a graphical user interface an image of the SOV and the current completion status of the specific construction work element;

adjusting, with the at least one processor, the current completion status in real time in response to a change in one or more of the historic collection, the analysis of the historic collection, the association of the analysis of the historic collection with the at least one key event; and continuously updating the SOV displayed on the graphical user interface based on the current completion status that is adjusted in real time, wherein the at least one key event is at least one of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group receiving as an additional input an electronic version of a document, wherein the document includes at least one of a bid document, a change order, an unapproved work in place, and a verification input; and mapping the at least one of the bid document, the change order, the unapproved work in place, and the verification input to the SOV.

23. A non-transitory computer-readable storage medium storing at least one program for integrated, in real time, remote construction management, work verification and requisition payment, the at least one program for execution by at least one processor and a memory storing the at least one program, the at least one program including instructions, when, executed by the at least one processor cause the at least one processor to perform operations comprising:

generating, with the at least one processor, a schedule of values (SOV) in real time based on a plurality of SOV descriptions, each of the SOV describing a specific construction work element for a construction project;

receiving as input, with the at least one processor, a verification component related to an actual condition of the specific construction work element of the construction project, and storing the verification component in a predetermined unitary database, the input being generated using at least one of:

one or more sensors, and one or more automated surveillance devices positioned at a project worksite of the construction project and communicatively coupled to the at least one processor, transmitting, automatically, the input to the at least one processor wherein one of the one or more sensors and the one or more automated surveillance devices are remotely operated using one or more programming instructions, the one or more programming instructions:

including an identification of at least one of a location and a predetermined surveillance travel path in the project worksite for collection of the verification component by at least one of one or more sensors and the one or more automated surveillance devices, being automatically generated and transmitted by the at least one processor to the at least one of one or more sensors and the one or more automated surveillance devices in response to receiving an electronic requisition, and being configured to cause the at least one of one or more sensors and the one or more automated surveillance devices to:

perform, in response to receiving the one or more programming instructions, inspection of the project worksite of the construction project, and collect, based on the inspection that is performed, the verification component, and transmit the verification component to the at least one processor; and determining, with the at least one processor, a current completion status of the specific construction work element by comparing the verification component with a prior version of the verification component and/or a predetermined condition;

determining whether the verification component is acceptable, partially acceptable or unacceptable for verifying the current completion status of at least one of the plurality of SOV descriptions corresponding to the specific construction work element based on an additional comparison of at least one of:

a pixel data extracted from one or more electronic images, a portion of one or more electronic documents, or a portion of one or more electronic images and any combination thereof, wherein each of the pixel data, the portion of the one or more electronic documents, or the portion of the one or more electronic images are included in the input with data associated with the actual condition of the specific construction work element, the comparing of the verification component with the prior version of the verification component and/or the predetermined condition including an additional inspection of the actual condition independent of requiring presence and/or a manual input; and generating, with the at least one processor, a payment authorization in response to the determining being acceptable, transmitting the payment authorization that is acceptable to a payment provider, and authorizing payment to a contractor by the payment provider of an amount of a payment corresponding to a requested amount of the electronic requisition.

24. The non-transitory computer-readable storage medium of claim 23, wherein the operations further comprise:

generating, with the at least one processor, a notification of rejection in response to the verification component being partially acceptable or unacceptable; resubmitting, with the at least one processor, the verification component determined to be partially acceptable or unacceptable for consideration and/or correction of the specific construction work element of the construction project; and updating, with the at least one processor, the SOV in real time based on the determining the current completion status and/or the determining whether the verification component is acceptable, partially acceptable or unacceptable.

25. The non-transitory computer-readable storage medium of claim 24, wherein the operations further comprise updating, with the at least one processor, the SOV in real time based on the determining the current completion status and/or the determining whether the verification component is acceptable, partially acceptable or unacceptable.

26. The non-transitory computer-readable storage medium of claim 25, wherein the comparing includes at least one of:

performing a computer-implemented statistical method of the comparing of the verification component with the prior version of the verification component and/or the predetermined condition;

performing, with an artificial intelligence system operatively connected to the at least one processor, a machine learning method of comparison of the verification component with the prior version of the verification component and/or the predetermined condition; and a combination of any of the group.

27. The non-transitory computer-readable storage medium of claim 25, wherein the predetermined unitary database includes at least one of:

a historic collection of at least one of: a bid document, a contract, a schedule of values tag, a project schedule, an historic schedule of values, an historic requisition, a verification, a change order, an unapproved work in place, a work authorization, a report, an email, a file, a text message, an electronic notebook, a database, a model, a payment, an invoice, a receipt, an image of any of a group, an update associated with any of the group, a combination of any of the group, and a physical, scanned or digital version of any of the group;

an analysis of the historic collection; and an association of the analysis of the historic collection with at least one key event;

wherein the operations further comprise:

displaying via a graphical user interface an image of the SOV and the current completion status of the specific construction work element;

adjusting, with the at least one processor, the current completion status in real time in response to a change in one or more of the historic collection, the analysis of the historic collection, the association of the analysis of the historic collection with the at least one key event; and continuously updating the SOV displayed on the graphical user interface based on the current completion status that is adjusted in real time, wherein the at least one key event is at least one of: a predictable event, an unpredictable event, a schedule change, a cost change, a labor change, a material change, an equipment change, a substantial completion date, an occupancy date, a project completion date, an accident, a natural disaster, an act of God, an image of any of the group, an update associated with any of the group, a combination of any of the group, and a physical, scanned or digital version of any of the group.

28. The non-transitory computer-readable storage medium of claim 25, wherein the operations further comprise:

receiving as an additional input an electronic version of a document, wherein the document includes at least one of a bid document, a change order, an unapproved work in place, and a verification input; and mapping the at least one of the bid document, the change order, the unapproved work in place, and the verification input to the SOV.

29. The non-transitory computer-readable storage medium of claim 25, wherein the operations further comprise:

identifying at least one string of data from the electronic requisition;

mapping the identified at least one string of data to the predetermined unitary database including at least one key string of data associated with at least one key event;

tagging the mapped and identified at least one string of data with a tag associated with the at least one key string of data associated with the at least one key event;

determining corrective and/or mitigation actions to minimize deviations from a schedule of the project based on the tagged, mapped, and identified at least one string of data and the tagged, mapped, and identified historic collection;

transmitting the corrective and/or mitigation actions, wherein the corrective and/or mitigation actions are determined by use of a data structure including data elements associated with the SOV, the schedule of the project, and a contract of the project with a unique SOV tag for integrating the SOV, the schedule of the project, and the contract of the project, and wherein, in response to a change to at least one of the data elements, the operations further comprise updating the SOV, the schedule of the project, and the contract of the project.

30. The non-transitory computer-readable storage medium of claim 25, wherein the comparison of the verification component with the actual condition of the specific construction work element includes inspection of the actual condition with one or more of a robot, an autonomous device, an unmanned device, an unmanned vehicle, an unmanned aerial vehicle, an unmanned aerial system, a premises security system element, a security camera, an audio sensor, and a motion sensor.

31. The non-transitory computer-readable storage medium of claim 25, wherein the comparison of the verification component with the actual condition of the specific construction work element includes:

comparing each of the SOV descriptions to a coordination status;

determining from the comparing of each of the SOV descriptions to the coordination status whether a trade is in coordination or out of coordination; and generating and transmitting a mitigation flag based on the determining of whether the trade is coordination or out of coordination.

32. The non-transitory computer-readable storage medium of claim 25, wherein the operations further comprising:

determining and updating in real time, with the at least one processor, the current completion status of the specific construction work element by comparing the verification component with the prior version of the verification component and/or the predetermined condition;

adjusting the current completion status in real time, with the at least one processor, based on one or more of:

an unapproved work in place, an instruction to correct work in place that is determined not to meet a condition of the contract, an unapproved change order, a total cost of materials on order and not yet received, a change in general conditions of the contract, an unpredictable event, an accident, a natural disaster, and an act of God; and actioning, with the at least one processor, a recovery plan and/or a mitigation action in response to the adjusting the current completion status in real time.

33. The non-transitory computer-readable storage medium of claim 25, wherein the operations further comprising:

displaying via a graphical user interface (GUI) an image of the SOV and the current completion status of the specific construction work element:

adjusting, with the at least one processor, the current completion status in real time in response to the determining, with the at least one processor, whether the verification component is acceptable, partially acceptable or unacceptable to verify the current completion status of the SOV description of the specific construction work element based on a comparison of the verification component with the actual condition of the specific construction work element;

continuously updating the SOV displayed on the GUI based on the adjusted current completion status in real time, wherein the displaying, adjusting, and continuously updating are performed before the generating, with the at least one processor, the payment authorization in response to the acceptable determination, transmitting the acceptable payment authorization to the payment provider, and authorizing the payment to the contractor by the payment provider of the amount of the payment corresponding to the requested amount of the requisition; and/or the generating, with the at least one processor, the notification of rejection in response to the partially acceptable or the unacceptable determination, and resubmitting, with the at least one processor, the partially acceptable or unacceptable verification component for consideration and/or correction of the specific construction work element of the construction project.

* * * * *